(12) United States Patent
Chapman et al.

(10) Patent No.: US 11,112,015 B2
(45) Date of Patent: Sep. 7, 2021

(54) FLUID VALVE ASSEMBLY INCLUDING SEAL HAVING RETENTION FEATURES

(71) Applicant: Robert Bosch GmbH, Stuttgart (DE)

(72) Inventors: Thomas Chapman, Templeton, MA (US); George Popovici, Swampscot, MA (US); Lesley Wang, Braintree, MA (US); Adarsh Venkiteswaran, Woodinville, WA (US)

(73) Assignees: Robert Bosch LLC, Broadview, IL (US); Robert Bosch GmbH, Stuttgart (DE)

( * ) Notice: Subject to any disclaimer, the term of this patent is extended or adjusted under 35 U.S.C. 154(b) by 39 days.

(21) Appl. No.: 16/433,382

(22) Filed: Jun. 6, 2019

(65) Prior Publication Data

US 2020/0386323 A1    Dec. 10, 2020

(51) Int. Cl.
| *F16K 5/04* | (2006.01) |
| *F16K 5/18* | (2006.01) |
| *F16K 11/085* | (2006.01) |
| *F01P 7/14* | (2006.01) |

(52) U.S. Cl.
CPC ............ *F16K 5/188* (2013.01); *F16K 5/0471* (2013.01); *F16K 5/0478* (2013.01); *F16K 5/184* (2013.01); *F16K 11/0853* (2013.01); *F01P 2007/146* (2013.01)

(58) Field of Classification Search
CPC . F16K 5/188; F16K 5/184; F16K 5/18; F16K 5/0471; F16K 5/0478; F16K 11/085; F16K 11/0853; F16K 31/53; F16K 31/535; F16K 31/041; F16K 31/04; F01P 2007/146

USPC ........ 251/160, 175, 176, 180, 181, 185, 192
See application file for complete search history.

(56) References Cited

U.S. PATENT DOCUMENTS

| 810,951 | A | * | 1/1906 | Larkin | ..................... F16K 5/184 |
| | | | | | 251/182 |
| 1,361,126 | A | * | 12/1920 | Gemmel | ................. F16K 5/184 |
| | | | | | 251/177 |
| 2,391,278 | A | * | 12/1945 | Stark | ............................. 251/175 |
| 2,505,270 | A | * | 4/1950 | Allen | ..................... F16K 5/0478 |
| | | | | | 251/175 |
| 2,970,805 | A | * | 2/1961 | Pool | ...................... F16K 5/0673 |
| | | | | | 251/175 |

(Continued)

FOREIGN PATENT DOCUMENTS

| DE | 102009025341 | | 12/2010 | | |
| FR | 2809466 | A1 * | 11/2001 | ............. | F16K 5/188 |

(Continued)

OTHER PUBLICATIONS

PCT International Search Report for PCT/EP2020/064265.

*Primary Examiner* — David Colon-Morales
(74) *Attorney, Agent, or Firm* — Kelly McGlashen; Maginot, Moore & Beck LLP

(57) ABSTRACT

A fluid valve includes a valve body and a plug. The body includes a chamber and ports that communicate with the chamber. The plug is rotatably disposed in the chamber, and includes a seal disposed in an annular groove provided on the plug surface. An elastic member is disposed in the groove, and biases the seal against an inner surface of the chamber. The seal includes a seal retaining feature that is configured to retain the seal within the groove.

18 Claims, 38 Drawing Sheets

(56) References Cited

U.S. PATENT DOCUMENTS

| | | | | |
|---|---|---|---|---|
| 3,130,952 | A | * | 4/1964 | Meyer .................... F16K 5/205 251/175 |
| 3,186,680 | A | * | 6/1965 | Pool ..................... F16K 5/0464 251/175 |
| 3,342,453 | A | * | 9/1967 | Viljami .................. F16K 5/184 251/184 |
| 3,872,889 | A | | 3/1975 | Smith et al. |
| 4,015,816 | A | * | 4/1977 | Semon ................. F16K 5/0478 251/285 |
| 4,470,429 | A | * | 9/1984 | Johnson .............. F16K 11/0853 137/270 |
| 4,519,579 | A | | 5/1985 | Brestel et al. |
| 4,635,674 | A | * | 1/1987 | Bajka ..................... F16K 5/225 137/246.22 |
| 5,234,193 | A | * | 8/1993 | Neal, Jr. ............... F16K 27/065 251/175 |
| 5,332,193 | A | | 7/1994 | Giacomini |
| 5,617,815 | A | * | 4/1997 | Spies ................... F16K 11/076 123/41.1 |
| 6,289,913 | B1 | * | 9/2001 | Babin ................ F16K 11/0853 137/15.18 |
| 6,681,805 | B2 | | 1/2004 | McLane et al. |
| 6,994,316 | B2 | | 2/2006 | Pervaiz |
| 7,210,668 | B2 | * | 5/2007 | Wilfert .................... F16K 5/188 251/174 |
| 7,559,531 | B2 | | 7/2009 | Thomas et al. |
| 9,115,812 | B2 | | 8/2015 | Bakhshi et al. |
| 9,803,759 | B2 | | 10/2017 | Bachofer |
| 2002/0189692 | A1 | * | 12/2002 | Sato .................... F16K 11/0853 137/625.47 |
| 2003/0098077 | A1 | | 5/2003 | McLane et al. |
| 2004/0045613 | A1 | * | 3/2004 | Hinojosa, Jr. .......... A61H 33/60 137/625.47 |
| 2005/0269544 | A1 | | 12/2005 | Oh |
| 2008/0128648 | A1 | | 6/2008 | Thomas et al. |
| 2013/0220445 | A1 | | 8/2013 | Bakhshi et al. |
| 2015/0075453 | A1 | | 3/2015 | Oikawa |
| 2017/0307084 | A1 | | 10/2017 | Atschreiter et al. |
| 2020/0011437 | A1 | * | 1/2020 | Lin ..................... F16K 11/0853 |

FOREIGN PATENT DOCUMENTS

| | | | | |
|---|---|---|---|---|
| GB | 865943 | | 4/1961 | |
| GB | 1021335 | A * | 3/1966 | ............ F16K 5/184 |
| GB | 2143930 | A * | 2/1985 | ........... F16K 5/0478 |
| WO | 2006078607 | | 7/2006 | |
| WO | 2014072379 | | 5/2014 | |

\* cited by examiner

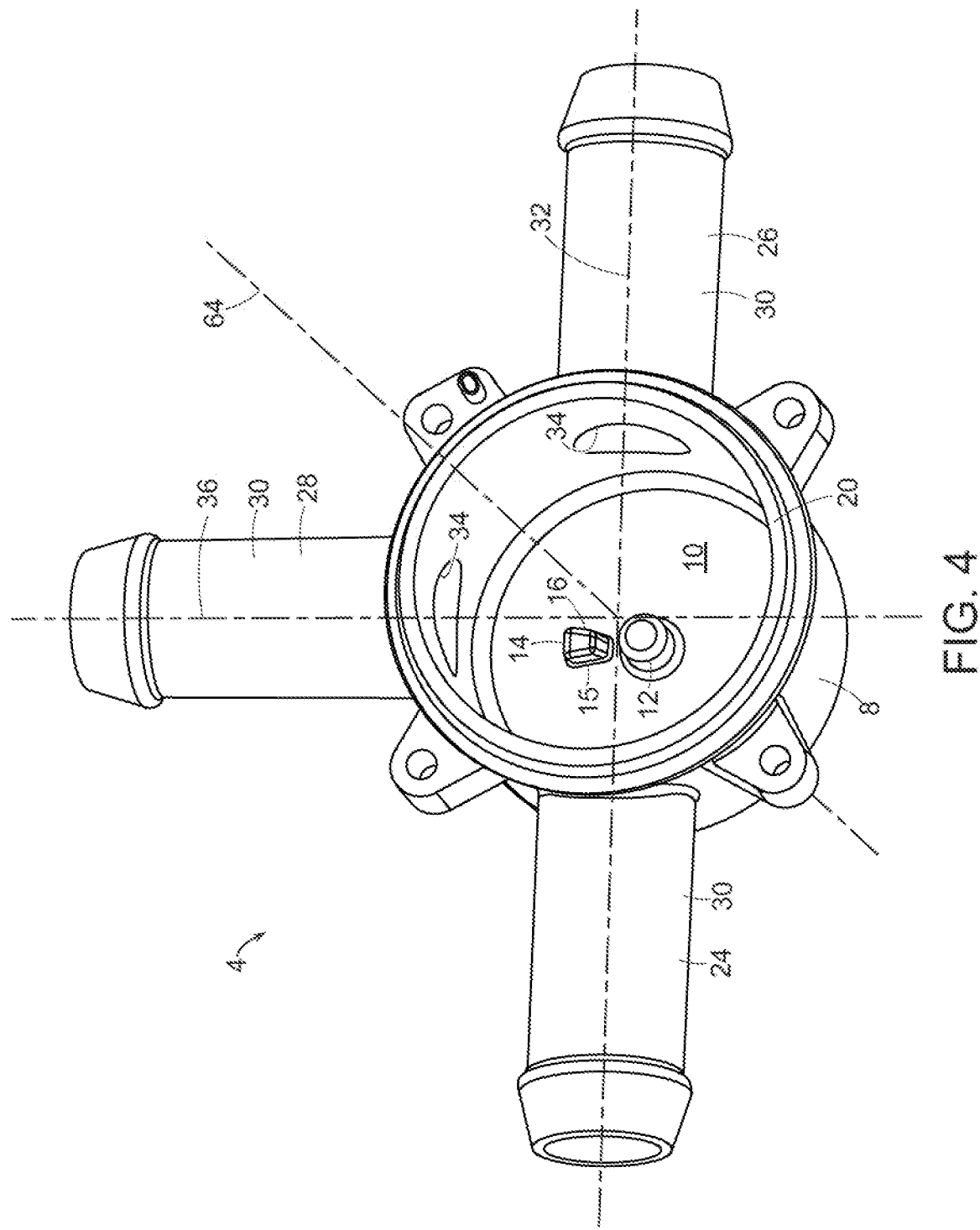

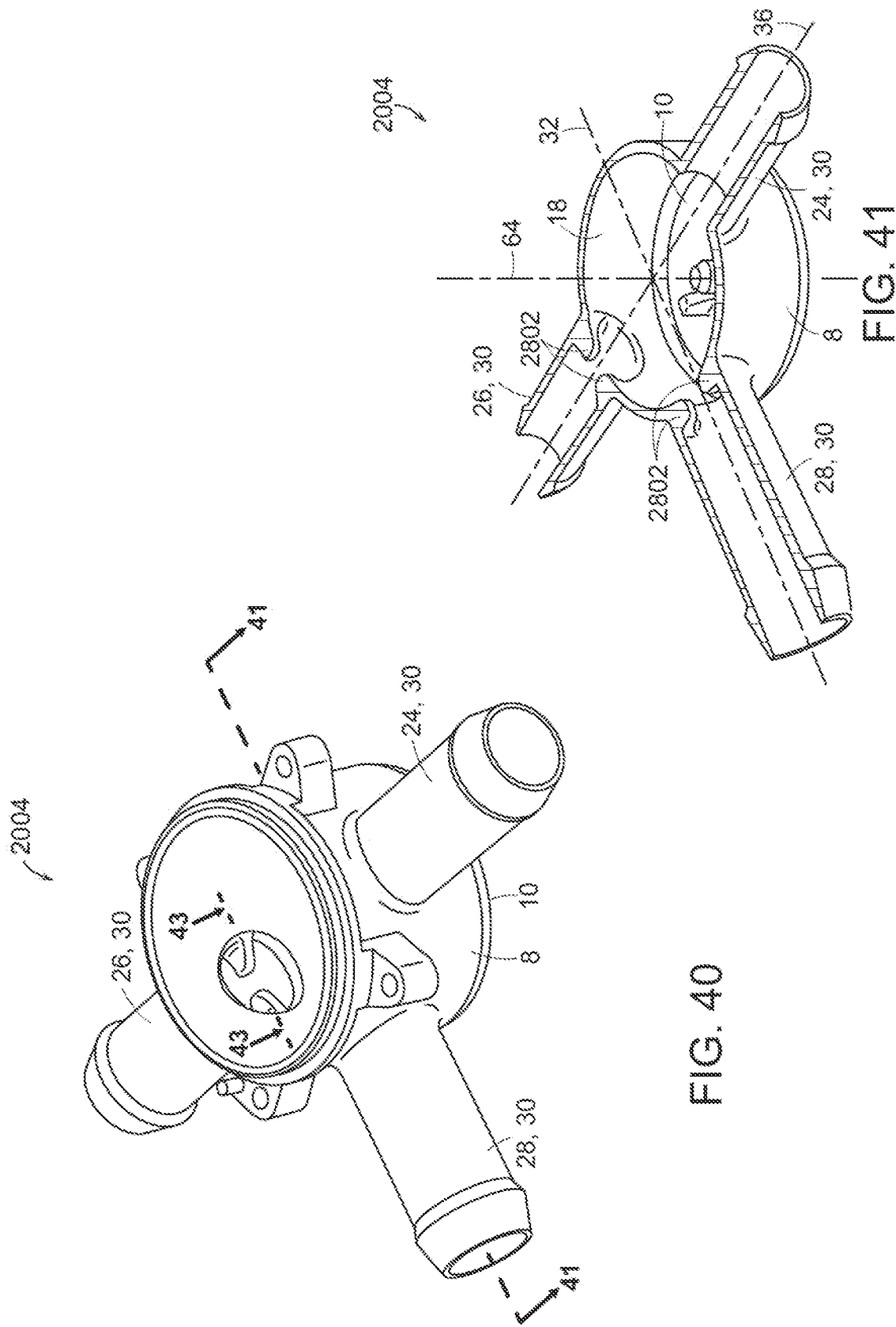

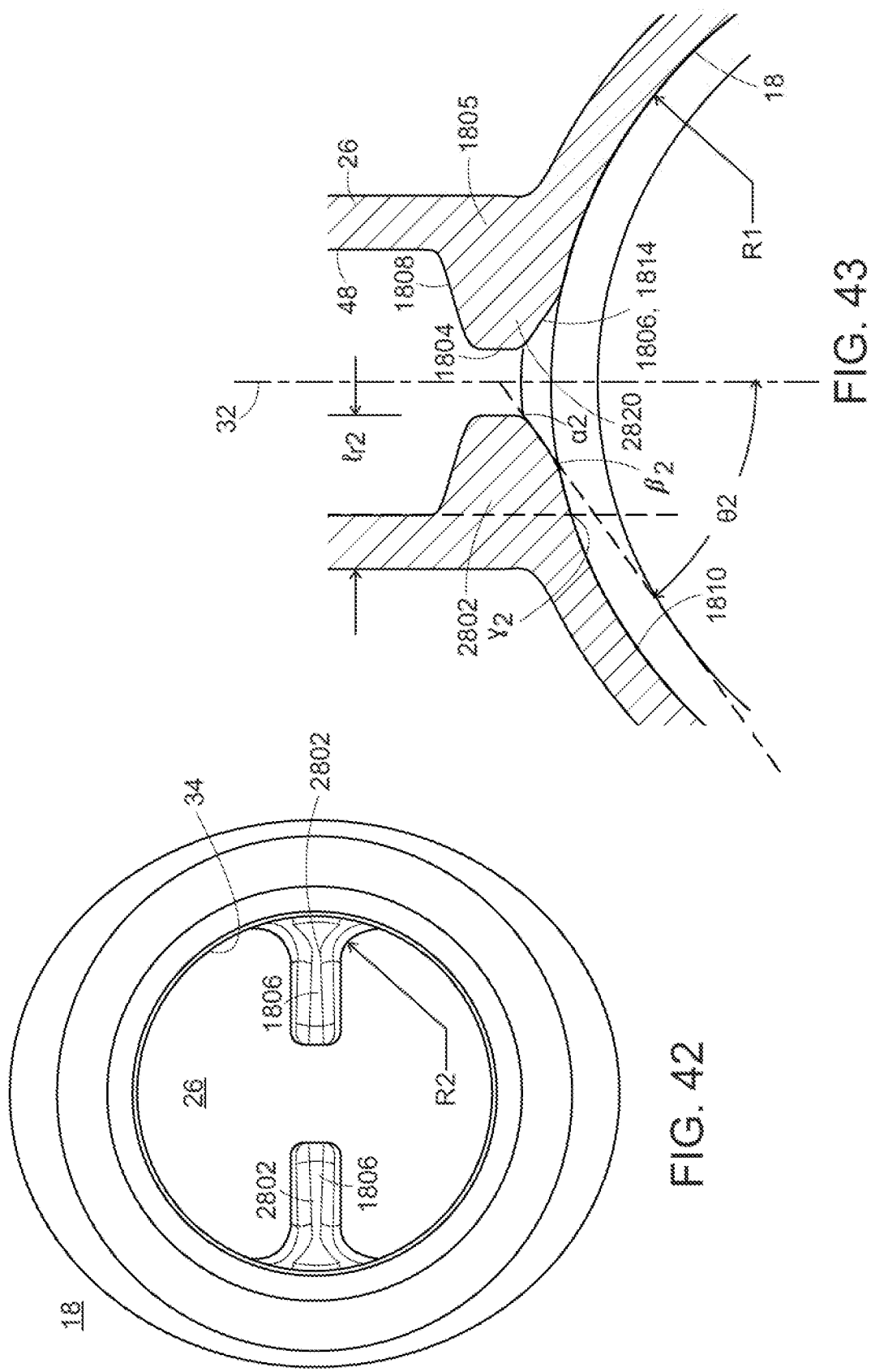

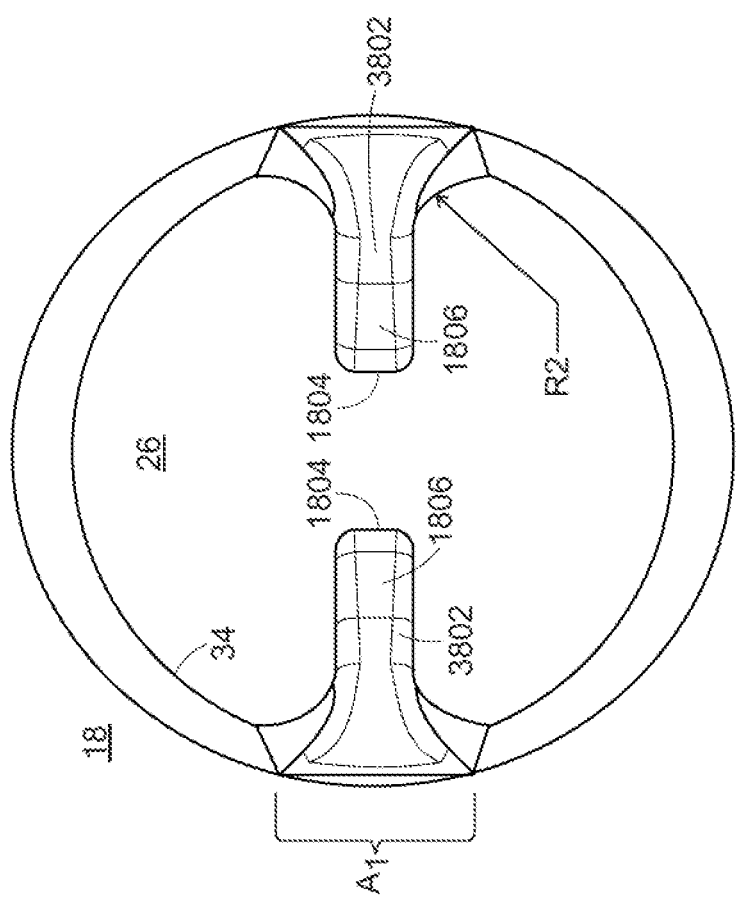
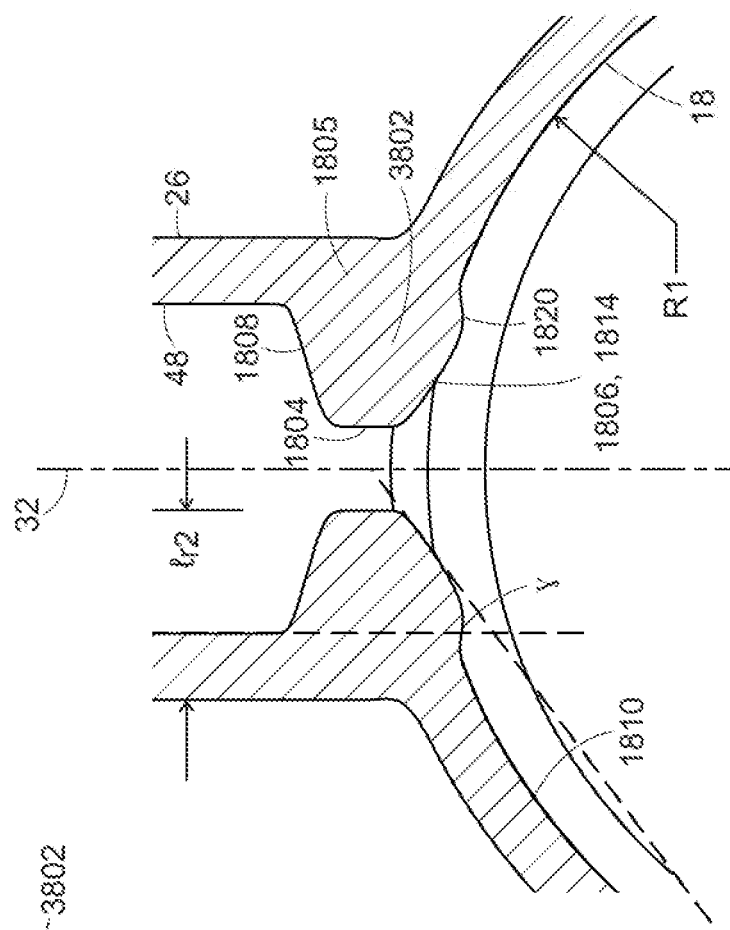
FIG. 46
FIG. 47

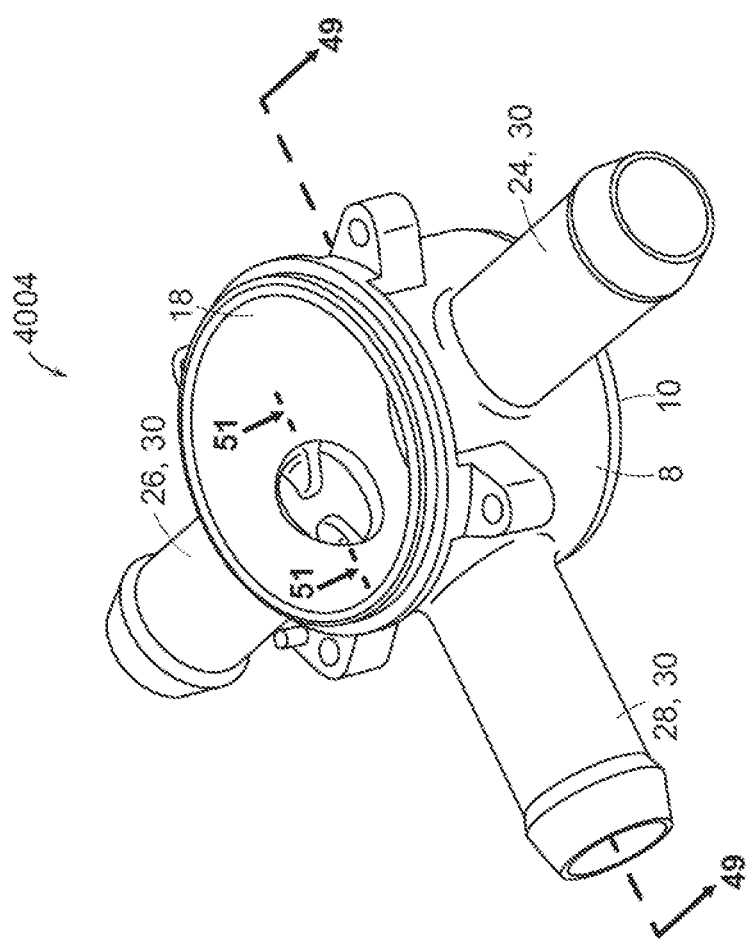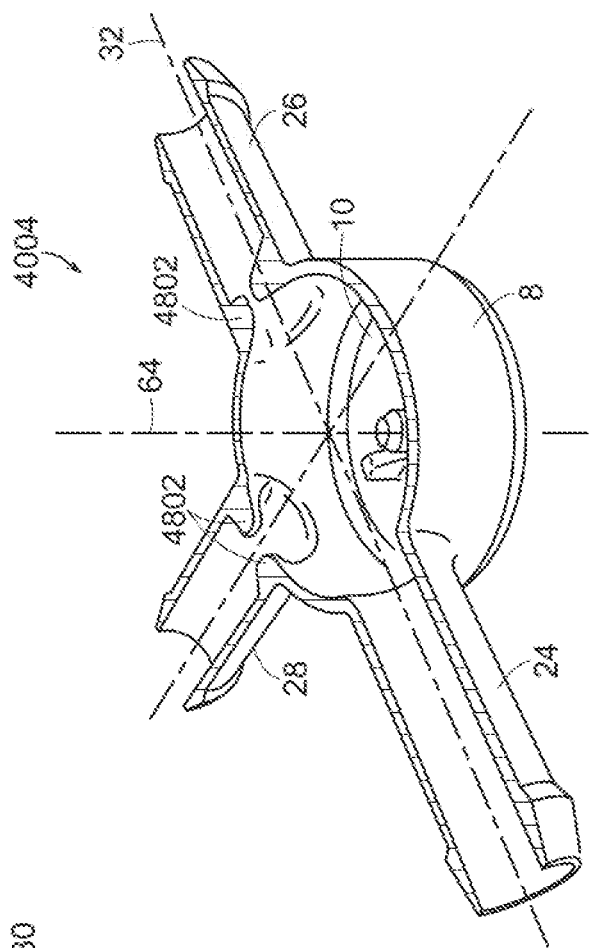

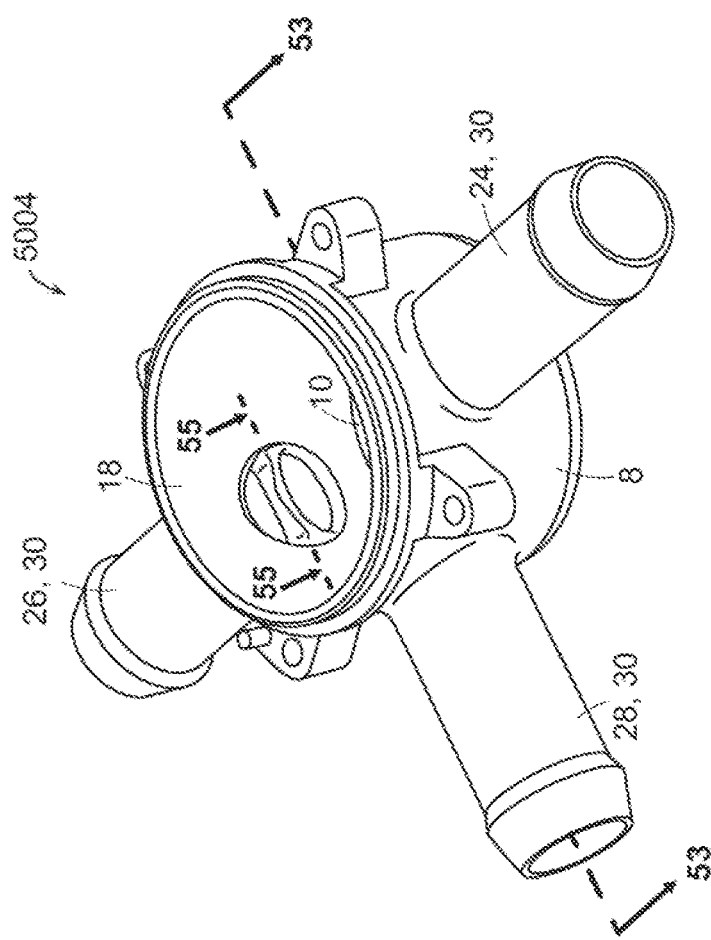
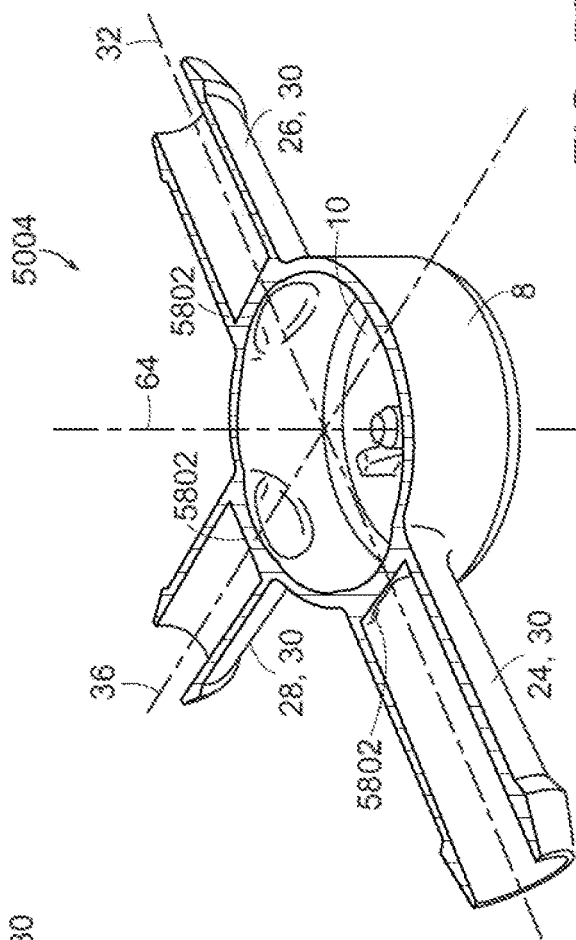
FIG. 52
FIG. 53

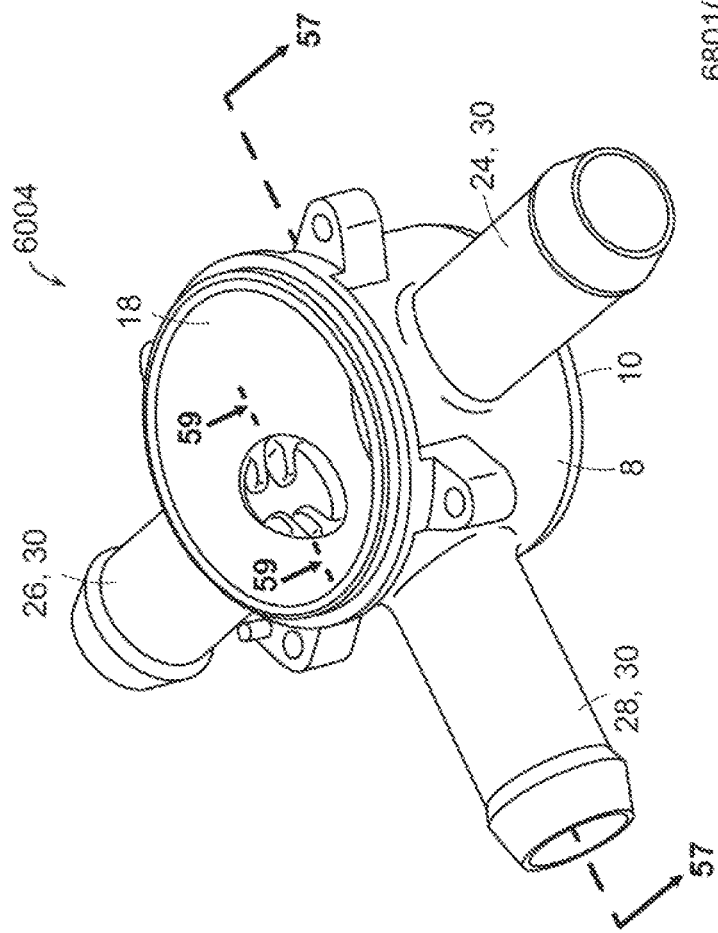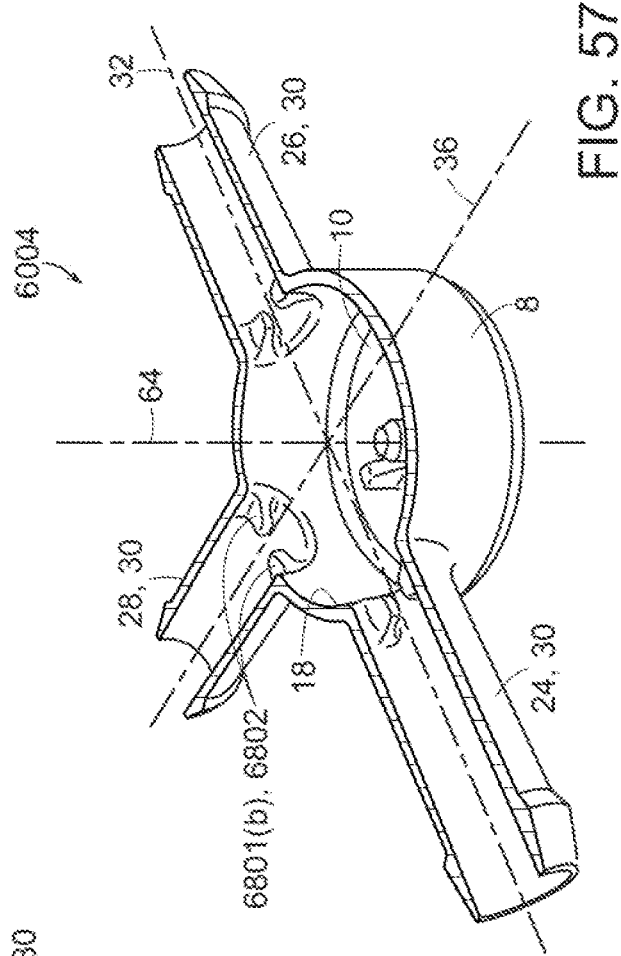

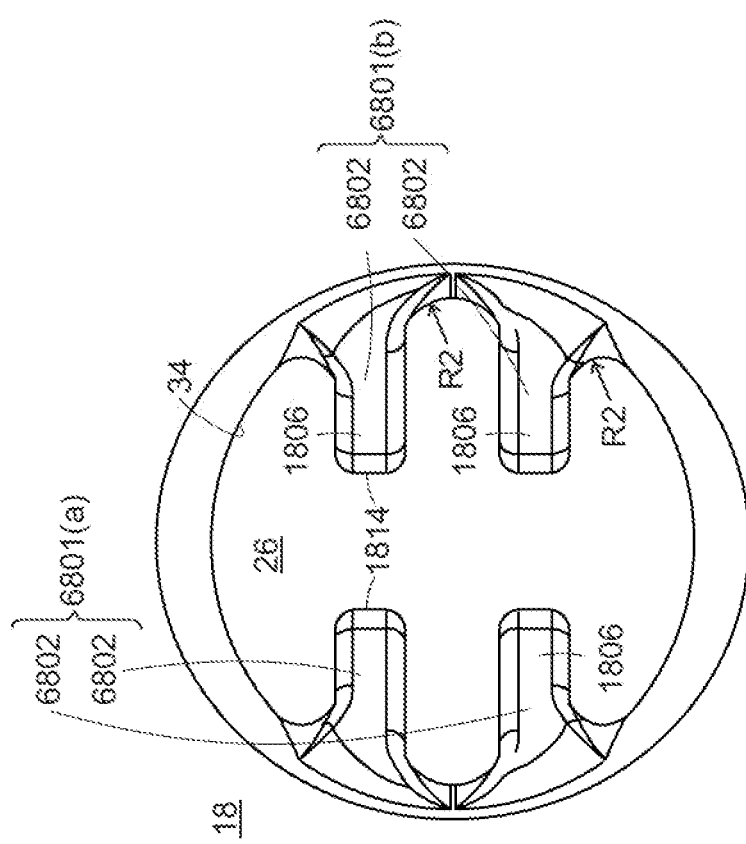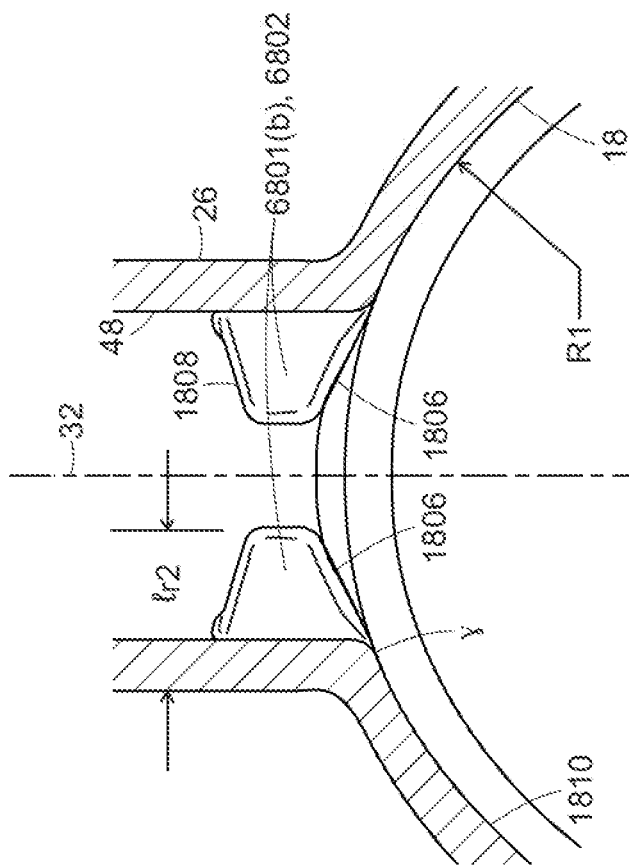

FLUID VALVE ASSEMBLY INCLUDING SEAL HAVING RETENTION FEATURES

BACKGROUND

A fluid valve assembly includes a rotary plug valve, a motor that is used to actuate the rotary plug valve and a gear set that connects the motor to the rotary plug valve. A rotary plug valve is a type of fluid valve that may be used to control fluid flow and distribution through fluid supply systems. For example, rotary plug valves may be used to control the flow of coolant through a vehicle cooling system. The rotary plug valve may include a valve body and a valve plug operatively connected to the valve body by an elastomeric valve seal. Some conventional rotary plug valves rely on the force from the compression of the elastomeric seal or a spring, or both, between the valve body and plug for sealing of the valve. Various hard seal materials (for example, thermoplastic, ceramic or metal) have also been used and usually utilize a spring to supply the relatively high sealing force required of hard seals. This force must be sufficient to seal the valve when the pressure differential across the valve is at its greatest. Therefore, in some conventional fluid valve assemblies, the valve actuator is sized to be able to rotate the valve plug against this maximum pressure differential, even though the actual pressure differential may be much less. In some cases, this force can also result in excessive wear of the seal and the valve body, and reduces operating life of the valve.

High torque may also be experienced due to manufacturing tolerances of the valve, and due to dimensional changes caused from a change in the operating temperature. To allow for these tolerances, manufacturers may provide the fluid valve assembly with an over-sized actuator.

Based on the foregoing, there is a need for a rotary plug valve that includes a sealing configuration that overcomes the limitations in the art, including providing reduced torque within the valve while ensuring fluid-tight sealing when there is a pressure differential across the valve, even when the pressure differential across the valve is at a maximum.

SUMMARY

In some aspects, a fluid valve includes a valve body and a valve plug. The valve body includes a valve plug chamber and valve ports. Each valve port communicates with the valve plug chamber. The valve plug is disposed in the valve plug chamber and is rotatable relative to the valve body about a rotational axis. The valve plug includes a hollow, tubular protrusion that protrudes from the plug in a direction perpendicular to the rotational axis. An inner surface of the tubular protrusion defining a portion of a fluid path. The valve plug includes a sleeve that surrounds the tubular protrusion and is spaced apart from the tubular protrusion. The space between tubular protrusion and the sleeve defines an annular groove that surrounds the tubular protrusion. The groove has a groove inner wall that is shared with the tubular protrusion and a groove outer wall that is shared with the sleeve. The valve plug includes an annular seal that is disposed in the groove. The seal includes a seal inner surface that faces the groove inner wall, a seal outer surface that faces the groove outer wall, and a seal retaining feature that is configured to retain the seal within the second groove.

In some embodiments, the sleeve includes a through opening, and the seal retaining feature is a latch that protrudes outward from the seal outer surface. The latch extends into the through opening of the sleeve, and engagement between the latch and the through opening retains the seal within the second groove.

In some embodiments, the fluid valve includes an elastic member that is disposed in the groove between a blind end of the groove and the seal, the elastic member providing a force that directs the seal against an inner surface of the valve plug chamber.

In some embodiments, an end of the sleeve includes a cut out and the seal includes a key that protrudes outward from the seal outer surface. In addition, the key is disposed in the cut out, and engagement between the key and the cut out locates the seal with respect to the plug and properly orients the seal with respect to the plug.

In some embodiments, the latch is elongated along a circumference of the seal, and the through opening is elongated along a circumference of the sleeve.

In some embodiments, the seal includes a first end that faces a surface of the valve plug chamber, and a second end that is opposed to the first end and faces a surface of the plug. The latch is disposed on the seal outer surface at an edge corresponding to the seal second end.

In some embodiments, the through opening is spaced apart from a surface of the plug.

In some embodiments, the latch includes a beveled surface that faces the plug, and a normal surface that is opposed to the beveled surface, and is perpendicular to the seal outer surface.

In some embodiments, the through opening comprises at least two through openings that are spaced apart along a circumference of the sleeve, the latch comprises at least two latches that are spaced apart along a circumference of the seal, and the number of through openings corresponds to the number of latches.

In some embodiments, one of the groove inner wall and the groove outer wall includes an annular cut out, an annular retention ring is disposed in the cut out and protrudes relative to the one of the groove inner wall and the groove outer wall, and the seal retaining feature is an annular circumferential bead that is engaged by the annular retention ring, whereby the seal is retained in the groove.

In some embodiments, the retention ring has an interference fit with the cut out.

In some embodiments, the one of the groove inner wall and the groove outer wall is the groove inner wall, and the circumferential bead is disposed on the seal inner surface.

In some embodiments, the one of the groove inner wall and the groove outer wall is the groove outer wall, and the circumferential bead is disposed on the seal outer surface.

In some embodiments, the groove inner wall includes a first annular cut out, and the groove outer wall includes a second annular cut out. In addition, a first annular retention ring is disposed in the first cut out in such a way that the first annular retention ring protrudes relative to the groove inner wall, and a second annular retention ring is disposed in the second cut out in such a way that the second annular retention ring protrudes relative to the groove outer wall. The seal retaining feature includes an inner annular circumferential bead that is engaged by the first annular retention ring, and an outer annular circumferential bead that is engaged by the second annular retention ring, whereby the seal is retained in the groove.

In some aspects, a fluid valve includes a valve body having a valve plug chamber and valve ports. Each valve port communicates with the valve plug chamber. The fluid valve includes a valve plug that is disposed in the valve plug chamber and is rotatable relative to the valve body about a rotational axis. The valve plug includes a groove that opens facing a surface of the valve plug chamber, the groove including an inner wall an outer wall that faces the inner wall, and a first retaining structure that is provided on one of the inner wall and the outer wall. The valve plug includes a seal that is disposed in the groove, the seal including a seal inner surface that faces the groove inner wall, a seal outer surface that faces the groove outer wall, and a second retaining structure that is provided on one of the seal inner surface and the seal outer surface. The first retaining structure engages with the second retaining structure in such a way as to retain the seal within the groove.

In some embodiments, the first retaining structure comprises a through opening, and the second retaining structure comprises a protruding latch.

In some embodiments, each of the groove and the seal are annular, the latch is elongated along a circumference of the seal, and the through opening is elongated along a circumference of the surface of the groove.

In some embodiments, the seal includes a first end that faces a surface of the valve plug chamber, and a second end that is opposed to the first end and faces a surface of the plug. The latch is disposed on the seal outer surface at an edge corresponding to the seal second end, and the through opening is disposed on the groove outer wall.

In some embodiments, the latch includes a beveled surface that faces the plug, and a normal surface that is opposed to the beveled surface, and is perpendicular to the seal outer surface.

In some embodiments, the first retaining structure comprises a latch, and the second retaining structure comprises a latch-receiving opening.

In some embodiments, the valve plug includes a hollow, tubular protrusion that protrudes from the valve plug in a direction perpendicular to the rotational axis. An inner surface of the tubular protrusion defines a portion of a fluid path. In addition, the valve plug includes a sleeve that surrounds the tubular protrusion and is spaced apart from the tubular protrusion. The space between tubular protrusion and the sleeve defines the groove. The groove inner wall is shared with the tubular protrusion and the groove outer wall is shared with the sleeve. The first retaining structure comprises a through opening formed in the groove outer wall. The second retaining structure comprises a latch that protrudes outward from the seal outer surface and into the through opening. In addition, the latch and the through opening are engaged in such a way that the seal is retained within the groove.

In some embodiments, the through opening comprises at least two through openings that are spaced apart along a circumference of the sleeve, the latch comprises at least two latches that are spaced apart along a circumference of the seal, and the number of through openings corresponds to the number of latches.

In some embodiments, an end of the sleeve includes a cut out, the seal includes a key that protrudes outward from the seal outer surface, and the key is disposed in the cut out, and engagement between the key and the cut out locates the seal with respect to the plug and properly orients the seal with respect to the plug.

In some embodiments, the fluid valve includes an elastic member that is disposed in the groove between a blind end of the groove and the seal, the elastic member providing a force that directs the seal against an inner surface of the valve plug chamber.

A fluid valve assembly includes a rotary fluid valve, an actuator that is used to actuate the fluid valve and a gear set that connects the actuator to the fluid valve. The rotary fluid valve includes a valve body and a plug assembly that is rotatably supported in the valve body, and is configured to reduce the torque required to rotate the plug assembly, and minimize the number of seals required. The plug assembly is operatively connected to the valve body by an elastomeric valve seal. The valve body defies a number of ports for the directing of fluid to different locations within a cooling system, and a cavity for a plug assembly. The plug assembly includes a plug having a closed portion that blocks fluid flow and an open portion that allows fluid flow to travel from one port to another. The plug assembly can be rotated relative to the valve body between different port positions to either selectively block or open ports.

The rotary fluid valve has reduced torque requirements for rotation relative to some conventional rotary fluid valves. Torque reduction in the rotary fluid valve is realized by providing the valve seal that utilizes the fluid pressure within the valve to facilitate sealing. The device provides the necessary sealing forces when they are needed, e.g., in a fully closed position, and reduces forces while the valve is moving between fully closed positions. This minimizes wear of the seal and thus improves the useable lifetime of the valve. The reduced friction resulting from the reduced force of the seal while the valve is moving also reduces the amount of energy to move the valve.

Upon closure of a valve port in the rotary fluid valve, fluid pressure within the valve body expands or contracts the seal in a radial direction depending on the pressure differential to provide a fluid-tight seal between the seal and the valve plug. The fluid pressure within the valve body also provides a force in an axial direction to provide a fluid-tight seal between the seal and the valve body. An initial bias force is applied by an elastic member (i.e., a spring), and the elastic member provides sealing when there is a low fluid pressure differential across the seal.

The rotary fluid valve advantageously reduces the torque required to rotate the plug assembly in the valve body, reducing wear of the seal and valve body and increasing the reliability and durability of the rotary fluid valve. In addition, since the torque required to rotate the plug assembly is reduced, a smaller actuator motor may be used to position the plug assembly within the valve body. A smaller actuator motor is advantageous since it occupies less space, uses less energy and is lower in cost.

The fluid valve assembly includes the fluid valve that includes a single valve seal that is carried on the plug, whereby the number of required seals for the fluid valve is reduced as compared to some conventional fluid valves. Since the number of required valve seals is reduced, the cost of the valve assembly is reduced and manufacture is simplified.

The plug includes an annular groove, and the seal is disposed in the groove. When the valve plug assembly is oriented relative to the valve body so that the seal surrounds a port, the seal is retained within the groove because clearance between the plug and an inner surface of the valve body is small relative to the size of the seal. However, when the valve plug assembly is rotated relative to the valve body, the seal may pass over a port opening in the valve body. In this situation, a portion of the seal may slump into the opening. Upon continued rotation of the valve plug assembly, the portion of the seal that has slumped into the opening may become pinched between an edge of the opening and the valve plug. To address this issue, the fluid valve may include features that retain the seal in the groove, whereby pinching of the seal during rotation of the valve plug can be avoided. For example, in some embodiments, the valve plug may include a retention ring disposed in the groove to retain the seal. In other embodiments, the seal may include retaining features that engage corresponding features provided on the groove. In still other embodiments, the valve body may include guiding features associated with the opening that prevent seal pinching during rotation of the valve plug relative to the valve body.

BRIEF DESCRIPTION OF THE FIGURES

FIG. 4 is a top perspective view of the valve body.

FIG. 40 is a top perspective view of another alternative embodiment valve body.

FIG. 41 is a cross-sectional view of the valve body of FIG. 40 as seen along line 41-41 of FIG. 40.

FIG. 42 is a side view of a portion of the inner surface of the valve body illustrating a valve port of FIG. 40.

FIG. 43 is a cross-sectional view of the valve body of FIG. 40 as seen along line 43-43 of FIG. 40.

FIG. 46 is a side view of a portion of the inner surface of the valve body illustrating a valve port of FIG. 44.

FIG. 47 is a cross-sectional view of the valve body of FIG. 44 as seen along line 47-47 of FIG. 44.

FIG. 48 is a top perspective view of an alternative embodiment valve body.

FIG. 49 is a cross-sectional view of the valve body of FIG. 48 as seen along line 49-49 of FIG. 48.

FIG. 52 is a top perspective view of another alternative embodiment valve body.

FIG. 53 is a cross-sectional view of the valve body of FIG. 52 as seen along line 53-53 of FIG. 52.

FIG. 56 is a top perspective view of another alternative embodiment valve body.

FIG. 57 is a cross-sectional view of the valve body of FIG. 56 as seen along line 57-57 of FIG. 56.

FIG. 58 is a side view of a portion of the inner surface of the valve body illustrating a valve port of FIG. 56.

FIG. 59 is a cross-sectional view of the valve body of FIG. 56 as seen along line 59-59 of FIG. 56.

DETAILED DESCRIPTION

Figure 1:
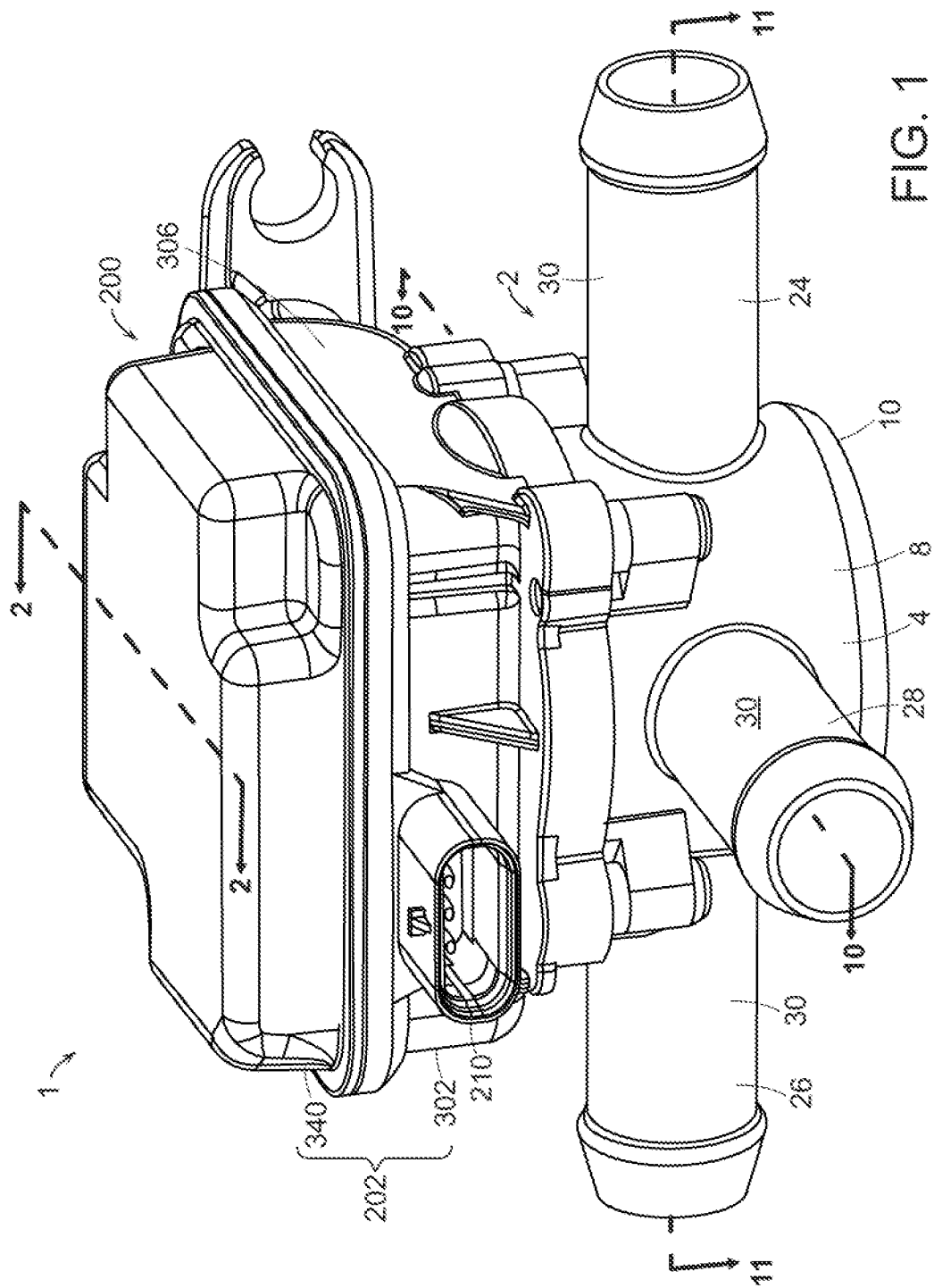
FIG. 1 is a perspective view of a fluid valve assembly.
Figure 2:
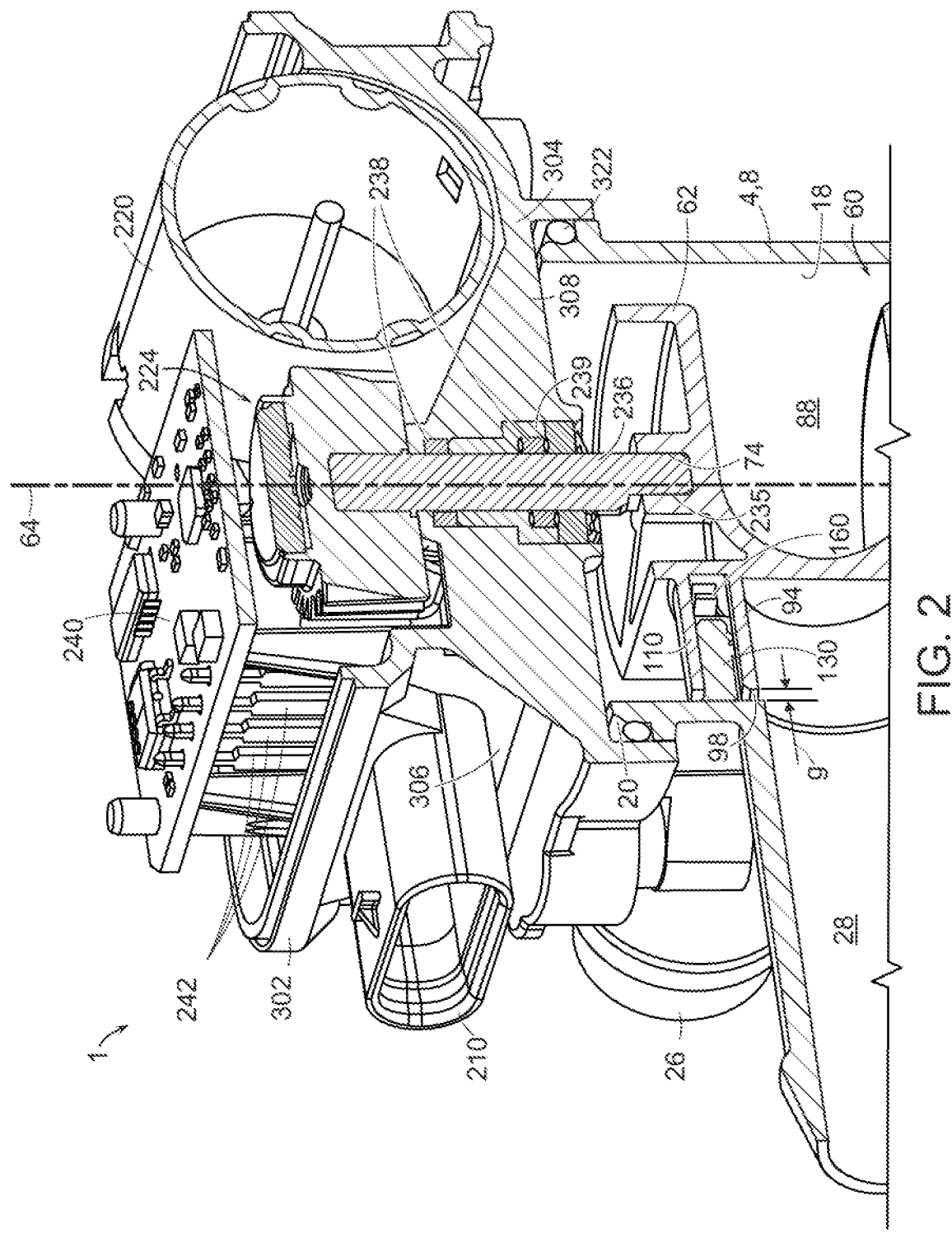
FIG. 2 is a cross-sectional view of the fluid valve assembly with the actuator cover removed and as seen along line 2-2.
Figure 3:
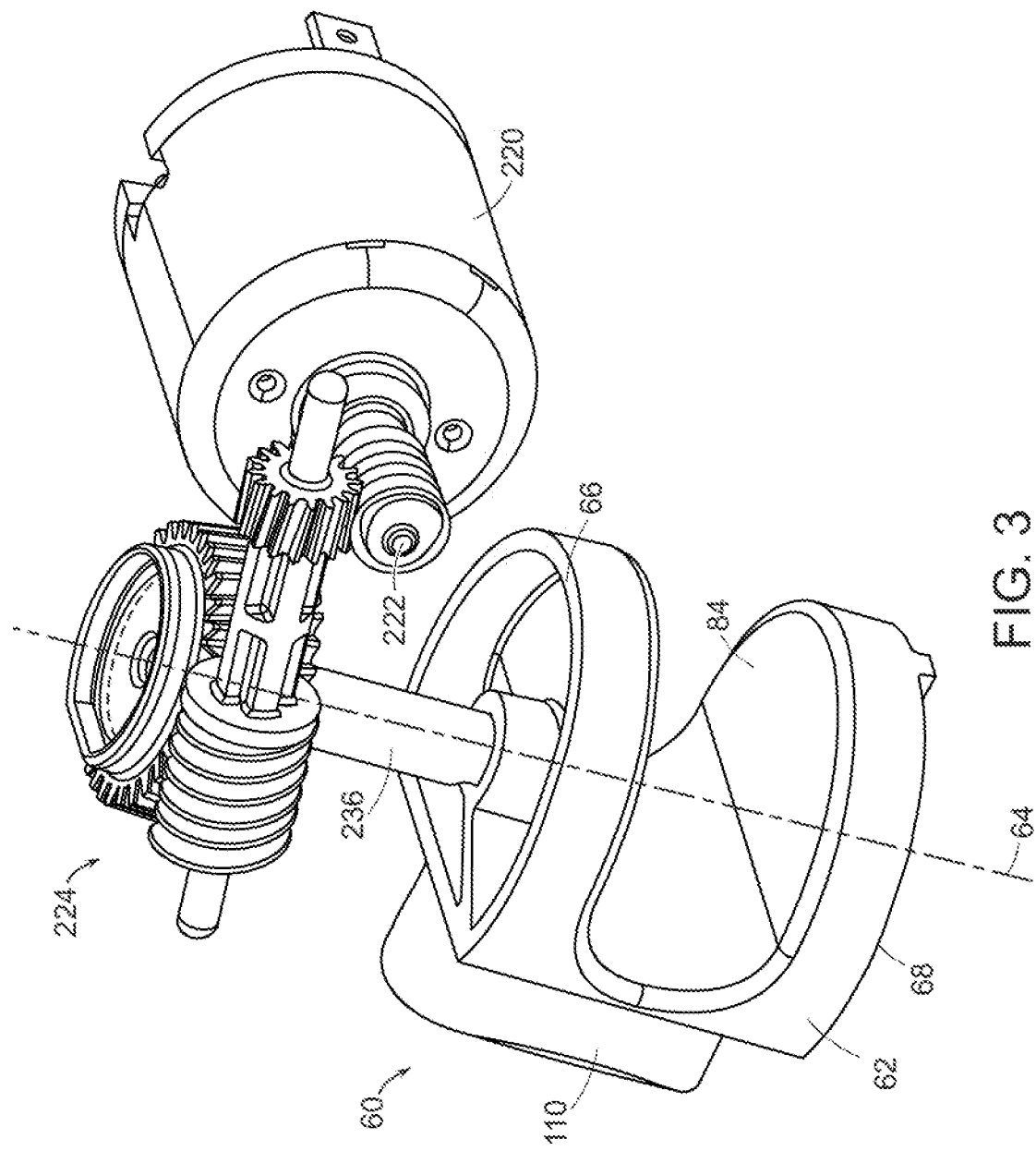
FIG. 3 is an isolated view of the gear set that mechanically connects the motor to the plug.
Figure 7:
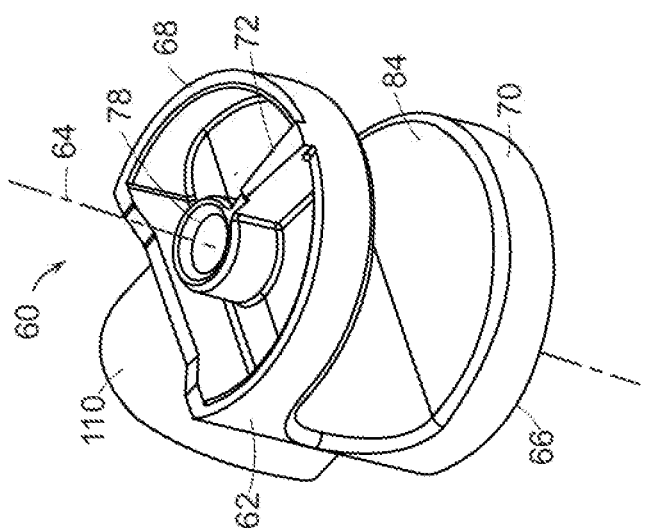
FIG. 7 is a bottom perspective view of the plug assembly of FIG. 5.
Figure 6:
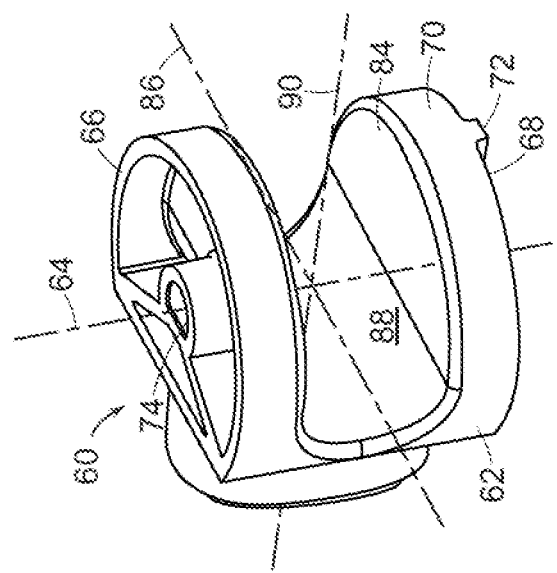
FIG. 6 is another top perspective view of the plug assembly of FIG. 5.
Figure 5:
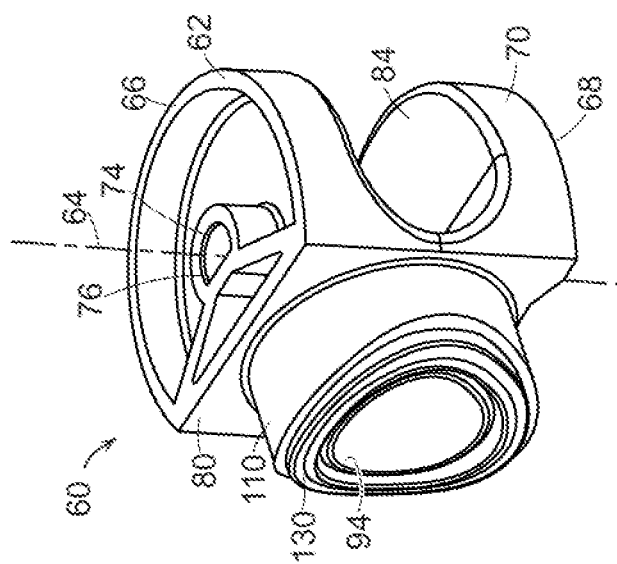
FIG. 5 is top perspective view of the plug assembly.
Figure 9:
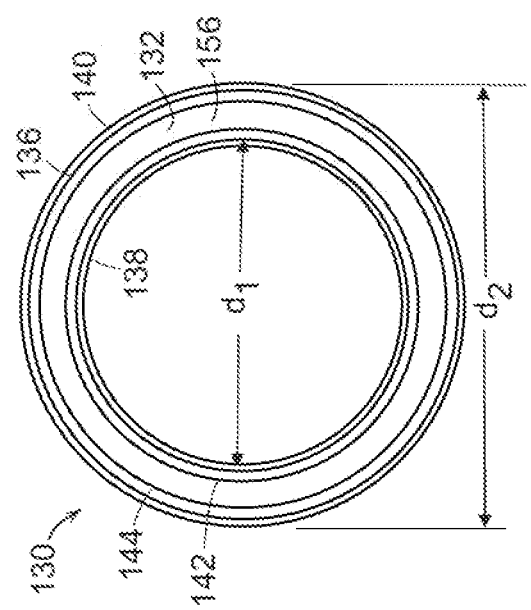
FIG. 9 is an end view of the seal of FIG. 8.
Figure 8:
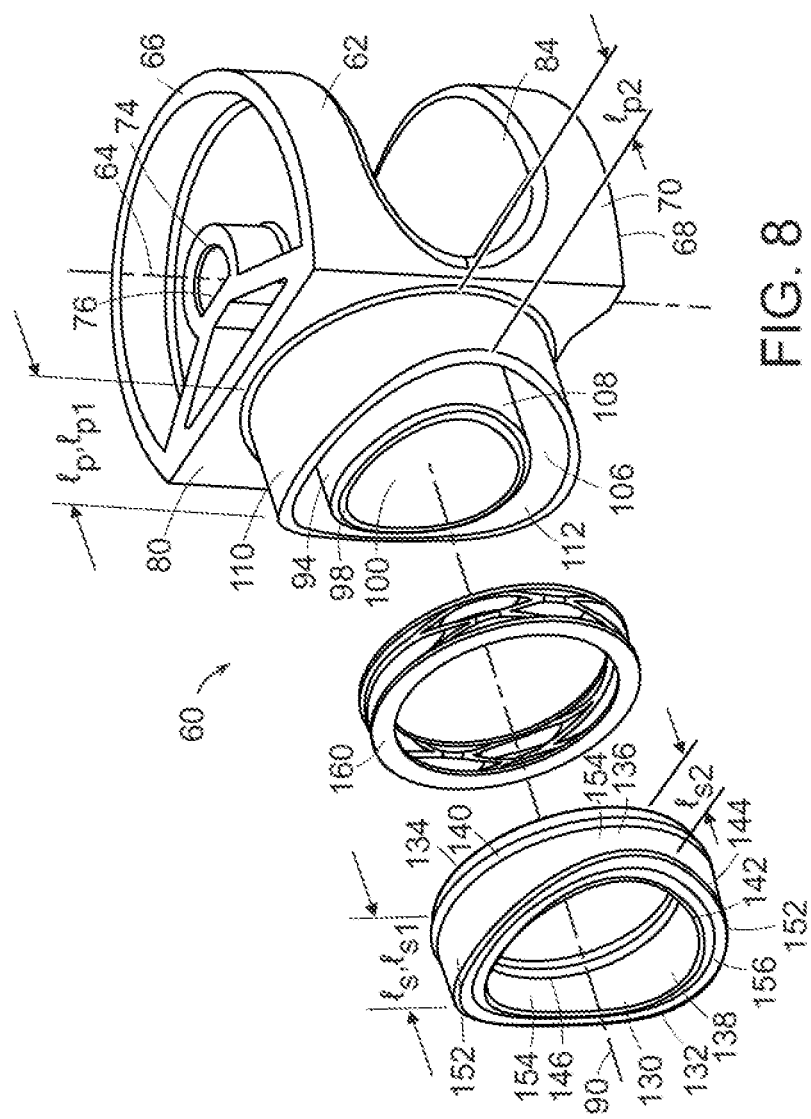
FIG. 8 is an exploded view of the plug assembly of FIG. 5.

Referring to FIGS. 1-4, a fluid valve assembly 1 includes a fluid valve 2 and an actuator 200 that is used to actuate the fluid valve 2. The fluid valve assembly 1 may be used for example, to control the distribution and flow of coolant in a vehicle cooling system. The fluid valve 2 is a rotary plug valve. The rotary plug valve 2 is mounted to the actuator housing 202, and includes a plug assembly 60 that is disposed in, and rotates relative to, a valve body 4 about a rotational axis 64. The valve body 4 includes three valve ports 24, 26, 28, and the rotational orientation of the plug assembly 60 relative to the valve body 4 is set via the actuator 200. The rotational orientation of the plug assembly 60 relative to the valve body 4 determines one or more fluid flow paths through corresponding ones of the valve ports 24, 26, 28. The rotary plug valve 2 has a single, elastomeric valve seal 130 that provides a fluid-tight seal between the valve body 4 and the plug assembly 60. The seal 130 is supported on a plug 62 of the plug assembly 60, and utilizes the fluid pressure within the valve body 4 to facilitate sealing between the valve body 4 and the plug 62. The valve seal 130 is implemented in such a way as to reduce torque requirements for plug rotation, as discussed in detail below.

References to direction made herein, such as up, down, upper, lower, top, bottom, front or rear are made with respect to the orientation of fluid valve assembly as shown in FIG. 1. The references to direction are relative and not intended to be limiting, and it is understood that the fluid valve assembly can be used in orientations other than the orientation shown in FIG. 1.

The actuator 200 includes the actuator housing 202, an electric motor 220 that is disposed within the actuator housing 202, and a gear set 224 that connects the motor 220 to the fluid valve 2. The gear set 224 is configured to reduce the rotational speed of the motor output shaft 222 and to rotate the plug assembly 60 about a rotational axis 64. The actuator housing 202 includes a shallow, tray-like container 302 and a cover 340 that closes an open end of the container 302. The electric motor 220, the gear set 224 and a printed circuit board 240 that includes a controller (not shown) are supported within the actuator housing 202, for example via stand-offs that project from both the container 302 and the cover 340. Electrically conductive pins 242 provide an electrical connection between the printed circuit board 240 and an electrical connector 210 that protrudes outwardly from a sidewall 306 of the container 302. In addition, a pair of electrically conductive leads (not shown) connect the printed circuit board 240 to the motor 220.

An output shaft of the gear set 224, e.g., the valve drive shaft 236, extends through an opening in a bottom 304 of the container 302, and into the valve body 4, where it engages the plug 62 of the plug assembly 60 as discussed further below. The valve drive shaft 236 is supported by a bushing 239 for rotation about the rotational axis 64. The opposed ends of the bushing 239 are sealed with shaft seals 238. The bushing 239 and seals 238 are disposed in a hollow boss 308 that protrudes inward, e.g., toward the cover 340, from the container bottom 304.

The rotary plug fluid valve 2 includes the valve body 4, and the plug assembly 60 that is disposed in, and rotates relative to, the valve body 4. The valve body 4 includes a base 10, and a sidewall 8. The sidewall 8 is joined at one end to a periphery of the base 10, and the sidewall 8 surrounds the base 10. The sidewall 8 and the base 10 together form a generally cup-shaped structure that defines a valve plug chamber 6 therein. A free end 20 of the sidewall 8 (e.g., the end of the sidewall 8 that is spaced apart from the base 10) abuts the outer surface of the container bottom 304. The interface between sidewall 8 of the valve body 4 and the outer surface of the container bottom 304 is sealed via an O-ring 322 that encircles the sidewall free end 20.

The valve body 4 includes a cylindrical stub 12 that protrudes from the base 10 in a direction toward the actuator housing 202. The stub 12 is centered on the base 10, and is co-axial with the rotational axis 64. The stub 12 is received in a cylindrical recess 78 provided in the plug 62. The stub 12 centers the plug assembly 60 within the valve plug chamber 6, and the plug assembly 60 is driven to rotate on the stub 12 about the rotational axis 64 via the valve drive shaft 236, as discussed further below.

The valve body 4 includes a stop 14 that protrudes from the base 10 in a direction toward the actuator housing 202. The stop 14 is located between the stub 12 and the sidewall 8, and has the shape of a generally rectangular prism in which opposed lateral sides 15, 16 of the prism are aligned with a radius of the valve body 4. In certain rotational orientations of the plug assembly 60 relative to the valve body 4, the stop 14 engages with a rib 72 that protrudes from an outer surface of the valve body 4, as discussed further below.

In the illustrated embodiment, the valve body 4 has three valve ports, including a first valve port 24, a second valve port 26 and a third valve port 28. Each of the valve ports 24, 26, 28 includes a tube 30 that protrudes outward from the sidewall 8, and communicates with the valve plug chamber 6. Although a length of each valve port may differ, each valve port 24, 26, 28 has the same cross-sectional shape and cross-sectional dimension. In the illustrated embodiment, the tubes 30 that form the valve ports 24, 26, 28 are cylindrical tubes, and each valve port 24, 26, 28 forms a circular opening 34 at the intersection with the valve body sidewall 8.

The valve ports 24, 26, 28, are provided at spaced-apart locations about a circumference of the sidewall 8. In the illustrated embodiment, the first and second valve ports 24, 26 are co-axial with a first valve body transverse axis 32, and are positioned on diametrically opposed sides of the valve body 4. The third valve port 28 is co-axial with a second valve body transverse axis 36, where the second valve body transverse axis 36 is perpendicular to the first valve body transverse axis 32. As a result, the third valve port 28 is disposed mid-way between the first and second valve ports 24, 26 along a circumference of the valve body sidewall 8. The first and second valve body axes 32, 36 intersect the rotational axis 64 and each other, and are perpendicular to the rotational axis 64. As a result, the valve ports 24, 26, 28 reside in a single plane that is perpendicular to the rotational axis 64 of the plug assembly 60.

Referring to FIGS. 5-11, the plug assembly 60 includes the plug 62, the seal 130 that is carried in a groove 106 provided in the plug 62, and an elastic member 160 that is disposed in the groove 106 and biases the seal 130 toward the valve body 4.

The plug 62 is a generally cylindrical member having a first end 66 that faces the actuator housing 202, and an opposed, second end 68 that is parallel to the first end 66 and faces an inner surface of the valve body base 10. The plug 62 includes a side surface 70 that faces an inner surface of the valve body sidewall 8.

The first end 66 of the plug 62 includes a centrally-located first recess 74 that is configured to receive, and mechanically engage with, the valve drive shaft 236. Although the first recess 74 has an inner surface that is generally cylindrical, the recess inner surface includes a flat portion 76 that faces the rotational axis 64. When the plug assembly 60 is assembled with the valve drive shaft 236, an end of the valve drive shaft 236 is disposed in the first recess 74, and a flat portion 235 provided on the valve drive shaft 236 abuts the first recess flat portion 76. When the valve drive shaft 236 is actuated by the motor 220, the engagement between the respective flat portions 76, 235 allows the valve drive shaft 236 to rotate the plug 62 about the rotational axis 64.

The second end 68 of the plug 62 includes a centrally located second recess 78 that is configured to receive the stub 12. The second recess 78 has a cylindrical inner surface that is dimensioned to receive the stub 12 in a clearance fit. The stub 12 serves as a spindle on which the plug 62 revolves.

The second end 68 of the plug 62 includes an elongated rib 72 that protrudes toward the valve body base 10. The rib 72 is a linear protrusion that is aligned with a radius of the valve body 4. In certain rotational orientations of the plug assembly 60 relative to the valve body 4, the rib 72 engages with the stop 14 provided on the base 10 of the valve body 4. The interaction between the rib 72 and the stop 14 may prevent over-rotation of the plug assembly 60 relative to the valve body 4. In addition, in some embodiments, certain control electronics (not shown) including, for example, a valve plug position sensor, may be initialized by rotating the plug 62 relative to the valve body 4 until the rib 72 engages with the stop 14 while simultaneously using a sensor to detect the rotational orientation of the plug 62.

The plug 62 includes a linear first groove 84 that extends diametrically through the plug 62 in a direction perpendicular to the rotational axis 64. The first groove 84 defines a "U" shape that opens at a circumference of the side surface 70 so that the first groove 84 opens facing the valve body sidewall 8. The first groove 84 is co-axial with a first plug transverse axis 86 that is perpendicular to, and intersects, the rotational axis 64. In some rotational orientations of the plug assembly 60 relative to the valve body 4, for example when the first plug transverse axis 86 is parallel to the first valve body transverse axis 32, the first groove 84 provides a portion of a fluid passage 88 that extends between the first valve port 24 and the second valve port 26.

The side surface 70 of the plug 62 is truncated on aside of the plug 62 that is opposed to the first groove 84, whereby the side surface 70 has a planar portion 80. The plug 62 includes a hollow, tubular protrusion 94 that protrudes outward from the planar portion 80. The tubular protrusion 94 is relatively thin-walled, and an inner surface of the tubular protrusion 94 defines a blind hole 100. The tubular protrusion 94 is co-axial with a second plug transverse axis 90 that is perpendicular to, and intersects, both the first plug transverse axis 86 and the rotational axis 64. The tubular protrusion 94 opens facing the valve body sidewall 8, and a narrow gap g (FIG. 2) exists between a terminal end 98 of the tubular protrusion 94 and the valve body sidewall 8. The gap g is dimensioned so that there is no interference between the tubular protrusion 94 and the valve body sidewall 8 during rotation of the plug 62, and to permit fluid flow to occur between the tubular protrusion 94 and the valve body sidewall 8.

The tubular protrusion 94 has a cross-sectional shape and dimension that corresponds to the shape and dimension of the valve ports 24, 26, 28. In the illustrated embodiment, the valve ports 24, 26, 28 are cylindrical tubes 30. Thus, the tubular protrusion 94, and the blind hole 100 that is defined by the inner surface of the tubular protrusion 94, are cylindrical in shape, and have a diameter that is equal to or greater than a diameter of the circular openings 34 in the valve body sidewall 8 associated with the valve ports 24, 26, 28.

The plug 62 includes a sleeve 110 that surrounds the tubular protrusion 94, is co-axial with the tubular protrusion 94 and is spaced apart from the tubular protrusion 94. Like the tubular protrusion 94, the sleeve 110 has a cylindrical shape. The sleeve 110 and the tubular protrusion 94 each have a non-uniform length lp to accommodate the cylindrical shape of the valve body inner surface 18, where the length lp of the sleeve 110 and the tubular protrusion 94 corresponds to a dimension in a direction parallel to the second transverse axis 90. In particular, the sleeve 110 and the tubular protrusion 94 each have a maximum length lp1 at portions that are closest to the valve plug first and second ends 66, 68, and a minimum length lp2 at portions that are disposed midway between the valve plug first and second ends 66, 68.

The space between tubular protrusion 94 and the sleeve 110 defines an annular second groove 106 that surrounds the tubular protrusion 94. The second groove 106 has a groove inner wall 108 that is shared with the tubular protrusion 94, and a groove outer wall 112 that is shared with the sleeve 110. In addition, the second groove 106 has a groove blind end 114. Although in the illustrated embodiment, the groove blind end 114 is a portion of the planar portion 80 of the valve plug side surface 70, it is not limited to this configuration. The second groove 106 receives the seal 130, and provides mechanical support for the seal 130 during rotation of the plug assembly 60 relative to the valve body 4.

The annular seal 130 is disposed in the second groove 106. The seal 130 has a seal outer surface 136 that faces the groove outer wall 112, and a seal inner surface 138 that faces the groove inner wall 108. The seal 130 also has a first end 132 that faces the valve body sidewall 8, and a second end 134 that is opposed to the first end 132 and faces the groove blind end 114. The seal outer and inner surfaces 136, 138 may include surface features that reduce dimensional tolerances necessary for effective sealing, reduce friction between the seal 130 and the groove inner and outer walls 108, 112, and mechanically support the seal 130 during rotation of the plug 62 relative to the valve body 4. For example, in the illustrated embodiment, the seal outer surface 136 includes an annular outer circumferential bead 140 (e.g., a bead) that protrudes outward and extends about an outer circumference of the seal 130. In addition, the seal inner surface 138 includes an annular inner circumferential bead 146 (e.g., a bead) that protrudes inward and extends about an inner circumference of the seal 130.

The seal 130 has a non-uniform length ls to accommodate the cylindrical shape of the valve body inner surface 18, where the length ls of the seal 130 corresponds to a distance between the seal first and second ends 132, 134. In particular, the seal 130 has a maximum length ls1 at first portions 152 of the seal 130 that are closest to the valve plug first and second ends 66, 68 (e.g., at the top and bottom of the seal 130 with respect to the orientation of the seal 130 shown in FIG. 8). In addition, the seal 130 has a minimum length ls2 at second portions 154 of the seal 130, where the second portions 154 are disposed midway between the first portions 152 (e.g., midway between the top and bottom of the seal 130 with respect to the orientation of the seal 130 shown in FIG. 8).

The seal first end 132 includes a first edge 142 that is located at an intersection of the seal first end 132 and the outer surface 136 of the seal 130, and a second edge 144 that is located at an intersection of the seal first end 132 and the inner surface 138 of the seal 130. In addition, the seal first end includes an annular concavity 156 that is recessed relative to both the first edge 142 and the second edge 144. As a result, the seal first end 132 has a shallow "V" shape that ensures that contact between the seal 130 and the valve body inner surface 18 occurs at the outer and inner diameter of the seal 130. Advantageously, the shallow "V" shape also allows the seal to provide a surface wiping action when the plug assembly 60 is rotated relative to the valve body 4, preventing particles from getting between the seal first end 132 and the valve body inner surface 18 that could cause damage. In some embodiments, the first and second edges 142, 144 "wear in" over time so that the seal first end 132 eventually conforms to the shape of the valve body inner surface 18.

The seal 130 is formed of an elastic material that is compatible with the fluid that flows through the fluid valve 2 and meets the requirements for operating temperature and durability. For example, for a fluid valve used to control fluid in a vehicle coolant system, the seal 130 is formed of an elastomer that is compatible with automotive coolant.

In some embodiments, the seal first end 132 may include a low-friction coating, whereby the seal first end 132 has a lower coefficient of friction than the remainder of the seal 130, including the seal outer and inner surfaces 136, 138 and the seal second end 134. In other embodiments, the entirety of the seal 130 is coated with a coating that is low friction relative to the elastomer used to form the seal 130. In one non-limiting example, the seal 130 is formed of an elastomer, and the coating is formed of a Polytetrafluoroethylene (PTFE). By providing the seal 130 with a low-friction coating, the torque required to operate the fluid valve 2 is reduced.

In some embodiments, as an alternative to a low friction coating, the seal 130 may include a "blooming" material. For example, the blooming material may be a wax that is incorporated in the seal 130 and that seeps out of the seal 130 over time. In this example, the wax may coat the seal 130 and serve as a lubricant that reduces friction.

The elastic member 160 is disposed in the second groove 106, so as to reside between the seal 130 and the second groove blind end 114. In the illustrated embodiment, the elastic member 160 is a spring such as a coil spring, a wave spring or a wave washer. The elastic member 160 may be formed of stainless steel, but is not limited to this material. The elastic member 160 provides a spring force Fs that is directed against the seal second end 134 in a direction parallel to the second plug transverse axis 90. In other words, the elastic member 160 elastically biases the seal 130 toward, and against, the valve body inner surface 18. The elastic member 160 enables the seal 130 to provide a fluid-tight sealing function under conditions when there is a low differential pressure across the fluid valve 2, as discussed further below.

Figure 10:
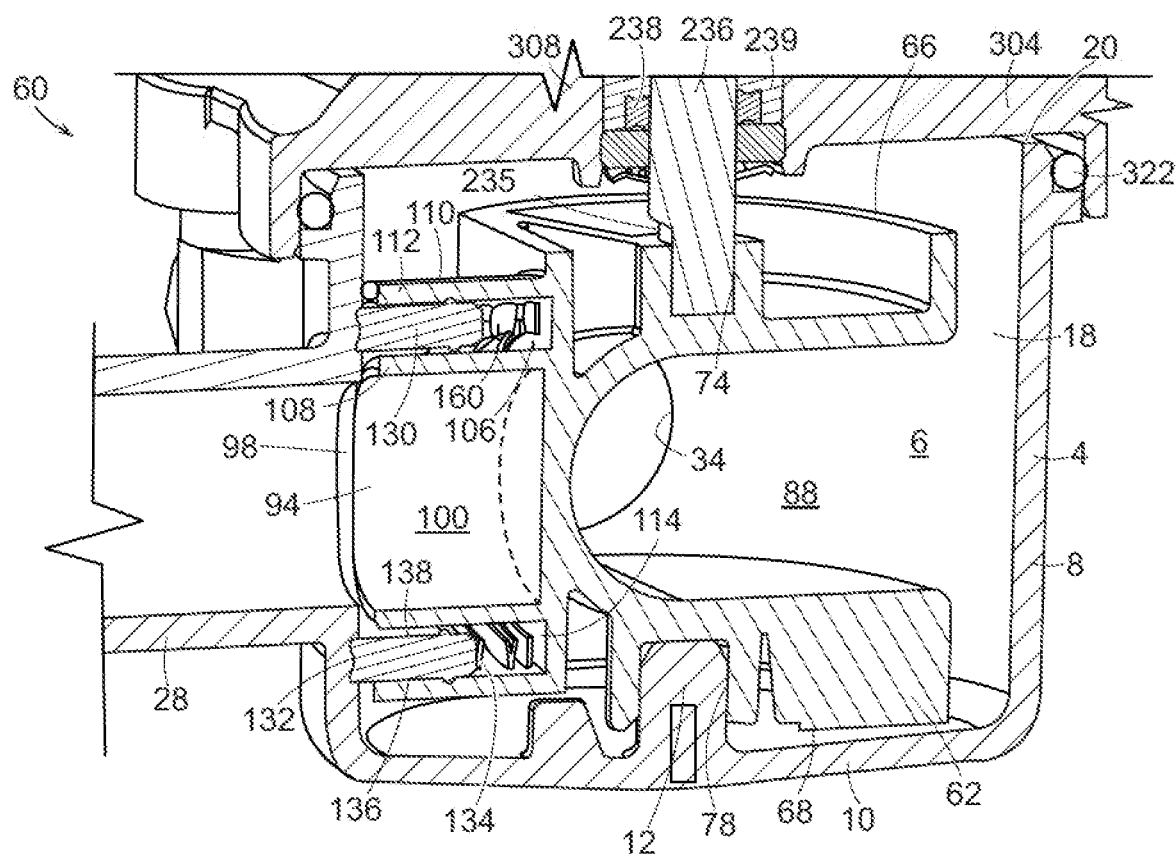
FIG. 10 is a cross-sectional view of the fluid valve as seen along line 10-10 of FIG. 1.
Figure 11:
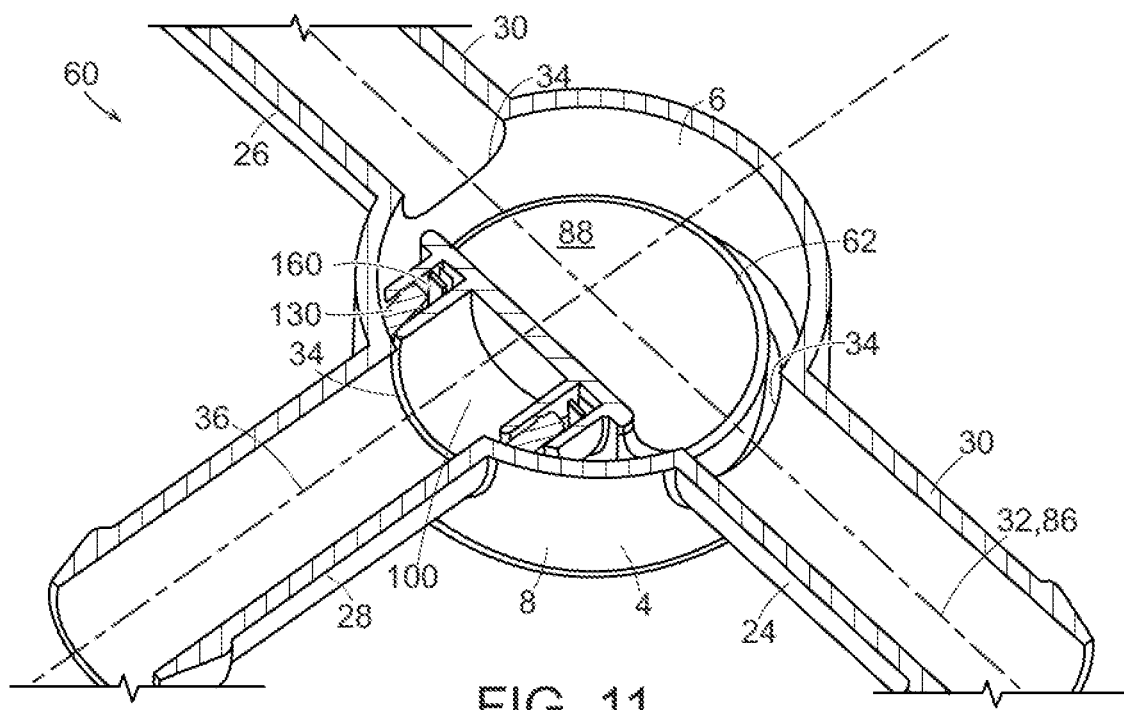
FIG. 11 is a cross sectional view of the fluid valve as seen along line 11-11 of FIG. 1.

Referring to FIGS. 10-11, in use, the orientation of the plug assembly 60 within the valve body 4 controls the fluid flow through the valve ports 24, 26, 28. For example, in some operating conditions, the plug assembly 60 may be disposed in the valve body 4 in such a way that the first plug transverse axis 86 is aligned with the first valve body transverse axis 32. As a result, the first groove 84 is aligned with the first and second valve ports 24, 26 and provides a portion of the fluid passage 88 that extends between the first and second valve ports 24, 26, whereby the first and second valve ports are open. In this orientation, the blind hole 100 is aligned with the third valve port 28. When the blind hole 100 is aligned with the third valve port 28, the seal 130 surrounds the opening 34 associated with the third valve port 28, and forms a fluid-tight seal with both the valve body 4 and the plug 62. As a result, the third valve port 28 is closed. In addition, the seal 130 segregates the valve plug chamber 6 into a first chamber 38 that generally borders an outer surface of the seal 130 and a second chamber 40 that generally borders an inner surface of the seal 130. The seal 130 provides a fluid-tight seal between the first chamber 38 and the second chamber 40, which are discussed below with respect to FIGS. 12A and 13A.

The seal 130 utilizes the fluid pressure within the fluid valve 2 to provide the fluid-tight seal between the valve plug 62 and the valve body 4. In particular, the fluid-tight seal is achieved when there is a pressure differential between the fluid in the first chamber 38 and the fluid in the second chamber 40. In addition, the borders of the first chamber 38 and the second chamber 40 vary, and depend on valve operating conditions including valve plug orientation and fluid pressure differentials, as discussed further below.

Referring to FIGS. 12A-14, there is a pressure differential across the seal 130 in certain valve operating conditions. When there is a pressure differential across the seal 130, the seal 130 is sufficiently elastic to radially expand or contract within the second groove 106 depending on the pressure differential. During contraction of the seal 130 (FIGS. 12A and 12B), the seal diameter decreases and the inner circumferential bead 146 of the seal 130 forms a fluid-tight seal with the second groove inner wall 108. During expansion of the seal 130 (FIGS. 13A and 13B), the seal diameter increases and the outer circumferential bead 140 of the seal 130 forms a fluid-tight seal with the second groove outer wall 112.

Figure 12A:
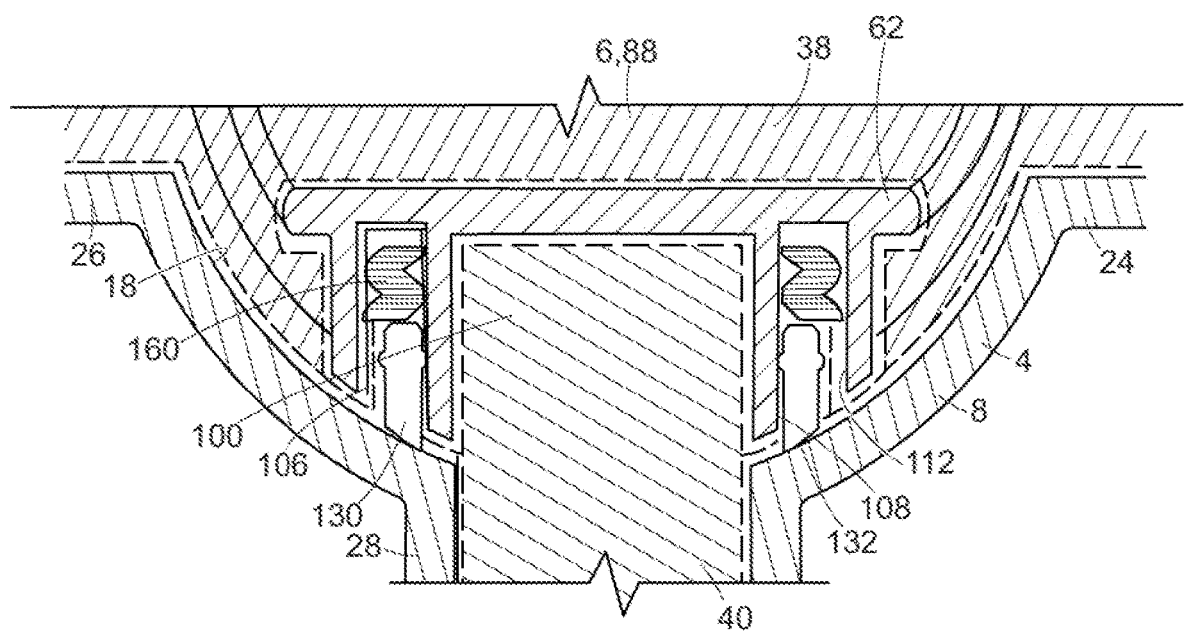
FIG. 12A is a cross-sectional view of a portion of the fluid valve showing the seal in a contracted configuration. In the contracted configuration, the seal segregates the valve plug chamber into the first chamber (represented using a first cross hatch), and the second chamber (represented using a second cross hatch).

During contraction of the seal 130, the seal inner circumferential bead 146 segregates the valve plug chamber 6 into the first chamber 38 and the second chamber 40 (FIG. 12A). In this case, the first chamber 38 includes the volume defined by the fluid passage 88 and the gap g. In addition, the first chamber 38 includes the volume of the second groove 106 defined between the seal inner circumferential bead 146, the seal outer surface 136, the second groove blind end 114 and the second groove outer wall 112. The second chamber 40 includes the volume defined by the blind hole 100 and the volume of the second groove 106 defined between the seal inner circumferential bead 146, the seal inner surface 138 and the second groove inner wall 108.

Figure 13A:
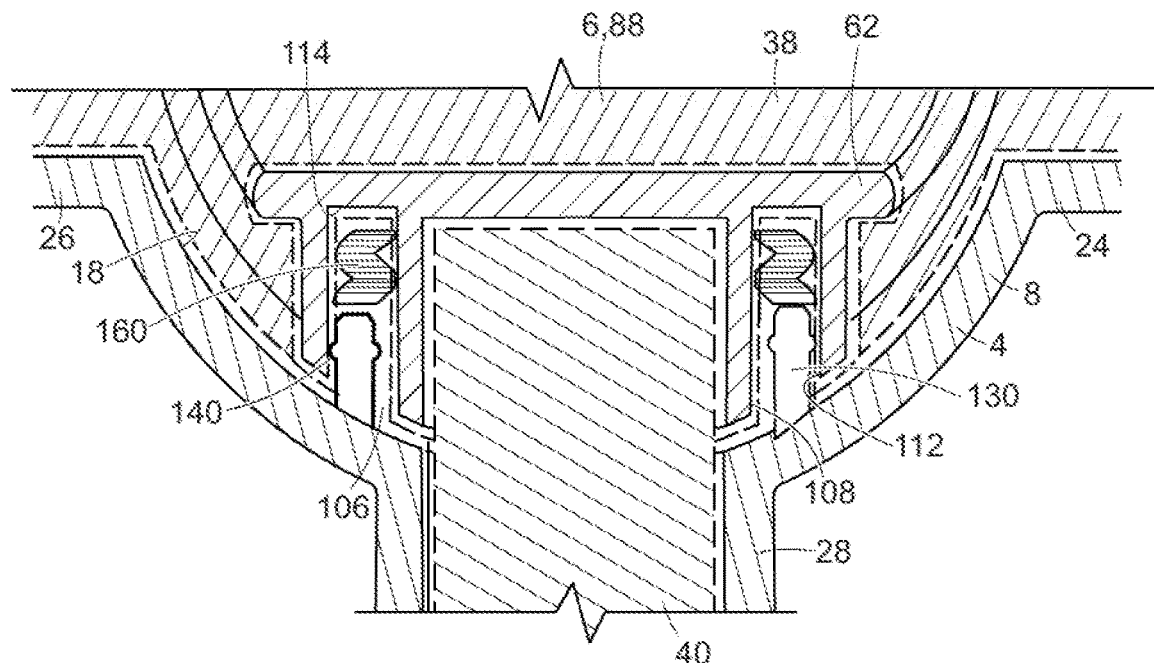
FIG. 13A is a cross-sectional view of a portion of the fluid valve showing the seal in an expanded configuration. In the expanded configuration, the seal segregates the valve plug chamber into the first chamber (represented using a first cross hatch), and the second chamber (represented using a second cross hatch).

During expansion of the seal 130, the seal outer circumferential bead 140 segregates the valve plug chamber 6 into the first chamber 38 and the second chamber 40 (FIG. 13A). In this case, the first chamber 38 includes the fluid passage 88 and the gap g. In addition, the first chamber 38 includes the volume of the second groove 106 defined between the seal outer circumferential bead 140, the seal outer surface 136, and the second groove outer wall 112. The second chamber 40 includes the volume defined by the blind hole 100. In addition, the second chamber 40 includes the volume of the second groove 106 defined between the seal outer circumferential bead 140, the seal inner surface 138, the second groove blind end 114 and the second groove inner wall 108.

Figure 12B:
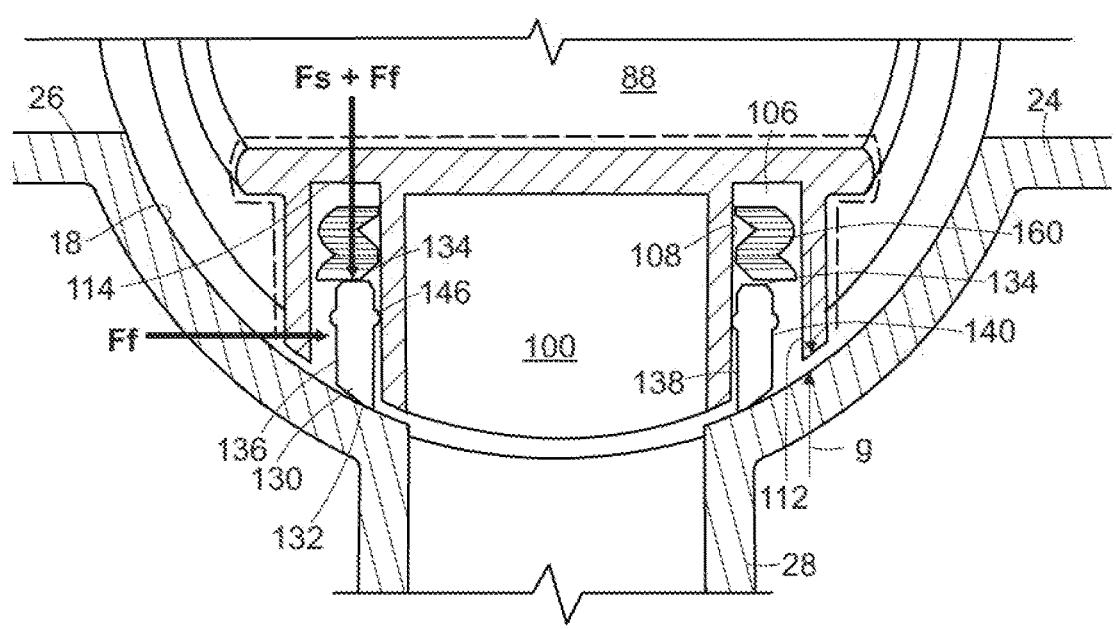
FIG. 12B is a cross-sectional view of a portion of the fluid valve showing the seal in the contracted configuration and illustrating the forces on the seal in the contracted configuration.

When the plug assembly 60 is oriented relative to the valve body 4 so that the fluid passage 88 is aligned with, and extends between, the first and second valve ports 24, 26, the first and second valve ports 24, 26 are open and the third valve port 28 is closed. In this configuration, the first chamber 38 has a higher pressure than the second chamber 40. When a fluid pressure in the first chamber 38 is greater than the fluid pressure within the second chamber 40, the relatively higher pressure fluid that enters the second groove 106 from the first chamber 38 provides a fluid force Ff that is directed against the seal outer surface 136 in a direction perpendicular to, and toward, the second plug transverse axis 90. As a result of the inward fluid force Ff, the seal 130 radially contracts so that the seal inner circumferential bead 146 contacts the groove inner wall 108 and forms a fluid-tight seal with the groove inner wall 108 (FIG. 12B). At the same time, the seal 130 is directed against the valve body 4 by the elastic member 160 (Fs) and by the force of fluid that is present between the seal second end 134 and the second groove blind end 114 (Ff), where the force of the fluid Ff against the seal second end 134 is greater than the spring force Fs against the seal second end 134. As a result, a fluid-tight seal is provided between the seal first end 132 and the valve body inner surface 18.

Figure 13B:
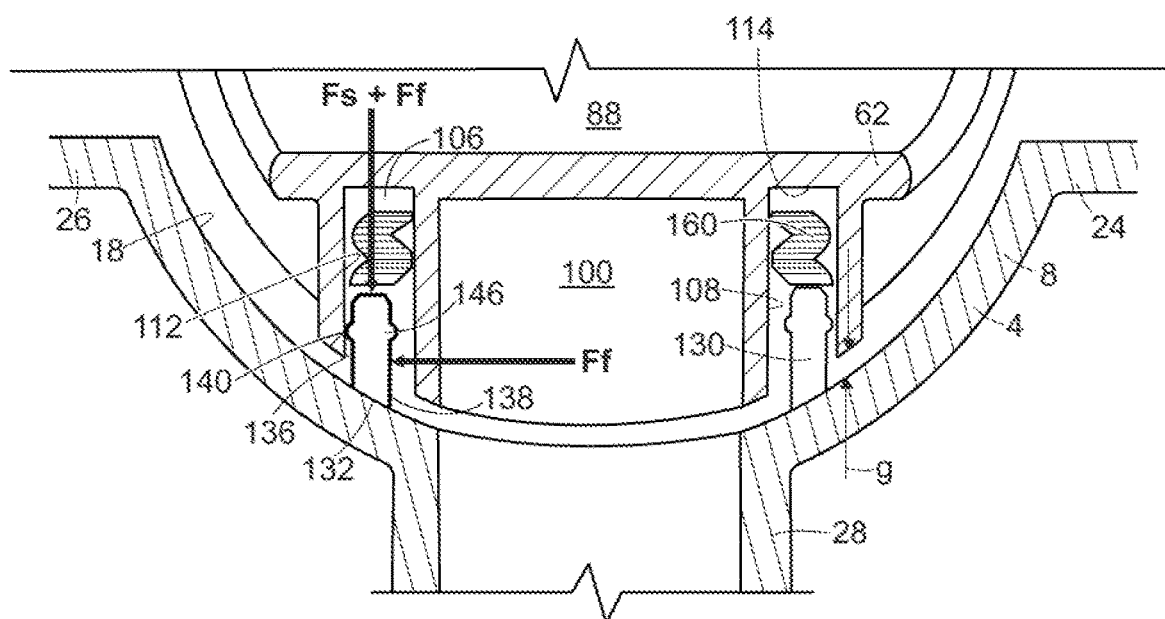
FIG. 13B is a cross-sectional view of a portion of the fluid valve showing the seal in the expanded configuration and illustrating the forces on the seal in the expanded configuration.

When a fluid pressure in the first chamber 38 is less than the fluid pressure within the second chamber 40, the relatively higher pressure fluid that enters the second groove 106 from the second chamber 40 provides a fluid force Ff that is directed against the seal inner surface 138 in a direction perpendicular to, and away from, the second plug transverse axis 90. As a result of the outward fluid force Ff, the seal 130 radially expands so that the seal outer circumferential bead 140 contacts the groove outer wall 112 and forms a fluid-tight seal with the groove outer wall 112 (FIG. 13B). At the same time, the seal 130 is directed against the valve body 4 by the elastic member 160, and by the force of fluid that is present between the seal second end 134 and the second groove blind end 114 (Ff), where the force of the fluid Ff against the seal second end 134 is greater than the spring force Fs against the seal second end 134. As a result, a fluid-tight seal is provided between the seal first end 132 and the valve body inner surface 18.

Figure 14:
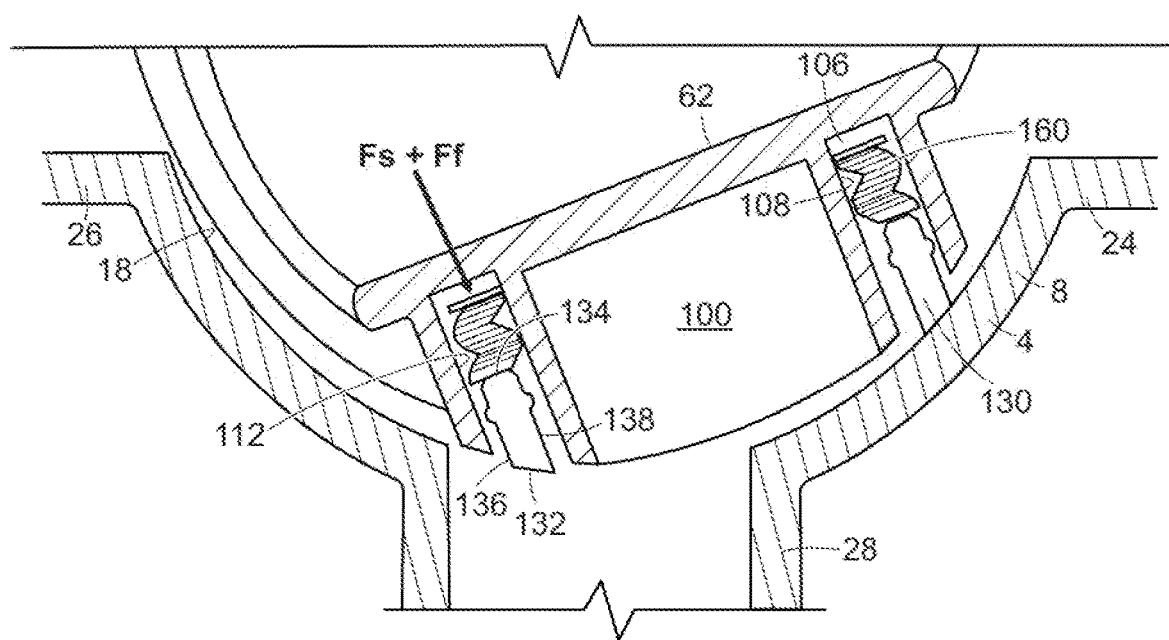
FIG. 14 is a cross-sectional view of a portion of the fluid valve showing the seal in a neutral (e.g., at rest) configuration corresponding to a common fluid pressure in the first fluid chamber and in the second fluid chamber.

In use, a condition in which there is no pressure differential across the fluid valve 2 occurs when the plug assembly 60 is in a partially open position (FIG. 14). In the partially open position, the plug assembly 60 is oriented relative to the valve body 4 such that first and second plug transverse axes 86, 90 are not aligned with the first and second valve body transverse axes 32, 36 (e.g., are not aligned with the valve ports 24, 26, 28). This occurs, for example, when the valve ports 24, 26, 28 are transitioned between an open state and a closed state.

The seal 130 is dimensioned so that when the seal 130 is free of external forces, the seal inner diameter d1 is greater than a diameter of the groove inner wall 108 (e.g., greater than a diameter of the tubular protrusion 94) and the seal outer diameter d2 is less than a diameter of the groove outer wall 112 (e.g., less than a diameter of the sleeve 110). As a result, when there is no pressure differential across the fluid valve 2, the seal 130 generally floats within the second groove 106, and spacing may exist between the seal 130 and one or both of the groove inner wall 108 and groove outer wall 112. In this state, elastic member 160 continues to direct the seal 130 against the valve body inner surface 18 so that fluid is directed into the second groove 106 and is present between the seal second end 134 and the second groove blind end 114. The fluid that is present between the seal second end 134 and the second groove blind end 114 may also contribute to directing the seal 130 against the valve body inner surface 18. As the plug assembly 60 is rotated to an orientation in which the blind hole 100 is aligned with one of the valve ports 24, 26, 28, a pressure differential across the fluid valve 2 is developed and the fluid disposed in the second groove 106 facilitates formation of the fluid-tight seal, as described above with respect to FIGS. 12A-13B.

Figure 15:
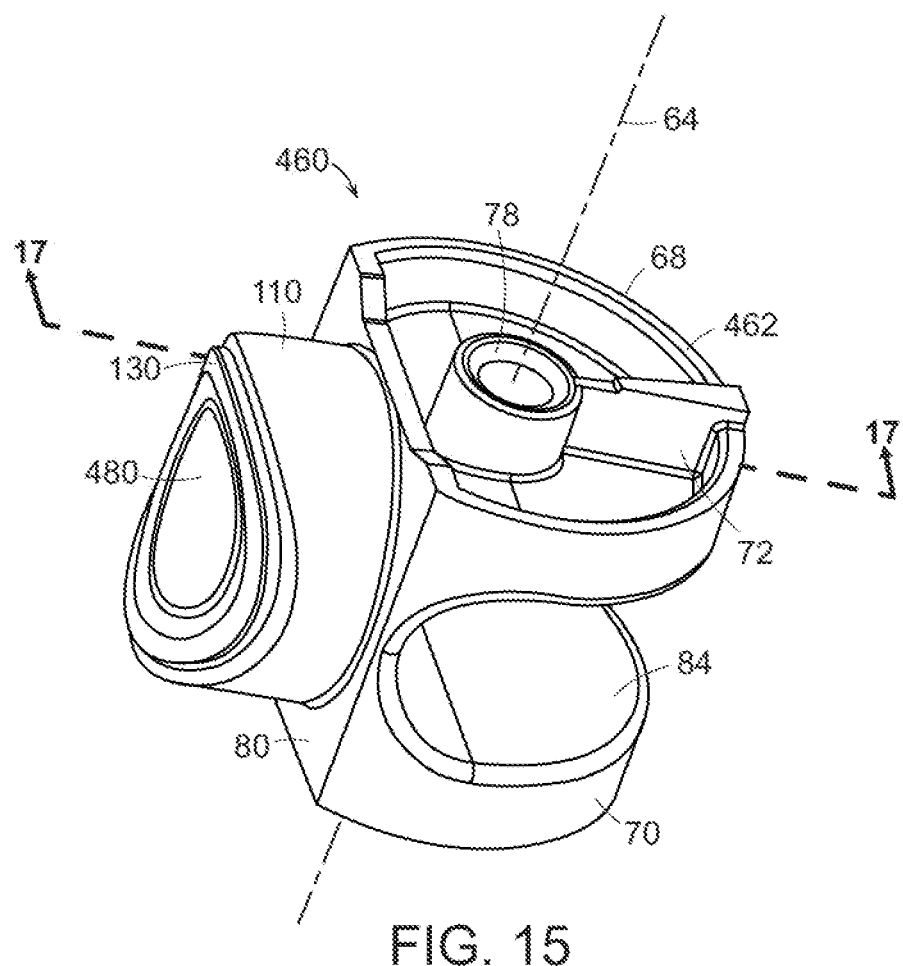
FIG. 15 is a bottom perspective view of an alternative embodiment plug assembly.
Figure 16:
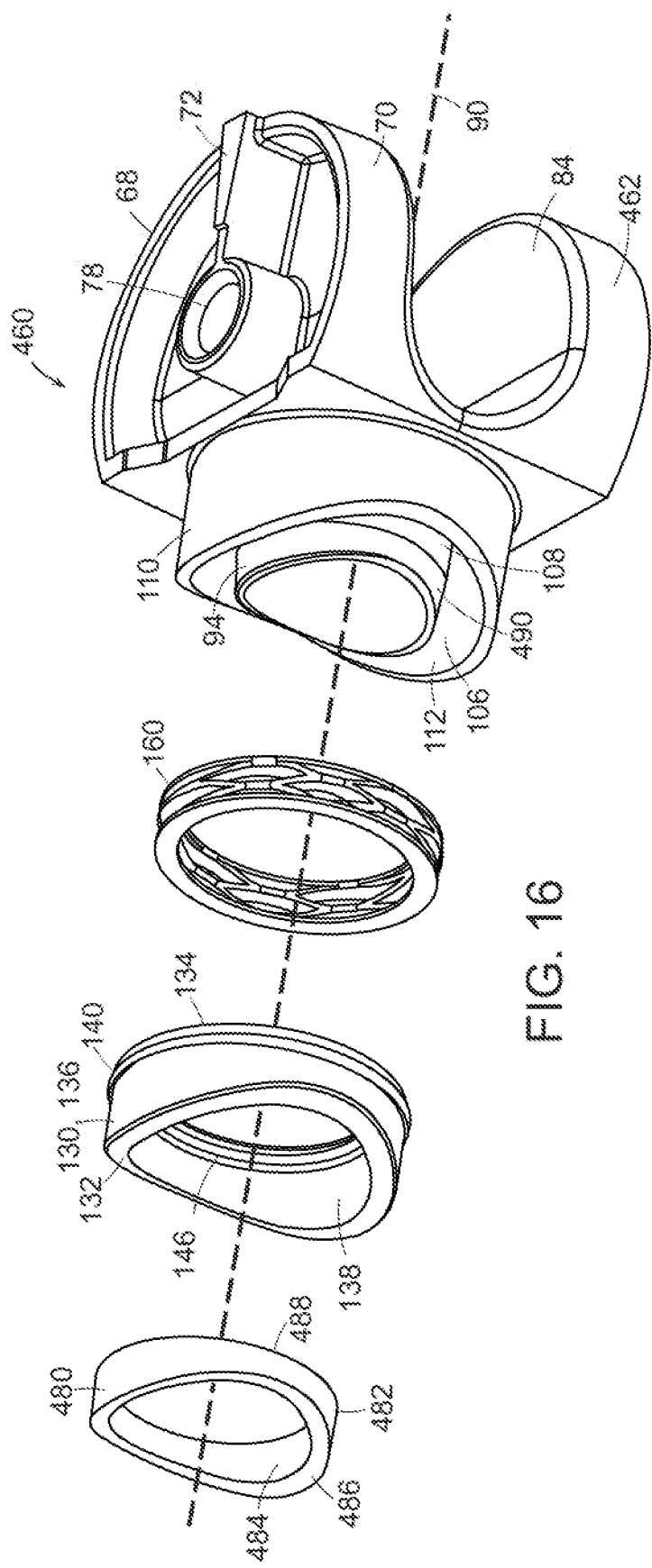
FIG. 16 is an exploded view of the plug assembly of FIG. 15.
Figure 17:
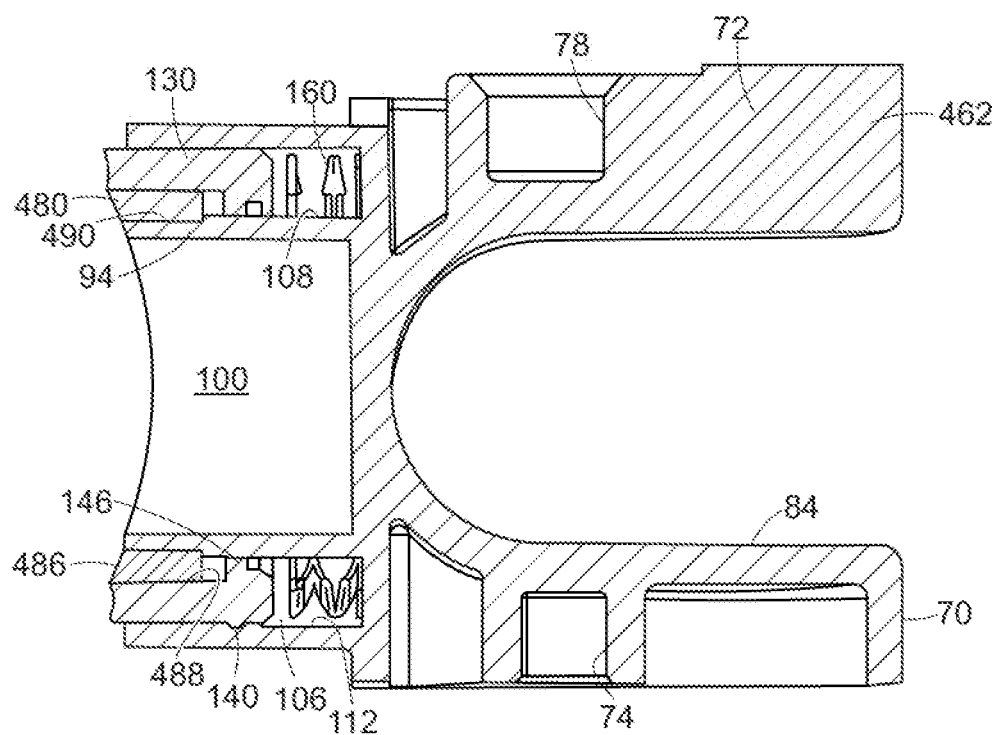
FIG. 17 is a cross-sectional view of the of the plug assembly of FIG. 15 as seen along line 17-17 of FIG. 15.
Figure 20:
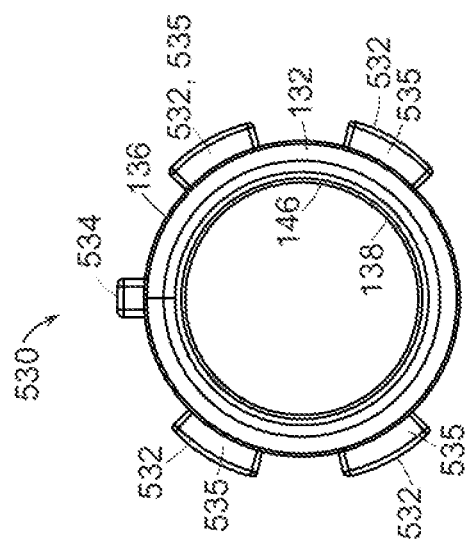
FIG. 20 is an end view of the seal of FIG. 19.
Figure 19:
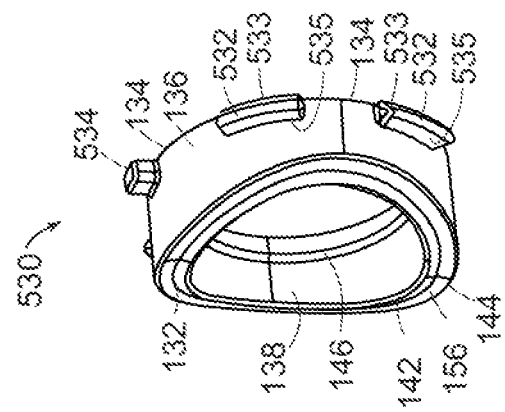
FIG. 19 is a perspective view of an alternative embodiment seal.
Figure 18:
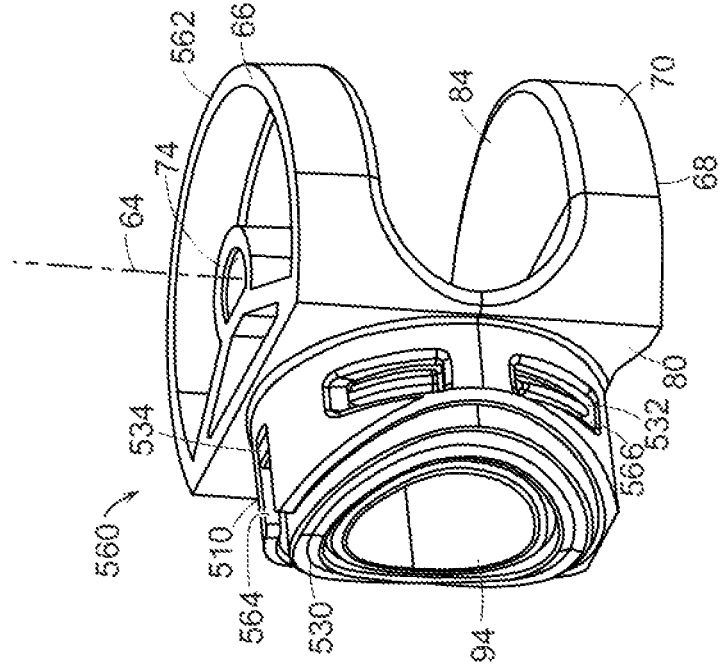
FIG. 18 is a top perspective view of another alternative embodiment plug assembly.
Figure 21:
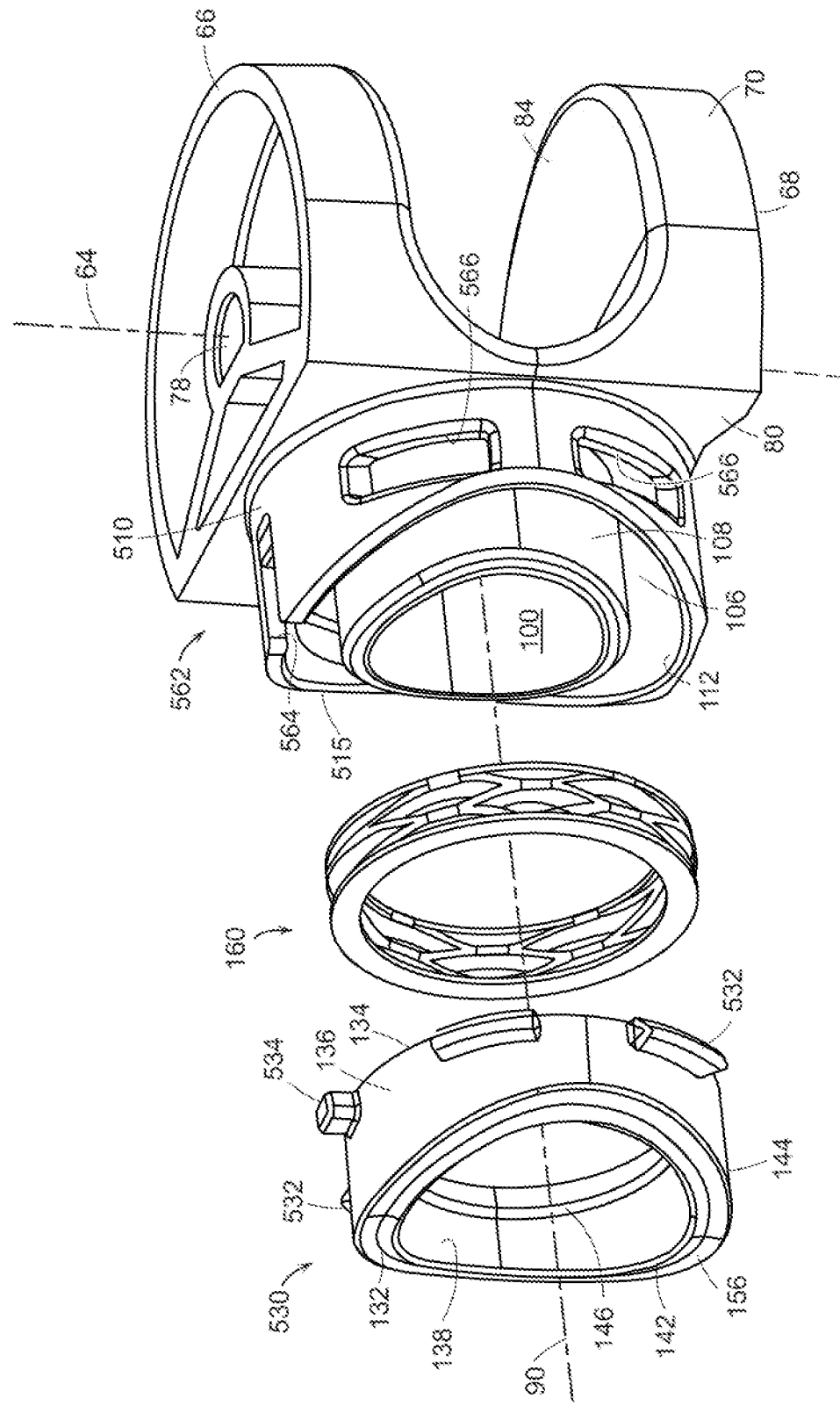
FIG. 21 is an exploded view of the plug assembly of FIG. 18.
Figure 22:
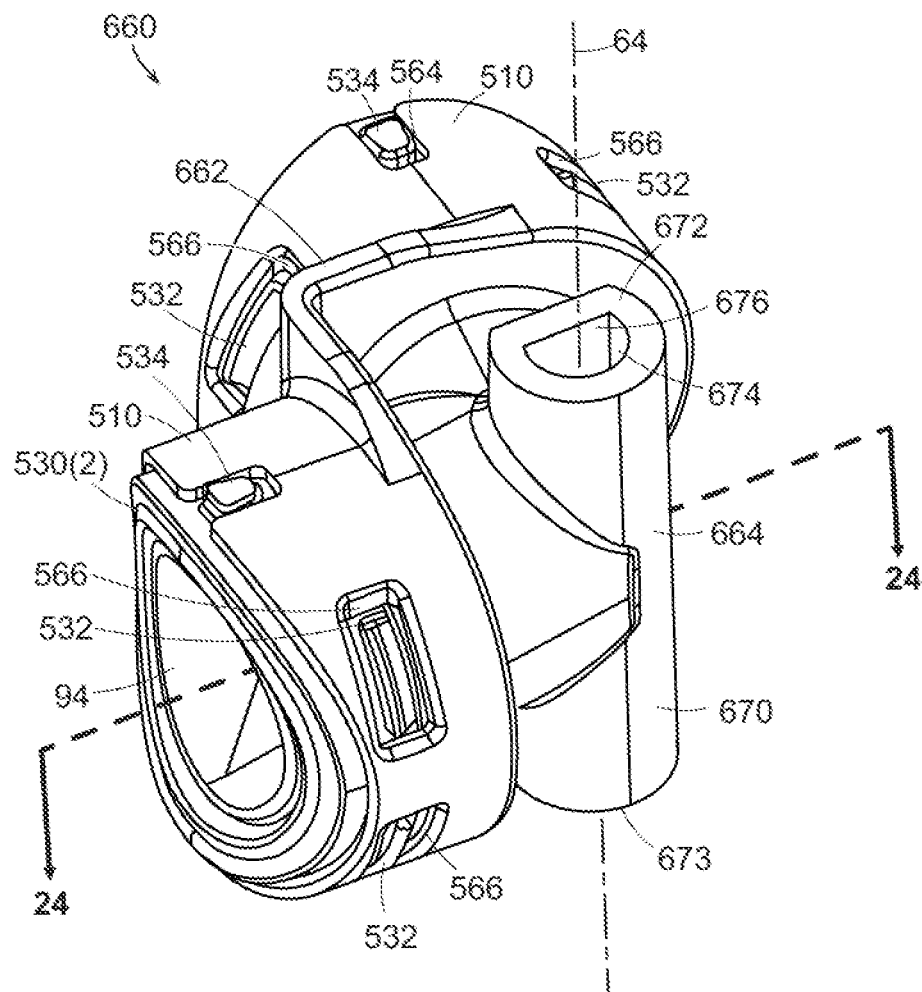
FIG. 22 is a top perspective view of another alternative embodiment plug assembly that employs the seal of FIG. 19.
Figure 23:
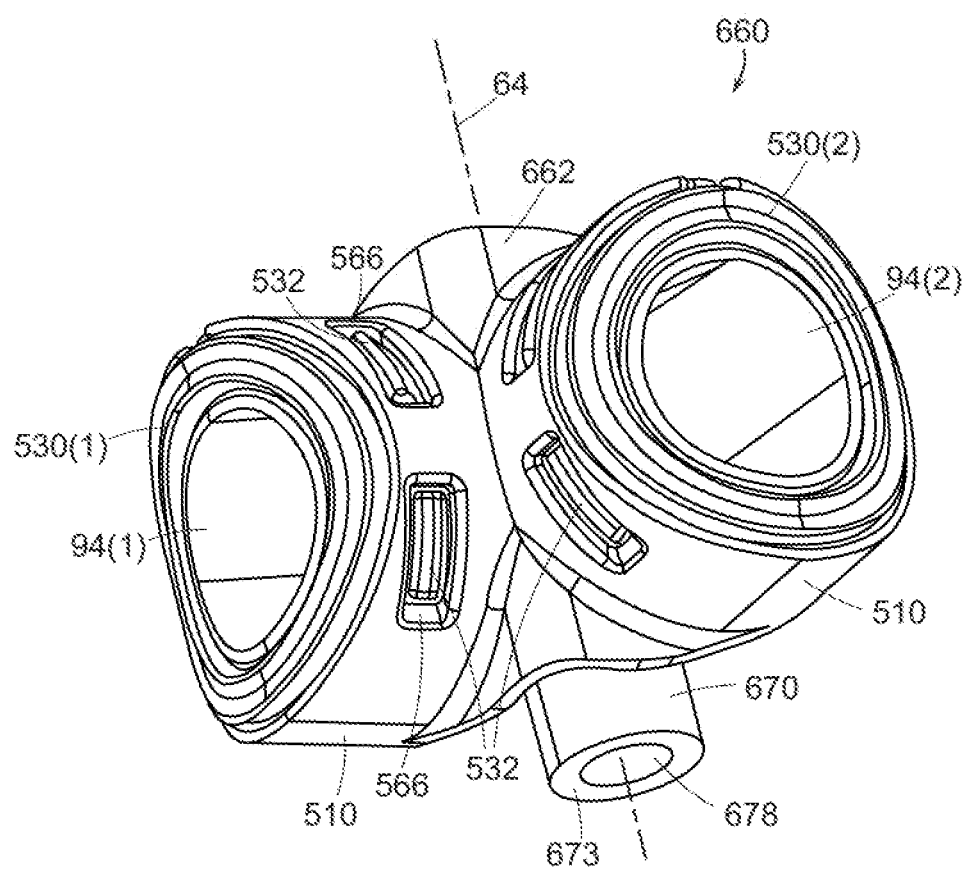
FIG. 23 is a bottom perspective view of the plug assembly of FIG. 22.
Figure 24:
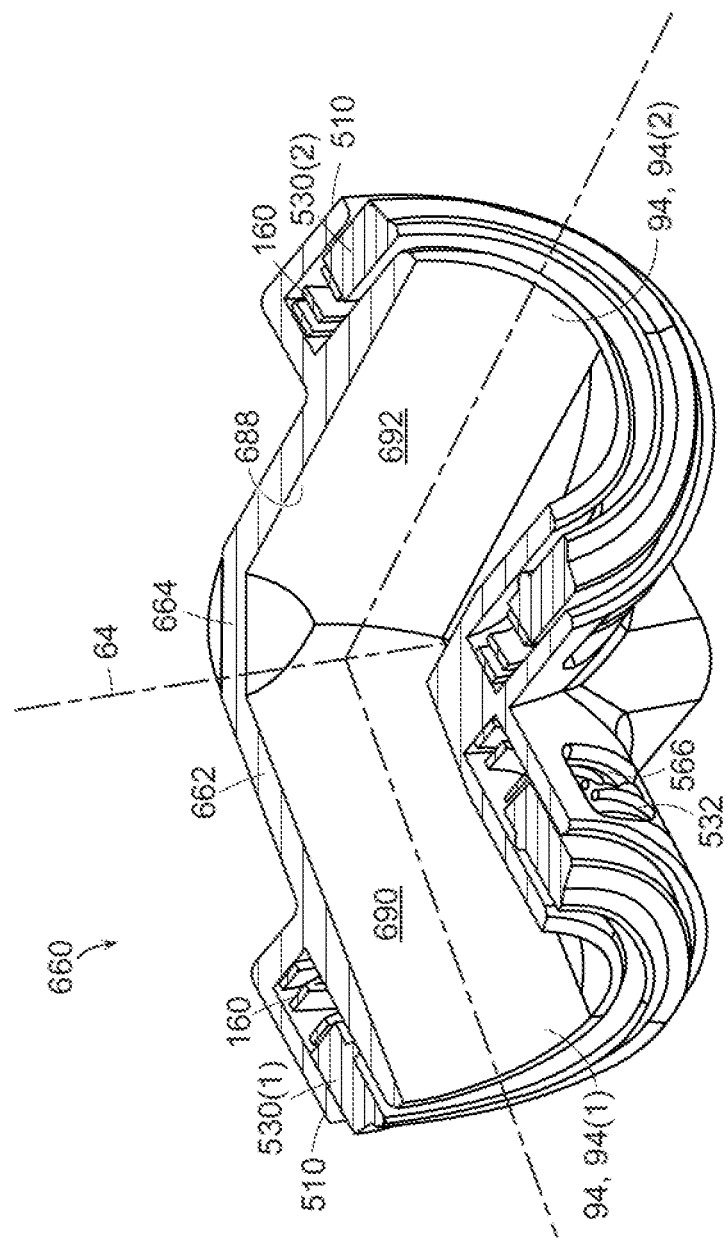
FIG. 24 is a cross-sectional view of the plug assembly of FIG. 22 as seen along line 24-24 of FIG. 22.
Figure 25:
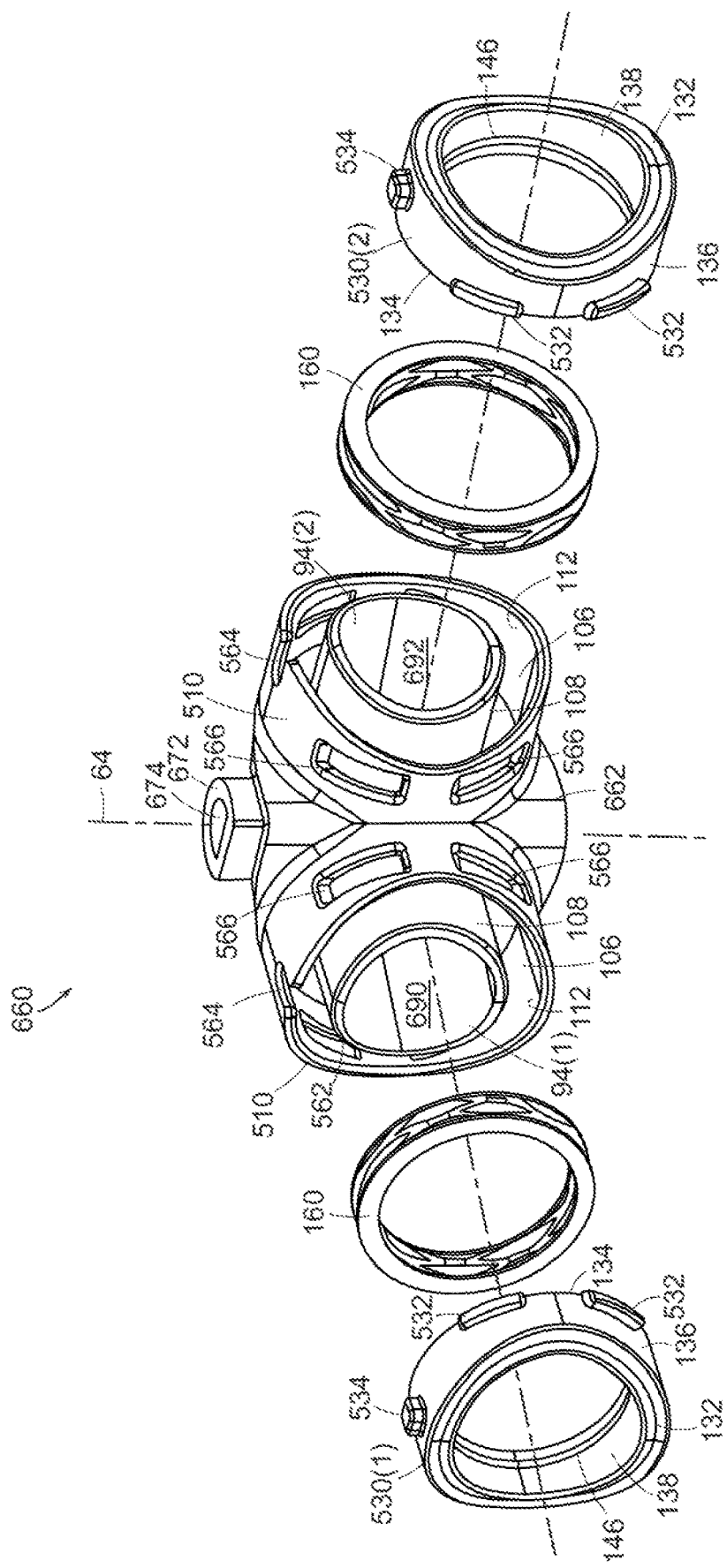
FIG. 25 is an exploded view of the plug assembly of FIG. 22.

Referring to FIGS. 15-17, in some embodiments, the fluid valve 2 may include an alternative embodiment plug assembly 460. The plug assembly 460 illustrated in FIGS. 15-17 is similar to the plug assembly 60 illustrated in FIGS. 1-14, and elements common to both embodiments are referred to with common reference numbers. The plug assembly 460 illustrated in FIGS. 15-17 differs from the earlier-described embodiment in that it includes a rigid retention ring 480 that is configured to retain the seal 130 in the second groove 106. The retention ring 480 includes a first end 486 that faces the valve body sidewall 8, and an opposed second end 488 that faces the plug 462. The retention ring first end 486 is angled relative to the second plug transverse axis 90 so as to form a continuous surface between valve body-facing ends of the tubular protrusion 94 and the seal 130. An outer surface 482 of the retention ring 480 has a tolerance fit with the seal inner surface 138. In addition, an inner surface 484 of the retention ring 480 is received in, and has an interference fit with, an annular cut out 490 provided in the groove inner wall 108. The thickness of the retention ring 480 is greater than the depth of the cut out 490, whereby the retention ring 480 protrudes radially outward relative to the surface of the second groove inner wall 108. As a result, the retention ring second end 488 may engage the seal inner circumferential bead 146 and limit displacement of the seal 130 toward the valve body inner surface 18.

Referring to FIGS. 18-21, in some embodiments, the fluid valve 2 may include another alternative embodiment plug assembly 560 that includes an alternative embodiment plug 562, the elastic member 160 and an alternative embodiment seal 530 that is carried in the second groove 106 provided in the plug 562. The plug assembly 560 illustrated in FIGS. 18-21 is similar to the plug assembly 60 illustrated in FIGS. 1-14, and elements common to both embodiments are referred to with common reference numbers. The plug assembly 560 illustrated in FIGS. 18-21 differs from the plug assembly 60 illustrated in FIGS. 1-14 in that the plug 562 and the seal 530 include features that serve to retain the seal 530 within the second groove 106 of the plug 562. In particular, a surface (e.g., the outer wall 112) of the second groove 106 includes first retaining structures such as one or more latch-receiving through openings 566. In addition, the seal 530 includes second retaining structure such as one or more protruding latches 532, where the number of latches 532 provided on the seal 530 corresponds to the number of through openings 566 provided in the second groove outer wall 112. In the illustrated embodiment, the plug assembly 560 includes four through openings 566 and four latches 532, but is not limited to this number of retaining structures. The number of retaining structures may be fewer or greater than four, and is determined by the requirements of the specific application.

The through openings 566 are elongated in a circumferential direction of the sleeve 510, and are spaced apart from each other along a circumference of the sleeve 510. In addition, the through openings 566 are spaced apart from the planar portion 80 of the valve plug side surface 70. The sleeve 510 also includes a rectangular, key-receiving cut out 564 that is provided in the valve body-facing end 515 of the sleeve 510.

The seal 530 includes the latches 532 that protrude outward from the seal outer surface 136. The latches 532 are elongated in a circumferential direction of the seal 530, and are spaced apart from each other along a circumference of the seal 530. In addition, the latches 532 are positioned on the seal outer surface 136 at the edge corresponding to the seal second end 134. Each latch 532 has a beveled surface 533 that faces the plug 562. The beveled surface 533 facilitates insertion of the seal 530 into the second groove 106 during assembly of the plug assembly. Each latch 532 has a normal surface 535 that is opposed to the beveled surface 533, and is perpendicular to the seal outer surface 136. In use, when the seal 530 is disposed in the second groove 106, the latches 532 protrude into the through openings 566 of the sleeve 510, and the normal surface 535 of each latch 532 engages an edge of the corresponding through opening 566. The engagement between the latches 532 and the through openings 566 serves to retain the seal 530 within the second groove 106, and to limit displacement of the seal 530 toward the valve body inner surface 18.

The seal 530 includes a key 534 that protrudes outward from the seal outer surface 136. The key 534 has a shape that corresponds to the shape of the key-receiving cut out 564. In the illustrated embodiment, the key 534 has the shape of a rectangular prism. The key 534 is positioned on the seal outer surface 136 at the edge corresponding to the seal second end 134. In use, when the seal 530 is disposed in the second groove 106, the key 534 is received within key-receiving cut out 564 of the sleeve 510. The engagement between the key 534 and the key-receiving cut out 564 serves to properly orient the seal 530 relative to the second groove 106 during assembly of the plug assembly.

The seal 530 illustrated in FIGS. 18-21 further differs from the seal 130 illustrated in FIGS. 1-14 in that the seal 530 does not include the annular outer circumferential bead 140. During seal expansion, the seal outer surface 136 directly contacts, and forms a fluid-tight seal with, the second groove outer wall 112.

Referring to FIGS. 22-25, in some embodiments, the fluid valve 2 may include another alternative embodiment plug assembly 660 that includes another alternative embodiment plug 662, the elastic member 160 and the seal 530 of FIGS. 18-21. The plug assembly 660 includes elements common to the previously described embodiments, and common elements are referred to with common reference numbers. The plug assembly 660 illustrated in FIGS. 22-25 differs from the previously described plug assemblies 60, 460, 560 in that the plug assembly 660 illustrated in FIGS. 22-25 includes two seals 530(1), 530(2), rather than the single seal 130 provided in the previously-described plug assemblies 60, 460.560. The plug assembly 660 of FIGS. 22-25 is suitable for use, for example, in a four port valve (not shown).

The plug 662 includes a hub 664 that supports the seals 530(1), 530(2) as discussed further below. The hub 664 includes a hollow stem 670 that is coaxial with the rotational axis 64. The first end 672 of the stem 670 includes a first recess 674 that is configured to receive, and mechanically engage with, the valve drive shaft 236. Although the first recess 674 has an inner surface that is generally cylindrical, the recess inner surface includes a flat portion 676 that faces the rotational axis 64. When the plug assembly 660 is assembled with the valve drive shaft 236, an end of the valve drive shaft 236 is disposed in the first recess 674, and the flat portion 235 provided on the valve drive shaft 236 abuts the first recess flat portion 676. When the valve drive shaft 236 is actuated by the motor 220, the engagement between the respective flat portions 676, 235 allows the valve drive shaft 236 to rotate the plug 662 about the rotational axis 64.

The second end 673 of the stem 670 includes a centrally located second recess 678 that is configured to receive the stub 12. The second recess 678 has a cylindrical inner surface that is dimensioned to receive the stub 12 in a clearance fit. The stub 12 serves as a spindle on which the plug 662 revolves.

The plug assembly 660 supports each seal 530(1), 530(2) as described above with respect to FIGS. 18-21. In particular, the seals 530(1), 530(2) each cooperate with the corresponding tubular protrusion 94(1), 94(2) and the sleeve 510 to provide valve sealing. The plug assembly 660 differs from the plug assembly 560 described above with respect to FIGS. 18-20 in that the tubular protrusions 94(1). 94(2) do not define blind holes 100, and instead each tubular protrusion 94(1). 94(2) defines a portion of a fluid passage 688 that passes through the plug 662.

In particular, the fluid passage 688 includes a first portion 690 and a second portion 692. The first portion 690 is defined in part by the tubular protrusion 94(1) of the first seal 530(1), and the second portion 692 is defined in part by the tubular protrusion 94(2) of the second seal 530(2). The first portion 690 intersects the second portion 692 at the rotational axis 64. The first portion 690 is angled relative to the second portion 692. For example, in the illustrated embodiment, the first portion 690 is perpendicular to the second portion 692, and both the first and second portions 690, 692 are perpendicular to the rotational axis 64.

The plug 662 illustrated in FIGS. 22-25 is similar to the plug 562 illustrated in FIGS. 18-21 in that each seal 530(1), 530(2) of the plug 662 includes features that serve to retain the seals 530(1), 530(2) within the second groove 106 of the plug 662. In particular, a surface (e.g., the outer wall 112) of the second groove 106 includes first retaining structures such as one or more latch-receiving through openings 566. In addition, the seals 530(1), 530(2) include second retaining structure such as one or more protruding latches 532.

The plug assembly 660 is useful in a two-port fluid valve (not shown) or a four-port fluid valve (not shown).

Figure 26:
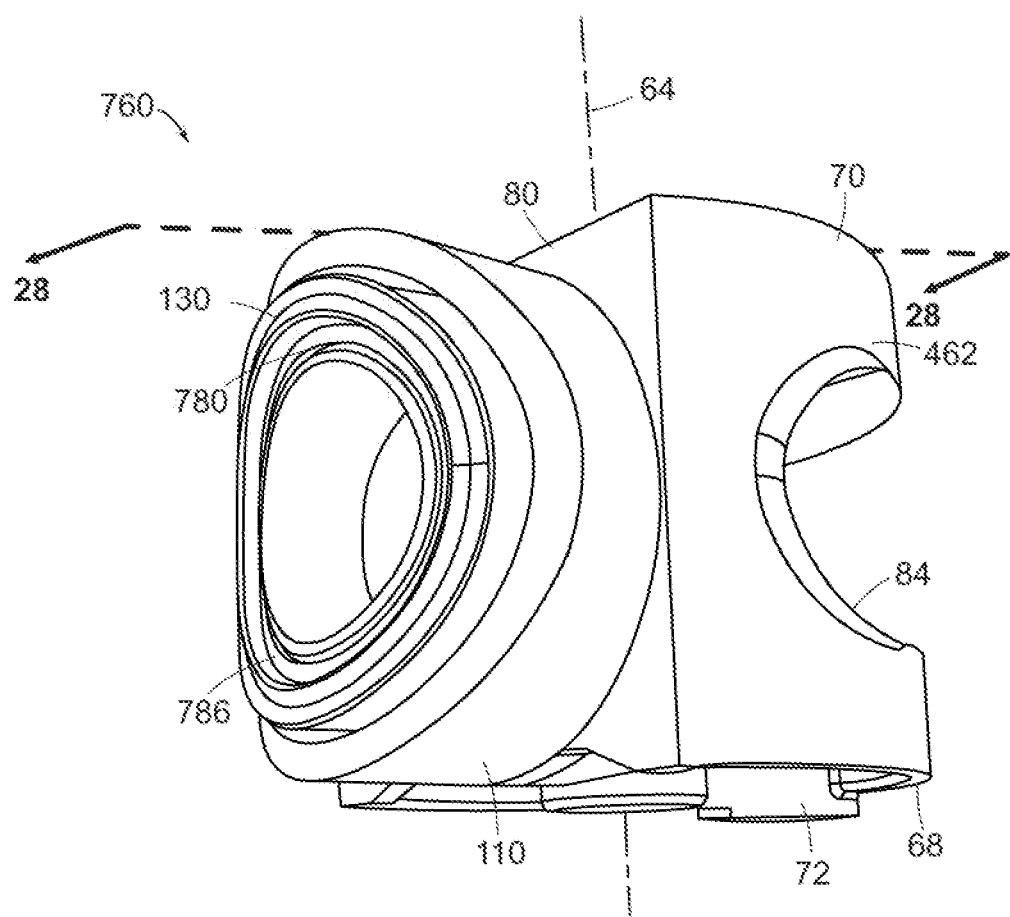
FIG. 26 is a bottom perspective view of another alternative embodiment plug assembly.
Figure 27:
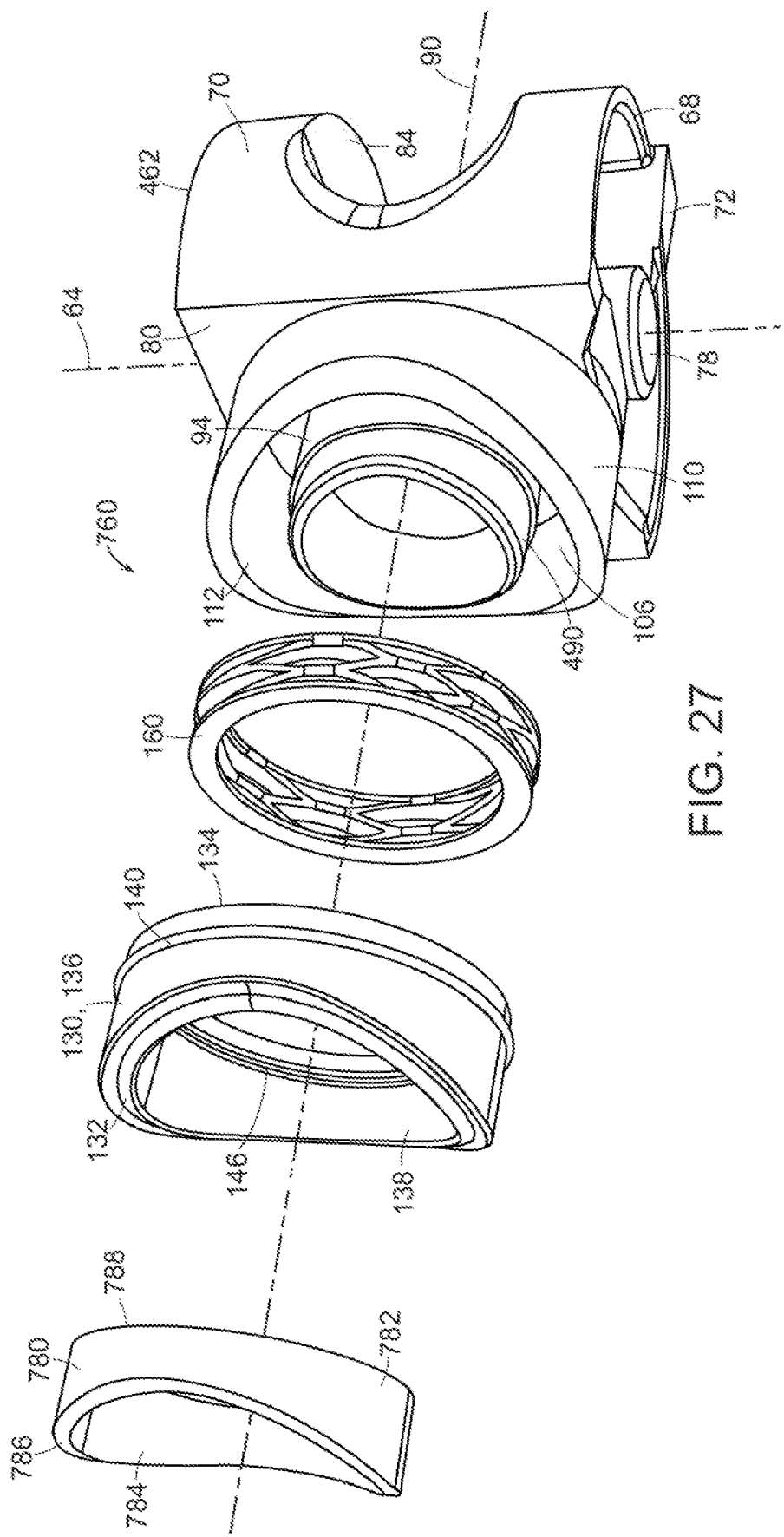
FIG. 27 is an exploded view of the plug assembly of FIG. 26.
Figure 28:
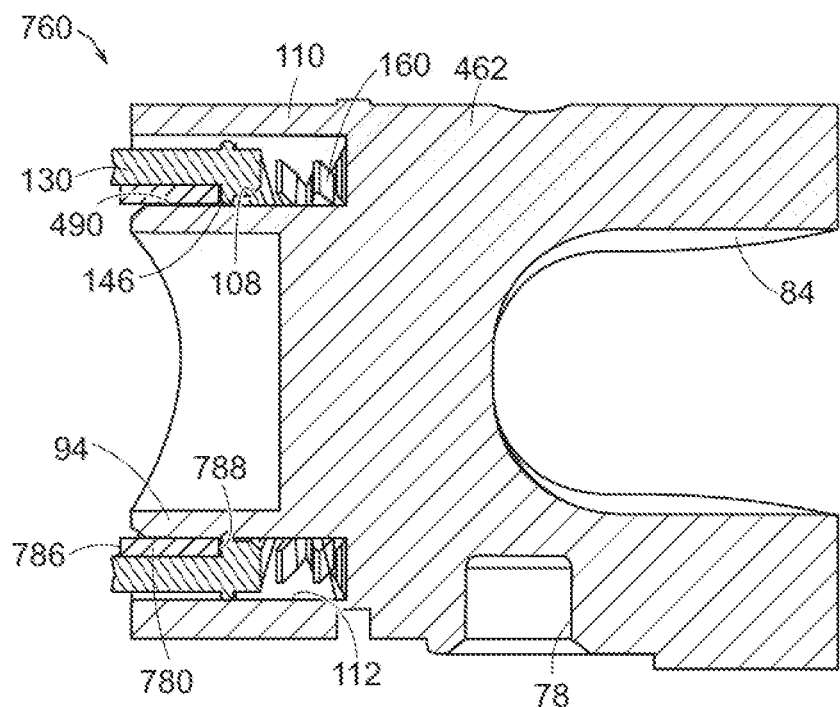
FIG. 28 is a cross-sectional view of the plug assembly of FIG. 26 as seen along line 28-28 of FIG. 26.

Referring to FIGS. 26-28, in some embodiments, the fluid valve 2 may include an alternative embodiment plug assembly 760. The plug assembly 760 illustrated in FIGS. 26-28 is similar to the plug assembly 460 illustrated in FIGS. 15-17, and elements common to both embodiments are referred to with common reference numbers. The plug assembly 760 illustrated in FIGS. 26-28 is similar to the plug assembly 460 illustrated in FIGS. 15-17 in that it includes a rigid retention ring 780 that is configured to retain the seal 130 in the second groove 106. However, the retention ring 780 has a slightly different shape than the retention ring 480. In particular, the retention ring 780 includes a first end 786 that faces the valve body sidewall 8, and an opposed second end 788 that faces the plug 462. The retention ring first end 786 is flush with the valve body-facing end of the tubular protrusion 94. In addition, the retention ring first end 786 is perpendicular to second plug transverse axis 90. Like the earlier-described retention ring 480, an outer surface 782 of the retention ring 780 has a tolerance fit with the seal inner surface 138. In addition, an inner surface 784 of the retention ring 480 is received in, and has an interference fit with, an annular cut out 490 provided in the second groove inner wall 108. The thickness of the retention ring 780 is greater than the depth of the cut out 490, whereby the retention ring 780 protrudes radially outward relative to the surface of the second groove inner wall 108. As a result, the retention ring second end 788 may engage the seal inner circumferential bead 146 and limit displacement of the seal 130 toward the valve body inner surface 18.

Figure 29:
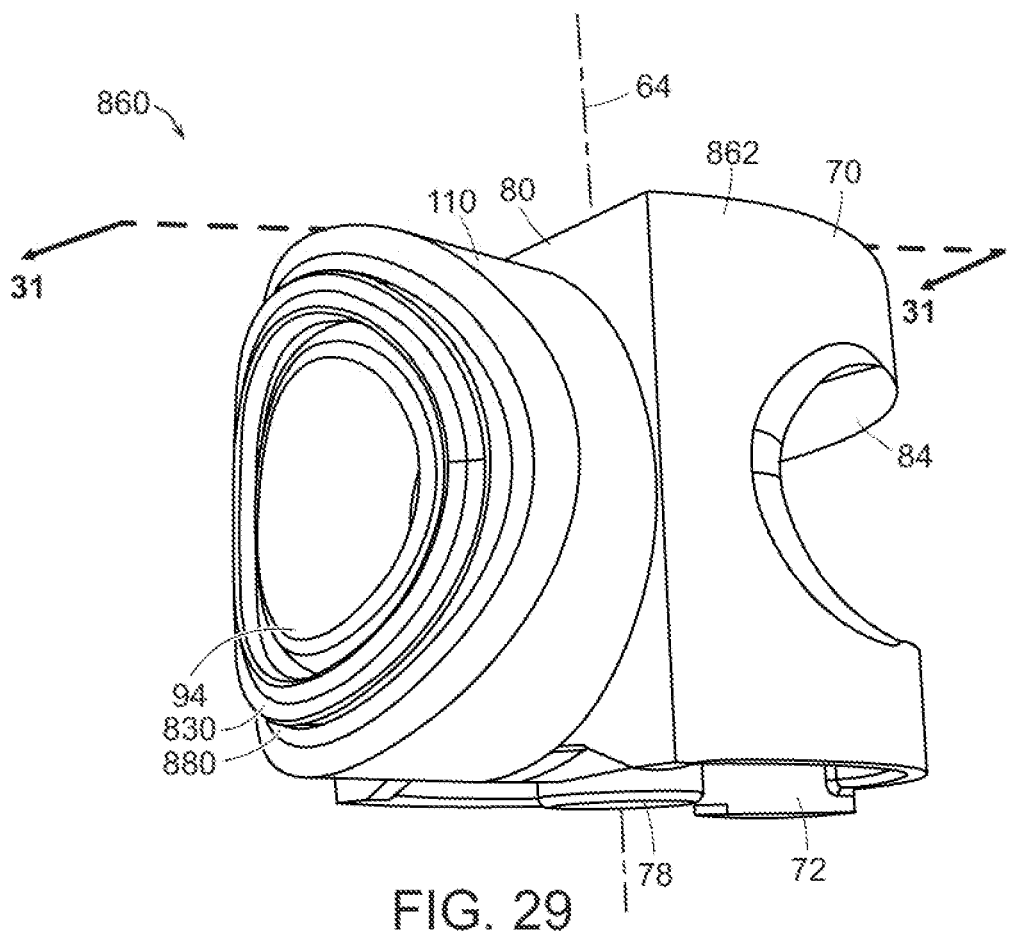
FIG. 29 is a bottom perspective view of another alternative embodiment plug assembly.
Figure 30:
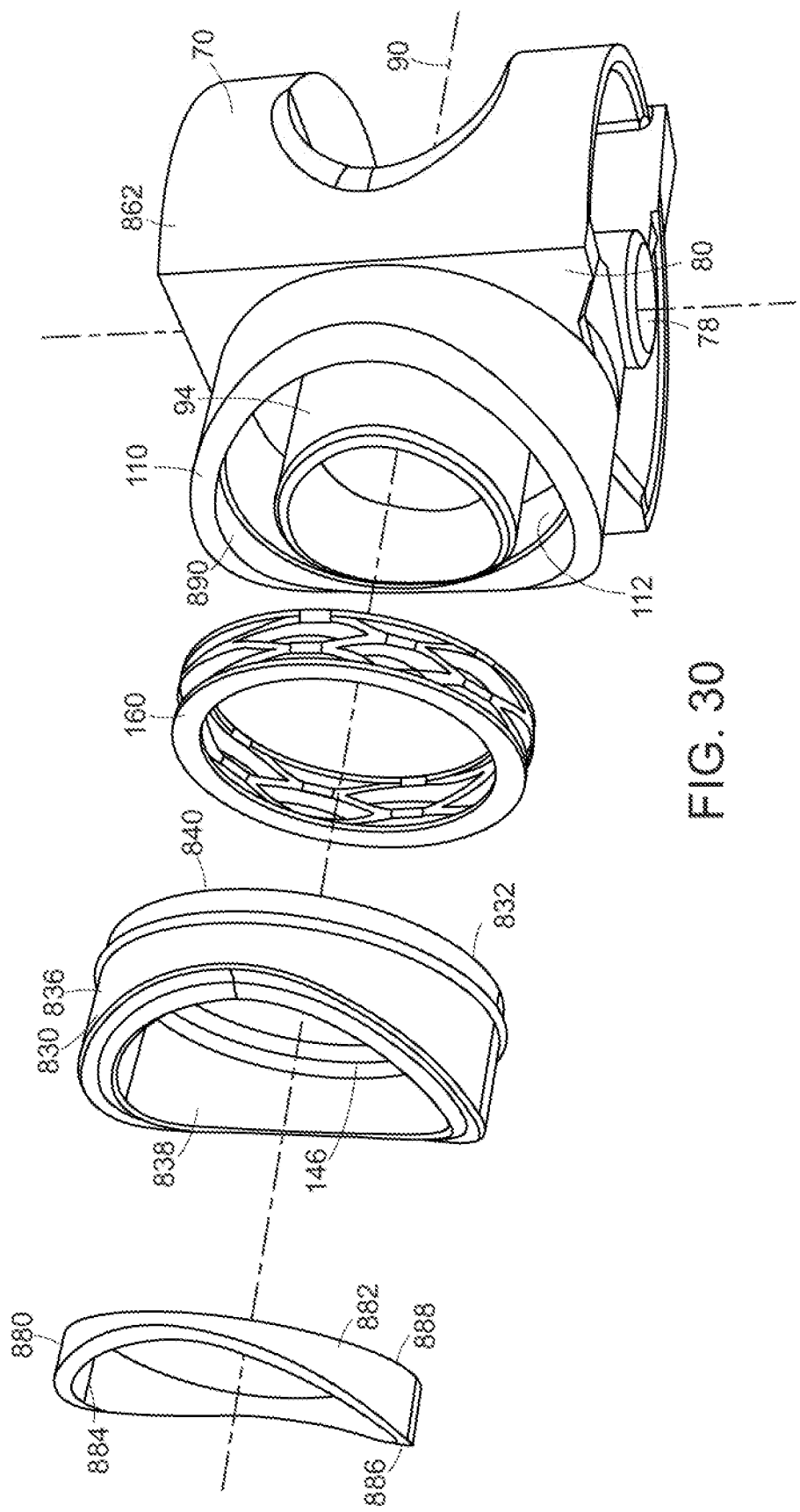
FIG. 30 is an exploded view of the plug assembly of FIG. 29.
Figure 31:
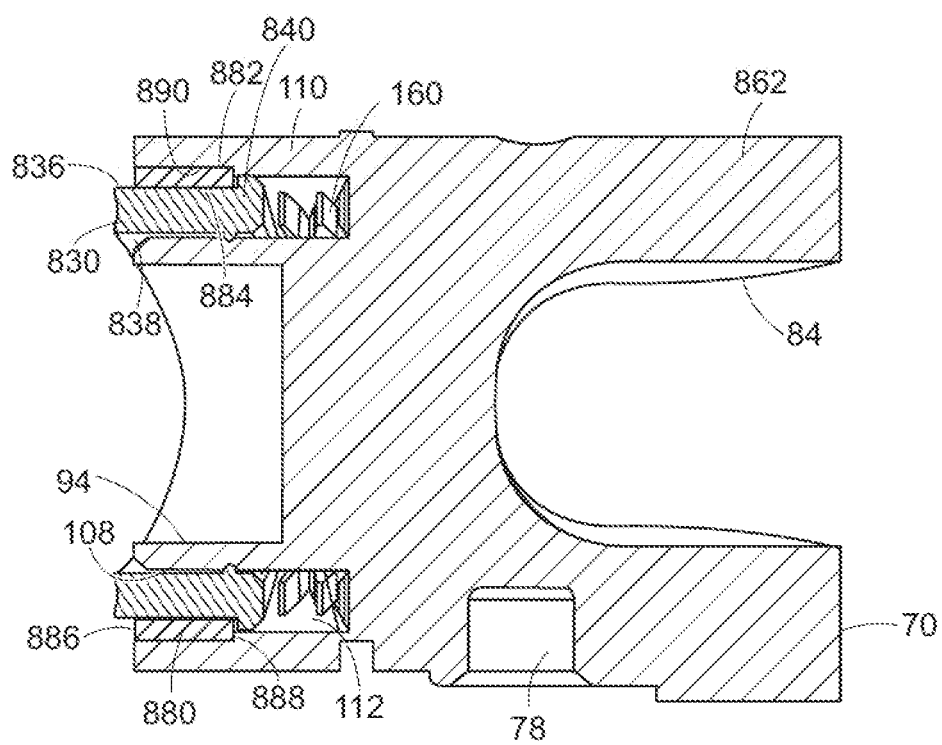
FIG. 31 is a cross-sectional view of the plug assembly of FIG. 29 as seen along line 31-31 of FIG. 29.

Referring to FIGS. 29-31, in some embodiments, the fluid valve 2 may include an alternative embodiment plug assembly 860. The plug assembly 860 illustrated in FIGS. 29-31 is similar to the plug assembly 460 illustrated in FIGS. 15-17, and elements common to both embodiments are referred to with common reference numbers. The plug assembly 860 illustrated in FIGS. 29-31 is similar to the plug assembly 460 illustrated in FIGS. 15-17 in that it includes a rigid retention ring 880 that is configured to retain the seal 830 in the second groove 106. However, the plug assembly 860 illustrated in FIGS. 29-31 differs from the plug assembly 460 illustrated in FIGS. 15-17 in that it includes an alternative embodiment seal 830, and in that the retention ring 880 surrounds an outer surface 836 of the seal 830.

In the seal 830, the outer circumferential bead 146 is omitted, and the seal outer surface 836 includes an outwardly-protruding annular flange 840. The flange 840 adjoins the seal second end 834. During seal expansion, the flange 840 directly contacts, and forms a fluid-tight seal with, the second groove outer wall 112.

The retention ring 880 includes a first end 886 that faces the valve body sidewall 8, and an opposed second end 888 that faces the plug 862. The retention ring first end 886 is flush with the valve body-facing end of the sleeve 110. In addition, the retention ring first end 886 is perpendicular to second plug transverse axis 90. An inner surface 884 of the retention ring 880 has a tolerance fit with the seal outer surface 136. In addition, an outer surface 882 of the retention ring 880 is received in, and has an interference fit with, an annular cut out 890 provided in the second groove outer wall 112. The thickness of the retention ring 880 is greater than the depth of the cut out 890, whereby the retention ring 880 protrudes radially inward relative to the second groove outer surface 118. As a result, the retention ring second end 888 may engage the flange 840 and limit displacement of the seal 130 toward the valve body inner surface 18.

Figure 32:
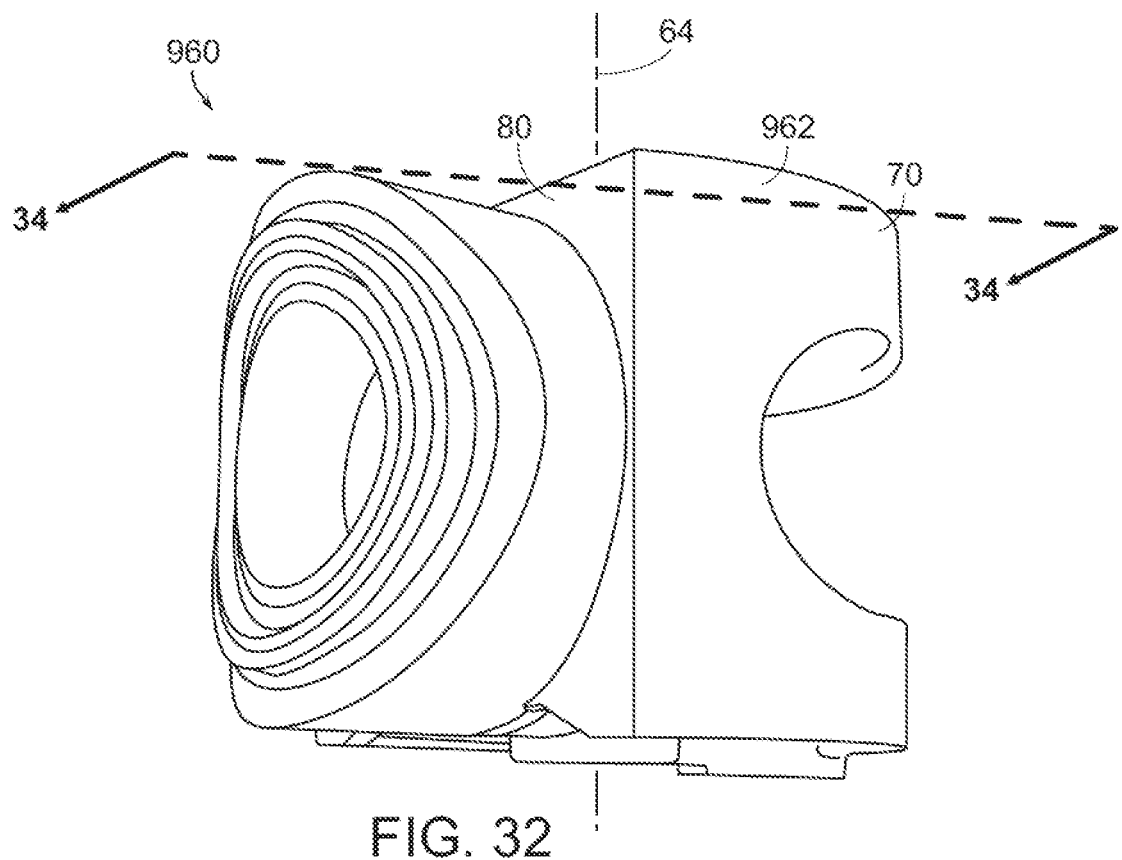
FIG. 32 is a bottom perspective view of another alternative embodiment plug assembly.
Figure 33:
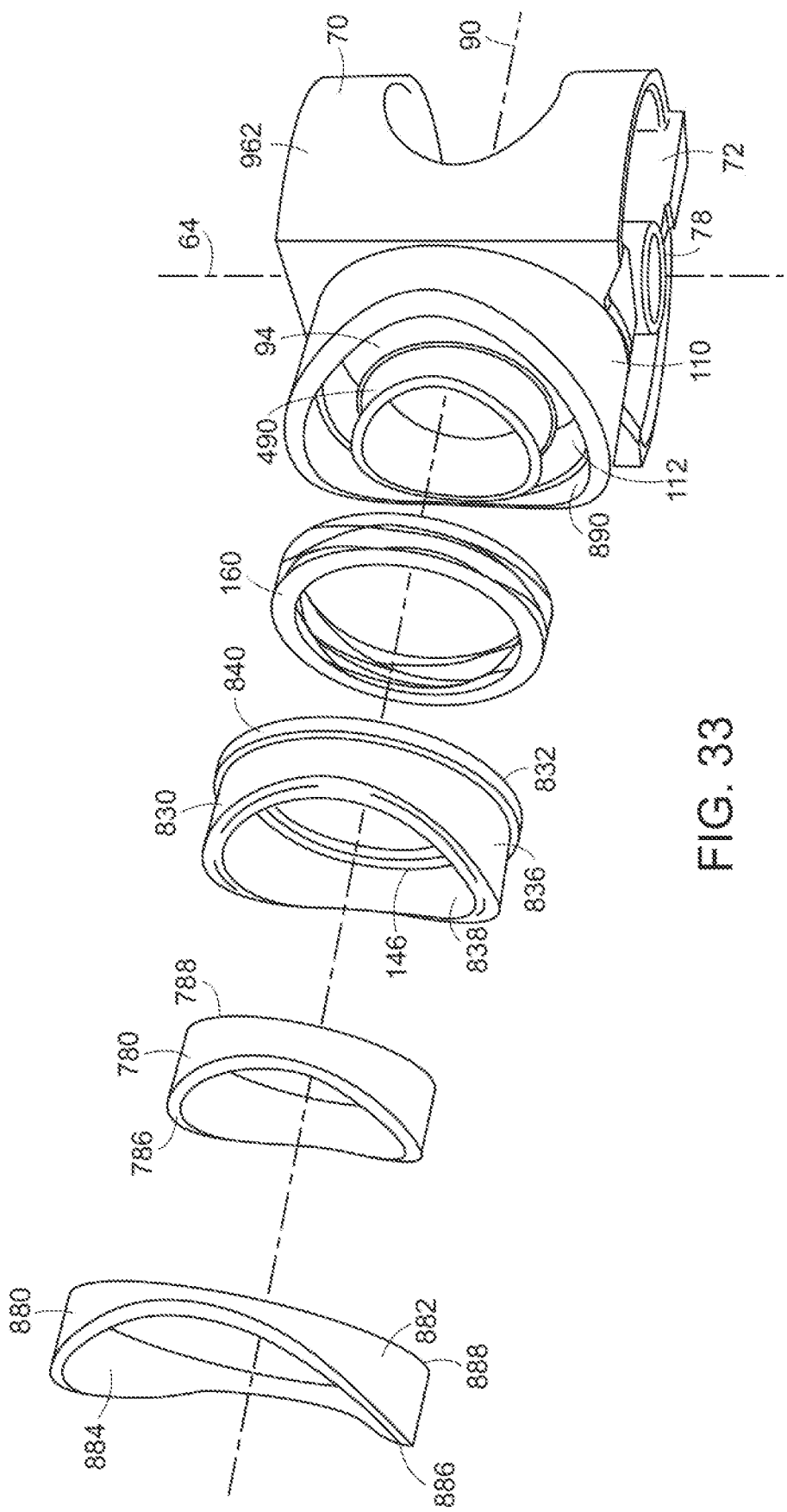
FIG. 33 is an exploded view of the plug assembly of FIG. 32.
Figure 34:
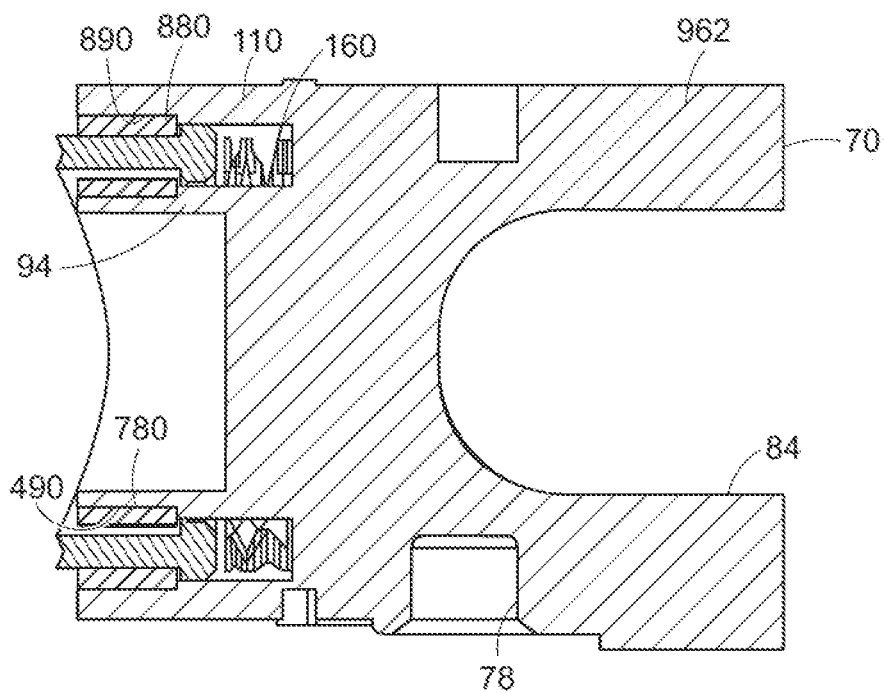
FIG. 34 is a cross-sectional view of the plug assembly of FIG. 32 as seen along line 34-34 of FIG. 32.
Figure 35:
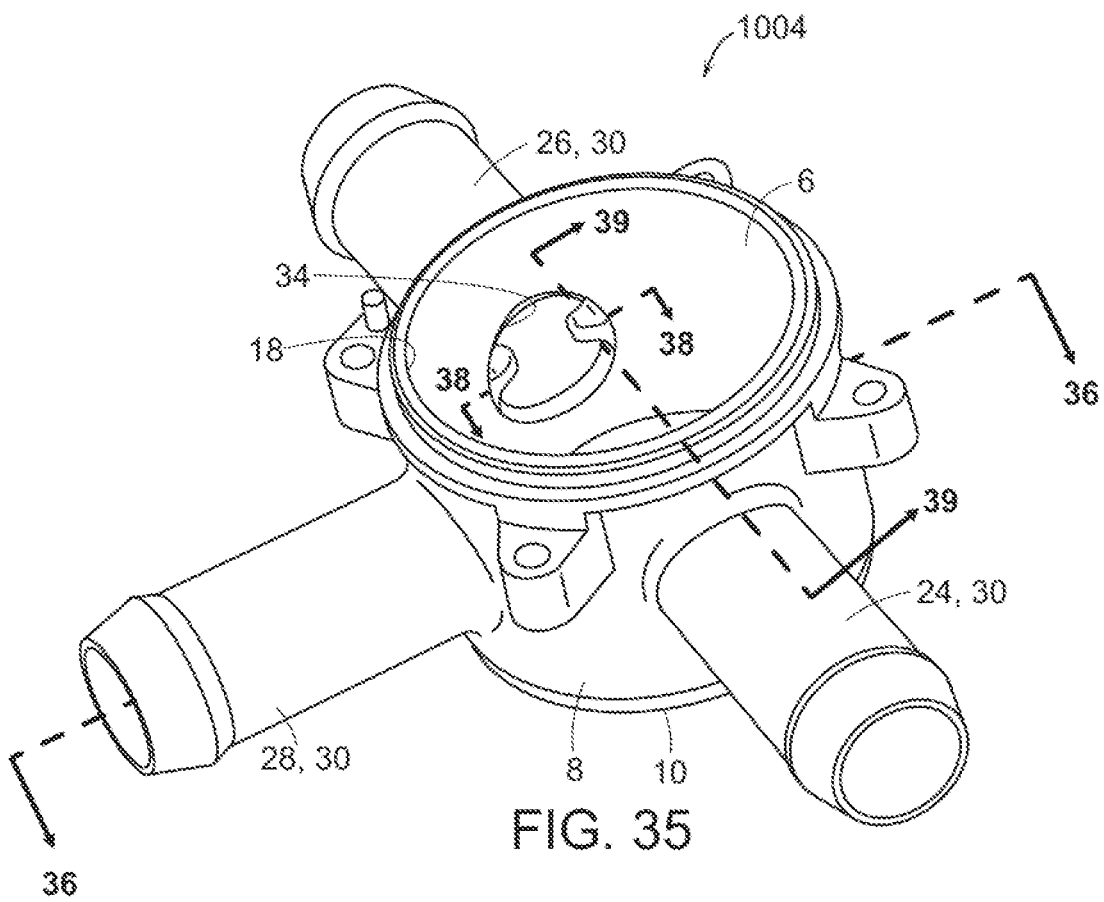
FIG. 35 is a top perspective view of an alternative embodiment valve body.
Figure 36:
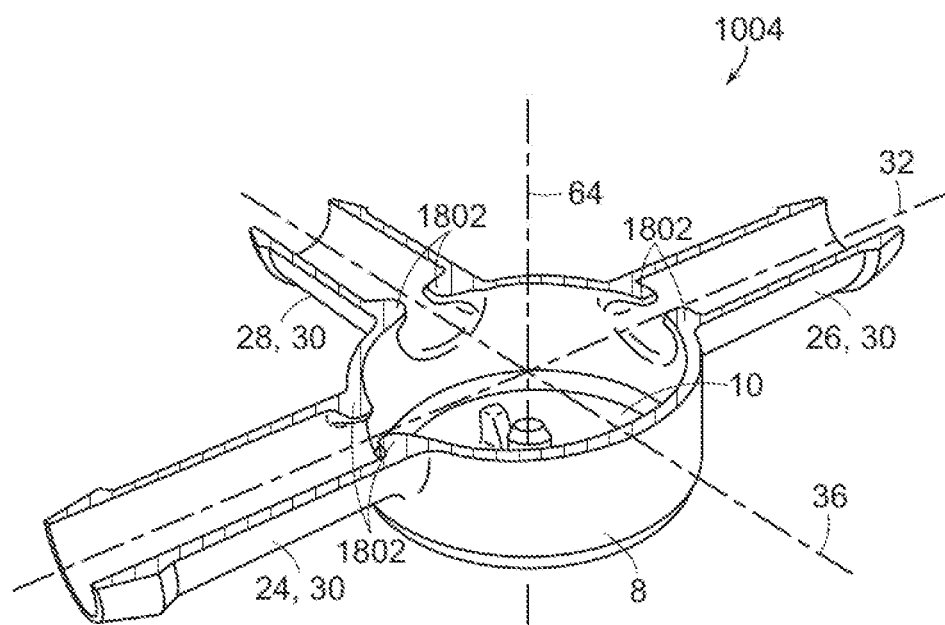
FIG. 36 is a cross-sectional view of the valve body of FIG. 35 as seen along line 36-36 of FIG. 35.
Figure 37:
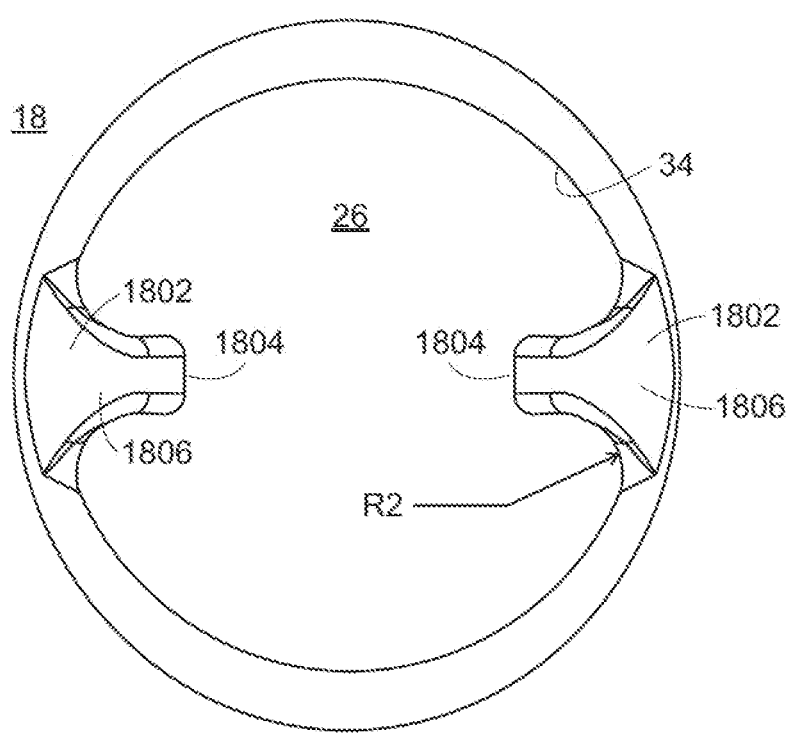
FIG. 37 is a side view of a portion of the inner surface of the valve body illustrating a valve port of FIG. 35.
Figure 38:
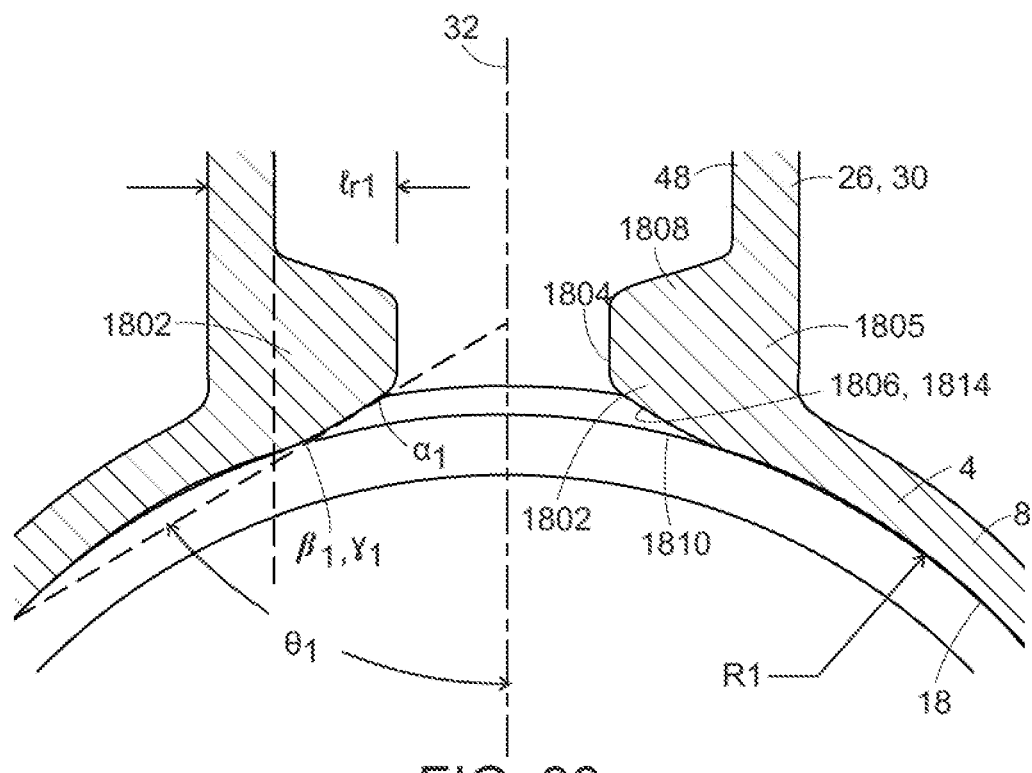
FIG. 38 is a cross-sectional view of the plug assembly of FIG. 35 as seen along line 38-38 of FIG. 35.
Figure 39:
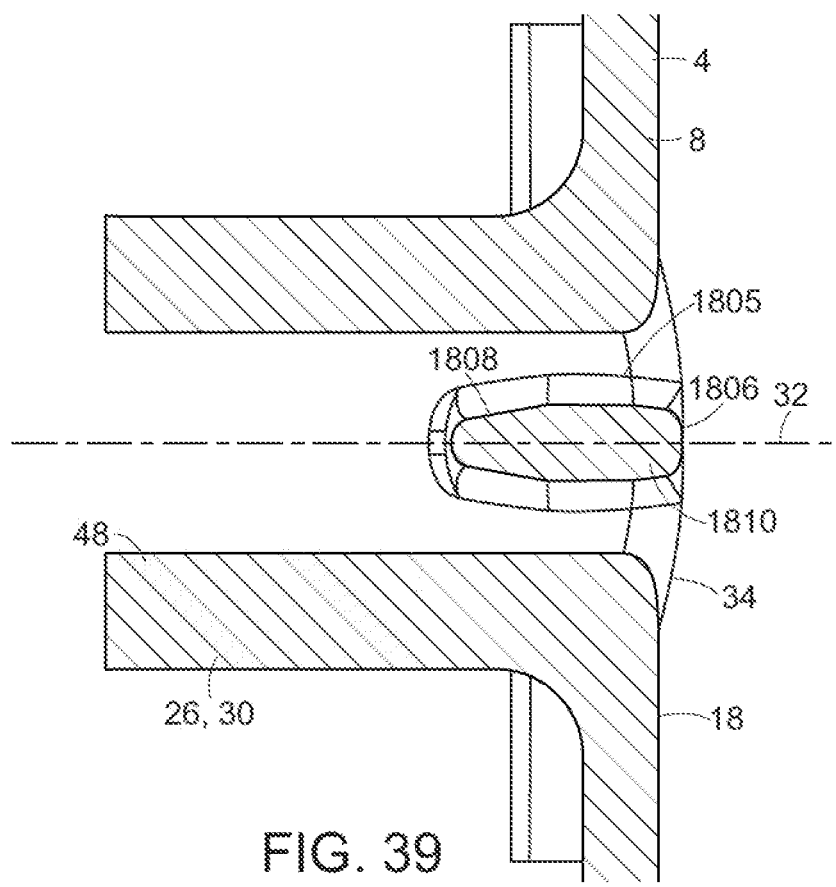
FIG. 39 is a cross-sectional view of the valve body of FIG. 35 as seen along line 39-39 of FIG. 35.
Figure 45:
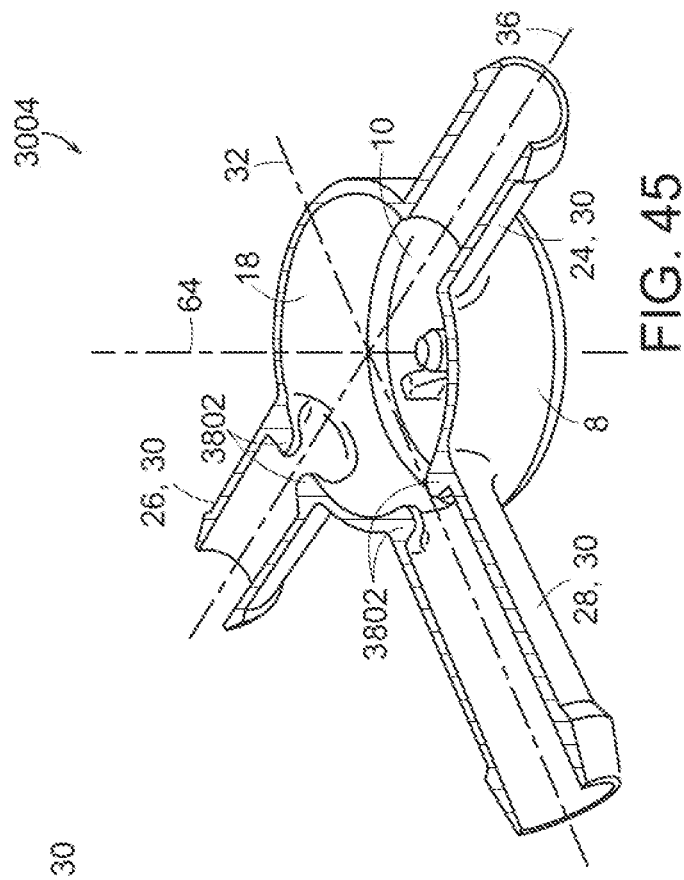
FIG. 45 is a cross-sectional view of the valve body of FIG. 44 as seen along line 45-45 of FIG. 44.
Figure 44:
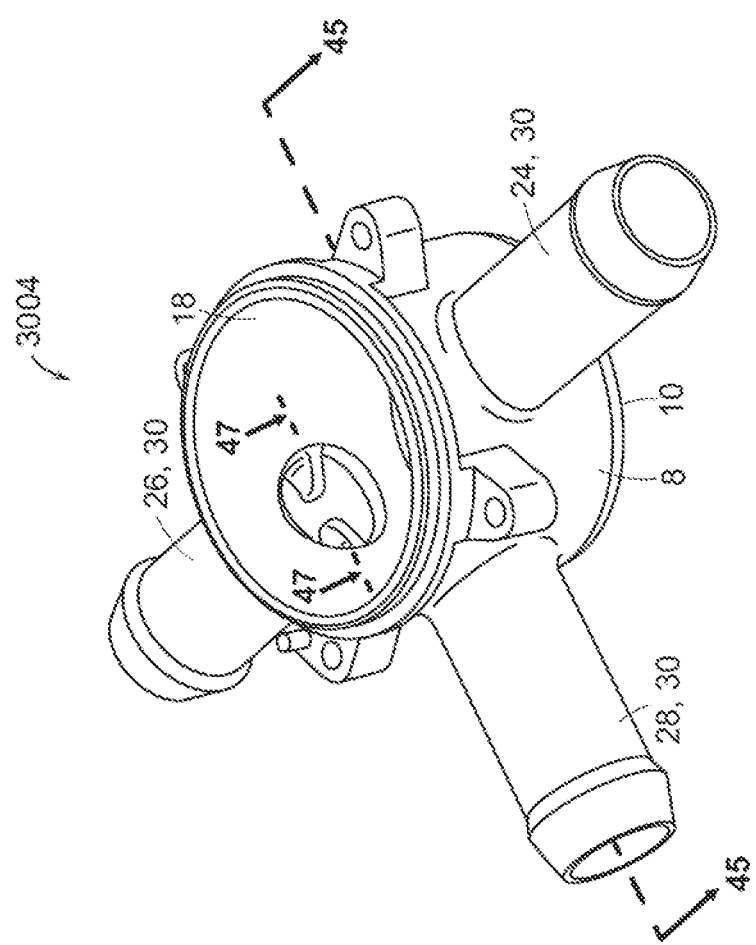
FIG. 44 is a top perspective view of another alternative embodiment valve body.
Figure 50:
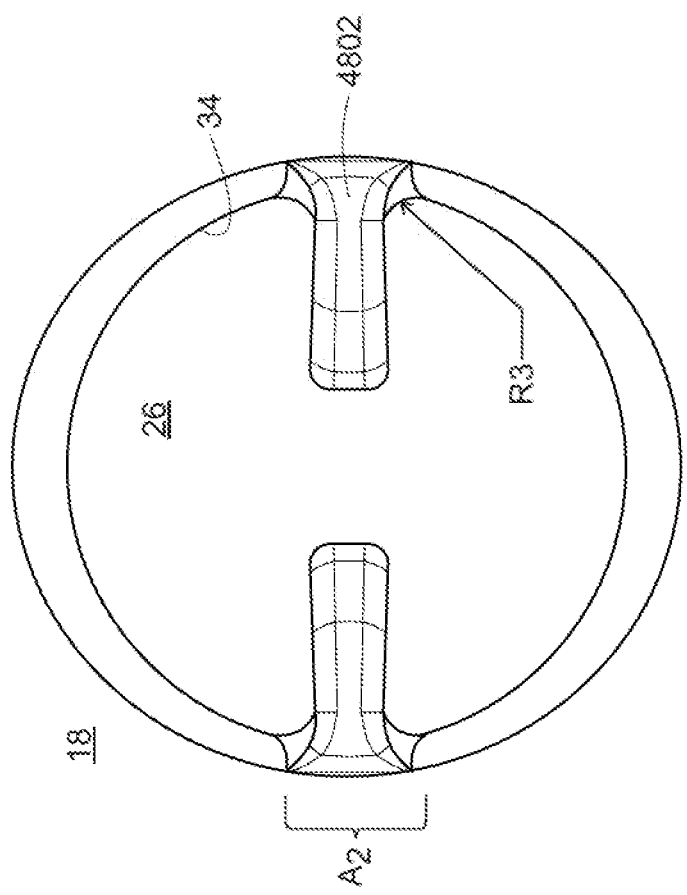
FIG. 50 is a side view of a portion of the inner surface of the valve body illustrating a valve port of FIG. 48.
Figure 51:
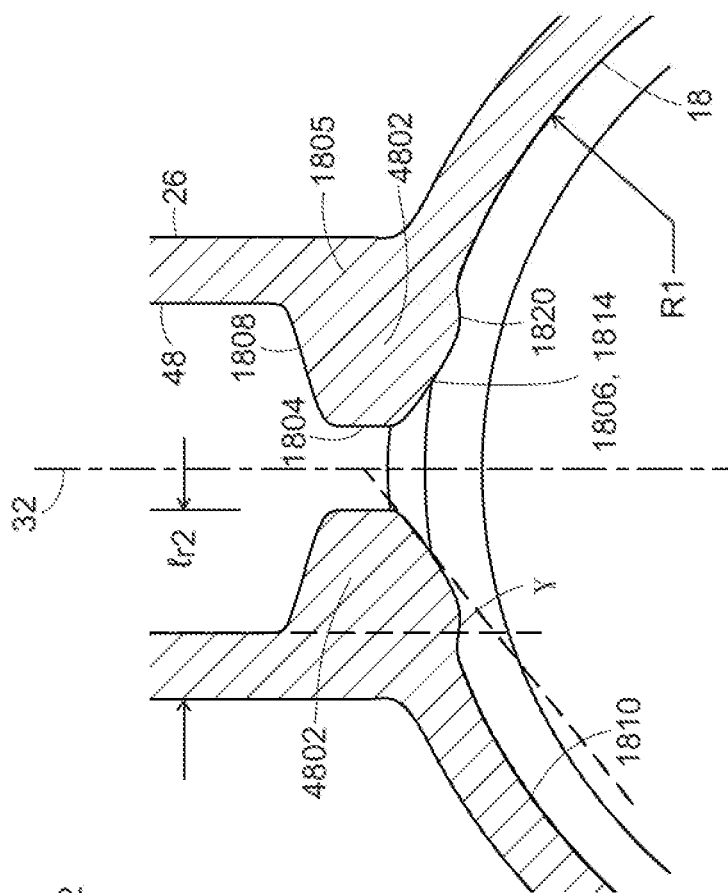
FIG. 51 is a cross-sectional view of the valve body of FIG. 48 as seen along line 51-51 of FIG. 35.
Figure 54:
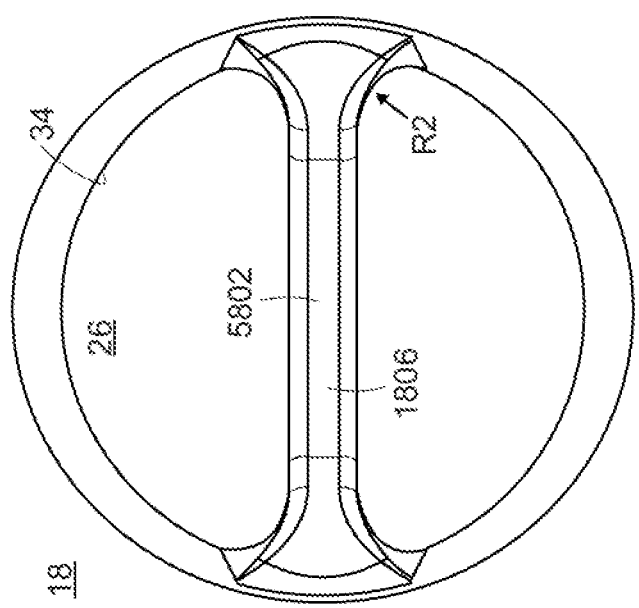
FIG. 54 is a side view of a portion of the inner surface of the valve body illustrating a valve port of FIG. 52.
Figure 55:
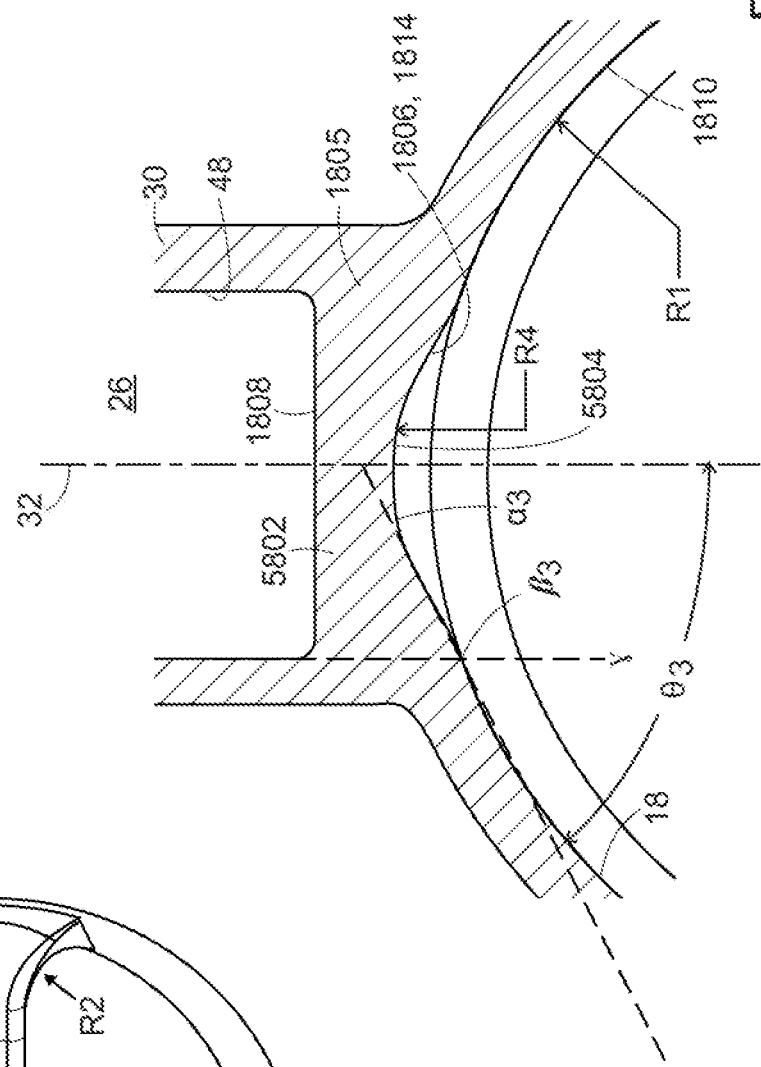
FIG. 55 is a cross-sectional view of the valve body of FIG. 52 as seen along line 55-55 of FIG. 52.

Referring to FIGS. 32-34, in some embodiments, the fluid valve 2 may include an alternative embodiment plug assembly 960. The plug assembly 960 illustrated in FIGS. 32-34 is similar to the plug assembly 860 illustrated in FIGS. 29-31, and elements common to both embodiments are referred to with common reference numbers. The plug assembly 960 illustrated in FIGS. 32-34 is similar to the plug assembly 860 illustrated in FIGS. 29-31 in that it includes the rigid retention ring 880 that is configured to retain the seal 830 in the second groove 106 and the seal 830. However, the plug assembly 960 illustrated in FIGS. 32-34 differs from the plug assembly 860 illustrated in FIGS. 29-31 in that it also includes the inner retention ring 780 as described above with respect to FIGS. 26-28. Thus, the seal 830 is retained in the plug assembly 960 by both the inner retention ring 780 and the outer retention ring 880.

Referring to FIGS. 35-39, in some embodiments, the fluid valve 2 may include an alternative embodiment valve body 1004. The valve body 1004 illustrated in FIGS. 35-39 is similar to the valve body 4 illustrated in FIGS. 1-14, and elements common to both embodiments are referred to with common reference numbers. The valve body 1004 illustrated in FIGS. 35-39 differs from the valve body 4 illustrated in FIGS. 1-14 in that it includes seal guiding features 1800 associated with the opening 34 of each port 24, 26, 28. The seal guiding features 1800 are configured to prevent seal pinching during rotation of the valve plug 62 relative to the valve body 1004. That is, during rotation of the valve plug relative to the valve body, the guiding features 1800 provide a ramped surface on which the seal rides, preventing the seal 130 from excessive encroachment into the opening 34 while the seal is moved relative to the valve body along a circular path having a radius that corresponds to the radius of curvature R1 of the valve body inner surface 18.

In the illustrated embodiment, the guiding features 1800 comprise a pair of opposed ribs 1802 that are disposed in the tube 30 of each valve port 24, 26, 28. The ribs 1802 protrude from an inner surface 48 of the tube 30 at a location adjoining the opening 34 in the sidewall 8 associated with each valve port 24, 26, 28. That is, the ribs 1802 protrude into the fluid path defined by the valve port. The ribs 1802 protrude in a direction that is aligned with a diameter of the tube 30, and thus are perpendicular to the rotational axis 64. For the first and second valve ports 24, 26, the ribs 1802 protrude in a direction that is perpendicular to the first valve body transverse axis 32. For the third valve port 28, the ribs protrude in a direction that is perpendicular to the second valve body transverse axis 36.

The ribs 1802 are identical to each other, extend toward each other, and are mirrored across the respective valve body transverse axis. For valve port 26, the ribs are mirrored across the first valve body transverse axis 32. Each rib 1802 protrudes a distance lr1, and terminates in a rib terminal end 1804 that is spaced apart from the tube inner surface 48. The distance lr1 is less than a radius of the tube 30, whereby a gap exists between the respective terminal ends 1804 of the two ribs 1802 that constitute the pair of ribs. In general the ribs 1802 have sufficient length to provide structure, and to simplify tooling and limit flow resistance.

The ribs 1802 extend integrally from the inner surface of the tube 48, and rounded fillets are provided at the base 1805 of each rib 1802. In the embodiment illustrated in FIG. 37, the fillets have a radius R2.

Each rib 1802 includes a curvilinear seal-facing surface, referred to as a guide surface 1806, and an opposed trailing surface 1808. The seal 130 slides along the guide surface 1806 during rotation of the valve plug 62 relative to the valve body 1004. At least a portion of the guide surface 1806, when viewed in the cross section, is not coextensive with an arc 1810 that extends across the opening 34 and that is an extrapolation of the circular path (e.g., the arc 1810 has a radius R1).

In the illustrated embodiment, the guide surface 1806 has a curvilinear shape and a ramp portion 1814 of the guide surface 1806 is recessed relative to the arc 1810. That is, the ramp portion 1814 resides within the tube 30. The ramp portion 1814 extends between a point α1 on the guide surface 1806 to a point β1 on the guide surface 1806. The point α1 is the location at which the ramp portion 1814 intersects the rib terminal end 1804, and the point β1 is the location at which the ramp portion 1814 intersects the radius R1 of the valve body sidewall inner surface 18. In this embodiment, the point β1 coincides with a point γ. The point γ corresponds to the edge of the port 26, e.g., the location at which a line that coextends with the tube inner surface 48 intersects the valve body inner surface 18 (e.g., intersects the arc 1810).

The ramp portion 1814 of the guide surface 1806 is at an acute angle θ1 relative to a centerline of the tube 30, where the centerline of the tube 30 corresponds to the respective valve body transverse axis 32 or 36. In the illustrated embodiment, the angle θ1 is about 62 degrees, but is not limited to this angle. For example, in some embodiments, the angle θ1 may be in a range of about 40 degrees to about 70 degrees.

The trailing surface 1808 of each rib 1802 is tapered in a direction parallel to a centerline of the tube 30, and is tapered in two orthogonal directions. For example, as seen in a first cross section that is transverse to the rotational axis 64 (FIG. 38), the rib terminal end 1804 has a dimension in a direction parallel to the tube centerline that is less than the corresponding dimension of the rib base 1805. As a result, the trailing surface 1808 is angled relative to the tube centerline. In another example, as seen in a second cross section that is parallel to the rotational axis (FIG. 39), the ribs 1802 may have a hydrofoil shape in that the guide surface 1806 is convexly rounded and the trailing surface 1808 is angled relative to the respective valve body transverse axis 32 or 36 so as have a minimum thickness at locations furthest from the guide surface 1806.

Referring to FIGS. 40-43, in some embodiments, the fluid valve 2 may include another alternative embodiment valve body 2004. The valve body 2004 illustrated in FIGS. 40-43 is similar to the valve body 1004 illustrated in FIGS. 35-39, and elements common to both embodiments are referred to with common reference numbers. The valve body 2004 illustrated in FIGS. 40-43 is similar to the previous embodiment in that the valve body 2004 includes guiding features 1800 in the form of ribs 2802. However, the ribs 2802 of FIGS. 40-43 differ in shape from the ribs 1802 described above. In particular, the ramp portion 1814 of the ribs 2802 extends between a point α2 on the guide surface 1806 to a point β2 on the guide surface 1806. The point α2 is the location at which the ramp portion 1814 intersects the rib terminal end 1804, and the point β2 is the location at which the ramp portion 1814 intersects the radius R1 of the valve body sidewall inner surface 18. In this embodiment, the point β2 is inboard relative to the point γ, which corresponds to the edge of the port 26. In addition, the ramp portion 1814 of the guide surface 1806 is at an acute angle θ2 relative to a centerline of the tube 30. In this embodiment, the angle θ2 is less than the angle θ1. For example, the angle θ2 may be about 49 degrees, but is not limited to this angle.

In addition, the ribs 2802 have a length lr2 that is greater than the length lr1 of the ribs 1802. The longer ribs 2802 have been found to provide a more effective glide surface than that of the ribs 1802, but have increased fluid pressure losses.

Although the valve body 2004 may include seal guiding features 1800 in each port 24, 26, 28, the valve body 1004 is not limited to this configuration. As seen in FIG. 41, the seal guiding features 1800 (i.e., the ribs 2802) may be omitted from some ports. For example, in some embodiments, the ribs 2802 may be provided in only those ports that will be closed, while an inlet port would not need to be closed and may be free of guiding features 1800.

Referring to FIGS. 44-47, in some embodiments, the fluid valve 2 may include another alternative embodiment valve body 3004. The valve body 3004 illustrated in FIGS. 44-47 is similar to the valve body 1004 illustrated in FIGS. 35-39, and elements common to both embodiments are referred to with common reference numbers. The valve body 3004 illustrated in FIGS. 44-47 is similar to the previous embodiment in that the valve body 3004 includes guiding features 1800 in the form of ribs 3802. However, the ribs 3802 of FIGS. 44-47 differ in shape from the ribs 1802 described above. In particular, in the guide surface 1806 of the ribs 3802 includes the ramp portion 1814 that adjoins the rib terminal end 1804, and a protruding portion 1820 (e.g., a "bump") 1820 that is disposed between the ramp portion 1814 and the edge of the port γ. The bump 1820 protrudes beyond the are 1810 and into the valve plug chamber 6.

Referring to FIGS. 48-51, in some embodiments, the fluid valve 2 may include another alternative embodiment valve body 4004. The valve body 4004 illustrated in FIGS. 48-51 is similar to the valve body 3004 illustrated in FIGS. 44-47, and elements common to both embodiments are referred to with common reference numbers. The valve body 4004 illustrated in FIGS. 48-51 is similar to the previous embodiment in that the valve body 4004 includes a guiding features 1800 in the form of ribs 4802. However, the ribs 4802 of FIGS. 48-51 differ in shape from the ribs 3802 described with respect to FIGS. 44-47. In particular, in the ribs 4802 have a fillet radius R3 that is less than the fillet radius R2 of the ribs 3802, reducing fluid pressure loss through the port 26 relative to earlier-described embodiments. However, the relatively greater fillet radius R2 provides a wider rib 1802 at the edge of the port 26, and thus a larger surface area to distribute the load onto the seal 130. For example, the guide surface 1806 of the rib 1802 has a greater area A1 (FIG. 46) in the vicinity of the fillet having the radius R2 when compared to the guide surface 1806 of the rib 4802, which has an area A2 in the vicinity of the fillet having the radius R3.

Referring to FIGS. 52-55, in some embodiments, the fluid valve 2 may include another alternative embodiment valve body 5004. The valve body 5004 illustrated in FIGS. 52-55 is similar to the valve body 1004 illustrated in FIGS. 35-39, and elements common to both embodiments are referred to with common reference numbers. The valve body 5004 illustrated in FIGS. 52-55 differs from the previous embodiment in that the valve body 5004 includes a guiding features 1800 in the form of a single rib (e.g., a "rail") 5802 that extends, uninterrupted, between opposed sides of the opening 34 along a diameter of the opening 34.

Although the rail 5802 provides increased flow resistance relative to the ribs 1802 described in previous embodiments, the rail 5802 prevents the seal 130 from being pinched between the valve plug assembly and the valve body 5004 during rotation of the valve plug assembly with respect to the valve body 5004.

Each rail 5802 includes a curvilinear seal-facing surface, referred to as a guide surface 1806, and an opposed trailing surface 1808. The seal 130 slides along the guide surface 1806 during rotation of the valve plug 62 relative to the valve body 1004. At least a portion of the guide surface 1806, when viewed in the cross section, is not coextensive with the arc 1810.

In the illustrated embodiment, the guide surface 1806 has a curvilinear shape and a ramp portion 1814 of the guide surface 1806 is recessed relative to the arc 1810. That is, the ramp portion 1814 resides within the tube 30. The ramp portion 1814 extends between a point α3 on the guide surface 1806 to a point β3 on the guide surface 1806. The point α3 is the location at which the ramp portion 1814 intersects a central concave portion 5804 of the guide surface 1806. The point β1 is the location at which the ramp portion 1814 intersects the radius R1 of the valve body sidewall inner surface 18. In this embodiment, the point β1 coincides with the point γ, whereby the ramp portion 1814 reaches the housing radius at the edge of the port 26. The central concave portion 5804 has a radius of curvature R4 that is less than the radius of curvature R1 of the valve body inner surface 18.

The ramp portion 1814 of the guide surface 1806 is at an acute angle θ3 relative to a centerline of the tube 30, where the centerline of the tube 30 corresponds to the respective valve body transverse axis 32 or 36. In the illustrated embodiment, the angle θ3 is about 61 degrees, and thus, it is relatively shallow. However, the angle θ3 is not limited to this angle. For example, in some embodiments, the angle θ3 may be in a range of about 40 degrees to about 70 degrees.

The trailing surface 1808 of the rail 5802 is tapered in a direction parallel to a centerline of the tube 30. For example, the rail 5802 may have a hydrofoil shape in that the guide surface 1806 is convexly rounded and the trailing surface 1808 is angled relative to the respective valve body transverse axis 32 or 90 so as have a minimum thickness at locations furthest from the guide surface 1806.

Referring to FIGS. 56-59, in some embodiments, the fluid valve 2 may include another alternative embodiment valve body 6004. The valve body 6004 illustrated in FIGS. 56-59 is similar to the valve body 1004 illustrated in FIGS. 35-39, and elements common to both embodiments are referred to with common reference numbers. The valve body 6004 illustrated in FIGS. 56-59 is similar to the previous embodiment in that the valve body 6004 includes guiding features 1800 in the form of ribs 6802. However, the ports 24, 26, 28 of the valve body 6004 include multiple pairs 6801(a), 6801(b) of ribs 6802, where the rib pairs 6801(a), 6801(b) are aligned along a direction parallel to the rotational axis 64.

In the illustrated embodiment, the ports 24, 26, 28 of the valve body 6004 include two pairs 6801(a), 6801(b) of ribs 6802, but are not limited to two pairs 6801(a), 6801(b). The ribs 6802 of each rib pair 6801(a), 6801(b) protrude from an inner surface 48 of the tube 30 at a location adjoining the opening 34 in the sidewall 8 associated with each valve port 24, 26, 28. That is, the ribs 6802 protrude into the fluid path defined by the valve port. The ribs 6802 protrude in a direction that is perpendicular to the rotational axis 64 and is perpendicular to the respective valve body transverse axis 32 or 36. The first rib pair 6801(a) mirrors the second rib pair 6801(b) relative to a diameter of the tube 30.

The ribs 6802 may have a shape that corresponds to the features of any of the previous rib embodiments, or various combinations thereof. Advantageously, using multiple rib pairs further distributes the load to the seal 130, thus reducing the rate of wear of the seal 130 relative to embodiments having a single rib pair.

Although the plug assembly 60 is described herein as being disposed in a three-port valve body 4, it is understood that the any of the plug assemblies 60, 460, 560, 660 described herein may be used with an alternative port body having a different number of ports, as required by the specific application. Moreover, a given fluid valve 2 can perform different functions, depending on the configuration of the ports in the fluid system. Examples of various fluid valve configurations are now provided:

A three-port valve may have one of the following configurations:

One inlet, two outlet valve, where the valve seal seals both the inlet and the outlets. In this case, the annular outer and inner circumferential beads 140, 146 extend over the full 360 degrees of circumference on the seal outer and inner surfaces 136, 138.

One inlet, two outlet valve, where the valve seal seals only the outlets. In this case, only the annular inner circumferential bead 146 is needed, and the seal outer surface 136 may have additional retention features.

Two inlet, one outlet valve, where the valve seal seals both the inlet and the outlets. In this case, the annular outer and inner circumferential beads 140, 146 extend over the full 360 degrees of circumference on the seal outer and inner surfaces 136, 138.

Two inlet, one outlet valve, where the valve seal seals only the inlets. In this case, only the annular outer circumferential bead 140 is needed.

A four-port valve may have the following configuration:

Two inlet, two outlet valve, where the valve seal seals when the pressure differential is both positive and negative. In this case, the annular outer and inner circumferential beads 140, 146 extend over the full 360 degrees of circumference on the seal outer and inner surfaces 136, 138.

A five-port valve may also be provided which combines the functions of the three-port and four-port valves. It is contemplated that the five-port valve may require the annular outer and inner circumferential beads 140, 146 which extend over the full 360 degrees of circumference on the seal outer and inner surfaces 136, 138.

The invention provides the necessary sealing forces when they are needed, in a fully closed position, and reduces forces while the valve is moving between fully closed positions. This minimizes wear of the seal and thus improves the useable lifetime of the valve. The reduced friction resulting from the reduced force of the seal while the valve is moving also reduces the amount of energy to move the valve.

Although the valve ports 24, 26, 28 and the valve plug tubular protrusion 94 are described herein as being cylindrical in shape, the valve ports 24, 26, 28 and the valve plug tubular protrusion 94 may have alternative shapes as required by the specific application. For example, in some embodiments, valve ports 24, 26, 28 and the valve plug tubular protrusion 94 may be rectangular tubes, or tubes having an irregular cross-sectional shape.

Although each valve port 24, 26, 28 is described herein as having the same cross-sectional shape and cross-sectional dimension, the valve ports 24, 26, 28 are not limited to this configuration. For example, in some embodiments, one or more of the valve ports may have a unique shape and/or cross-sectional dimension.

In other embodiments, the radial fit between the seal and the groove is biased in situations where the flow through the valve is only in one direction. This bias allows for greater tolerances for the width of the groove and seal allowing for easier manufacture.

In other embodiments, the valve plug may have a different valve plug geometry that does not close off a valve port, but rather directs the fluid flow to different valve ports, depending on valve plug position.

In other embodiments, the elastic member and seal ll may be carried in a groove provided in the valve body rather than in the valve plug.

In other embodiments, the valve body may have a different number of valve ports, for example, ranging from two valve ports to five valve ports.

In the embodiments illustrated in FIGS. 18-25, the plug assemblies include retaining structures. In particular, the outer wall 112 of the second groove 106 includes first retaining structures such as one or more latch-receiving through openings 566, and the seal 130 includes second retaining structure such as one or more protruding latches 532. It is understood that the retaining structures are not limited to this configuration. For example, in some embodiments, the first retaining structures may include latches formed on the groove outer wall 112, and the second retaining structures may include recesses in the seal outer surface 136. In another example, the first and second retaining structures may include structures that permit a bayonet, screw thread or other type of interlocking connection between the seal 130 and the second groove 106.

Selective illustrative embodiments of the fluid valve including the valve body and plug assembly are described above in some detail. It should be understood that only structures considered necessary for clarifying the fluid valve have been described herein. Other conventional structures, and those of ancillary and auxiliary components of the fluid valve, are assumed to be known and understood by those skilled in the art. Moreover, while working examples of the fluid valve have been described above, the fluid valve is not limited to the working examples described above, but various design alterations may be carried out without departing from the fluid valve as set forth in the claims.

What is claimed, is:

1. A fluid valve comprising:
   a valve body including:
      a valve plug chamber; and
      valve ports, each valve port communicating with the valve chamber, and
   a plug assembly including a valve plug, that is disposed in the valve plug chamber and is rotatable relative to the valve body about a rotational axis, the valve plug including:
      a hollow, tubular protrusion that protrudes from the plug in a direction perpendicular to the rotational axis, an inner surface of the tubular protrusion defining a portion of a fluid path;
      a sleeve that surrounds the tubular protrusion and is spaced apart from the tubular protrusion, a space between tubular protrusion and the sleeve defining an annular groove that surrounds the tubular protrusion, the groove having a groove inner wall that is shared with the tubular protrusion and a groove outer wall that is shared with the sleeve; and
      an annular seal that is disposed in the groove, the seal including
         a seal inner surface that faces the groove inner wall,
         a seal outer surface that faces the groove outer wall, and
   a seal retaining structure that is configured to engage with a corresponding retaining structure provided on the plug assembly so as to retain the seal within the groove, wherein
      the sleeve includes the corresponding retaining structure, which is a through opening,
      the seal retaining structure is a latch that protrudes outward from the seat outer surface, and
      the latch extends into the through opening of the sleeve, and engagement between the latch and the through opening retains the seal within the second groove.

2. The fluid valve of claim 1, wherein the latch is elongated along a circumference of the seal, and the through opening is elongated along a circumference of the sleeve.

3. The fluid valve of claim 1, wherein
   the seal includes a first end that faces a surface of the valve plug chamber, and a second end that is opposed to the first end and faces a surface of the plug, and
   the latch is disposed on the seal outer surface at an edge corresponding to the seal second end.

4. The fluid valve of claim 1, wherein the through opening is spaced apart from a surface of the plug.

5. The fluid valve of claim 1, wherein the latch includes
   a beveled surface that faces the plug, and
   a normal surface that is opposed to the beveled surface, and s perpendicular to the seal outer surface.

6. The fluid valve of claim 1, wherein the through opening comprises at least two through openings that arc spaced apart along a circumference of the sleeve, the latch comprises at least two latches that are spaced apart along a circumference of the seat, and the number of through openings corresponds to the number of latches.

7. A fluid valve comprising:
   a valve body including:
      a valve plug chamber; and
      valve ports, each valve port communicating with the valve plug chamber, and
   a plug assembly including a value plug that is disposed in the valve plug chamber and is rotatable relative to the valve body about a rotational axis the valve plug including:
      a hollow, tubular protrusion that protrudes from the plug in a direction perpendicular to the rotational axis, an inner surface of the tubular protrusion defining a portion of a fluid path:
      a sleeve that surrounds the tubular protrusion and is spaced apart from the tubular protrusion, a space between tubular protrusion and the sleeve defining an annular groove that surrounds the tubular protrusion, the groove having a groove inner wall that is shared with the tubular protrusion and a groove outer wail that is shared with the sleeve; and
      an annular seat that is disposed in the groove, the seal including
         a seal inner surface that faces the groove inner wall,
         a seal outer surface that faces tile groove outer wall, and
   a seal retaining structure that is configured to engage with a corresponding retaining structure provided on the plug assembly so as to retain the seal within the groove, wherein
      an end of the sleeve includes a cut out,
      the seal includes a key that protrudes outward from the seal outer surface, and
      the key is disposed in the cut out, and engagement between the key and the cut out locates the seal with respect to the plug and properly orients the seal with respect to the plug.

8. The fluid valve of claim 7, comprising an elastic member that is disposed in the groove between a blind end of the groove and the seal, the elastic member providing a force that directs the seal against an inner surface of the valve plug chamber.

9. A fluid valve comprising:
   a valve body including:
      a valve plug chamber; and
      valve ports, each valve port communicating with the valve plug chamber, and
   a plug assembly including a valve plug that is disposed in the valve plug chamber and is rotatable relative to the valve body about a rotational axis the valve plug including;
      a hollow, tubular protrusion that protrudes front the plug in a direction perpendicular to the rotational axis, an inner surface of the tubular protrusion defining a portion of a fluid path;
      a sleeve that surrounds the tubular protrusion and is spaced apart from the tubular protrusion, a space between tubular protrusion and the sleeve defining an annular groove that surrounds the tubular protrusion, the groove having a groove inner wall that is shared with the tubular protrusion and a groove outer wall that is shared with the sleeve; and an annular seal that is disposed in the groove, the seal including
a seal inner surface that faces the groove inner wall,
a seal outer surface that faces the groove outer wall, and a seal retaining structure that is configured to engage with a corresponding retaining structure provided on the plug assembly so as to retain the seal within the groove one of the groove inner wall and the groove outer wall includes an annular cut out, the plug assembly includes an annular retention ring that is disposed in the cut out and protrudes relative to the one of the groove inner wall and the groove outer wall, the annular retention ring providing the corresponding retaining structure, and the seal retaining structure is an annular circumferential bead that is engaged by the annular retention ring, whereby the seal is retained in the groove.

10. The fluid valve of claim 9, wherein the retention ring has an interference fit with the cut out.

11. The fluid valve of claim 9, wherein the one of the groove inner wall and the groove outer wall is the groove inner wall, and the circumferential bead is disposed on the seal inner surface.

12. The fluid valve of claim 9, wherein the one of the groove inner wail and the groove outer wall is the groove outer wall, and the circumferential bead is disposed on the seal outer surface.

13. A fluid valve comprising:
a valve body including:
a valve plug chamber; and
valve ports each valve port communicating with the valve plug chamber, and
a plug assembly including a valve plug that is disposed in the valve plug chamber and is rotatable relative to the valve body about a rotational axis the valve plug including:
a hollow, tubular protrusion that protrudes from the plug in a direction perpendicular to the rotational axis, an inner surface of the tubular protrusion defining a portion of a fluid path;
a sleeve that surrounds the tubular protrusion and is spaced apart from the tubular protrusion, a surface between tubular protrusion and the sleeve defining an annular groove that surrounds the tubular protrusion, the groove having a groove inner wall that is shared with the tubular protrusion and a groove outer wall that is shared with the sleeve; and
an annular seal that is disposed in the groove, the seal including
a seal inner surface that faces the groove timer wall,
a seal outer surface that faces the groove outer wall, and a seal retaining structure that is configured to engage with a corresponding retaining structure provided on the plug assembly so as to retain the seal within the groove, wherein
the groove inner wall includes a first annular cut out,
the groove outer wall includes a second annular cut out,
the plug assembly includes a first annular retention ring that is disposed in the first cut out in such a way that the first annular retention ring protrudes relative to the groove inner wall, the plug assembly includes a second annular retention ring that is disposed in the second cut out in such a way that the second annular retention ring protrudes relative to the groove outer wall, the first and second annular retention rings provide the corresponding retaining structure, and the seal retaining structure comprises an inner annular circumferential bead that is engaged by the first annular retention ring, and an outer annular circumferential bead that is engaged by the second annular retention ring, whereby the seal is retained in the groove.

14. A fluid valve comprising:
a valve body including:
a valve plug chamber; and
valve ports, each valve port communicating with the value plug chamber, and
a valve plug that is disposed in the valve plug chamber and is rotatable relative to the valve body about a rotational axis, the valve plug including:
a groove that opens facing a surface of the valve plug chamber, the groove including an inner wall, an outer wall that faces the inner wall, and a first retaining structure that is provided on one of the inner wall and the outer wall,
a seal that is disposed in the groove, the seal including
a seal inner surface that faces the groove inner wall,
a seal outer surface that faces the move outer wall, and
a second retaining structure that is provided on one of the seal inner surface and the seal outer surface,
wherein the first retaining structure engages with the second retaining structure in such a way as to retain the seal within the groove, and
the first retaining structure comprises through opening, and the second retaining structure comprises a protruding latch.

15. The fluid valve of claim 14, wherein
each of the groove and the seal are annular,
the latch is elongated along a circumference of the seal, and
the through opening is elongated along a circumference of the surface of the groove.

16. The fluid valve of claim 14, wherein
the seal includes a first end that faces a surface of the valve plug chamber, and a second end that is opposed to the first end and faces a surface of the plug,
the latch is disposed on the seal outer surface at an edge conesponding to the seal second end, and
the through opening is disposed on the groove outer wall.

17. A fluid valve comprising:
a valve body including;
a valve plug chamber; and
valve ports, each valve port communicating with the valve plug chamber, and
a valve plug that is disposed in the valve plug chamber and is rotatable relative to the valve body about a rotational axis, the valve plug including:
a groove that opens facing a surface of the valve plug chamber, the groove including an inner wall, an outer wall that faces the inner wall, and a first retaining structure that is provided on one of the inner wall and the outer wall,
a seal that is disposed in the groove, the seal including
a seal inner surface that faces the groove inner wall,
a seal outer surface that faces the groove outer wall, and a second retaining structure that is provided on one of the seal inner surface and the seal outer surface, wherein the first retaining structure engages with the second retaining structure in such a way as to retain the seal within the groove, the first retaining structure includes an annular cut out, and an annular retention ring that is disposed in the cut out that protrudes relative to the one of the groove inner wall and the groove outer wall, and the second retaining structure is an annular circumferential bead that protrudes from a surface of the seal and that is engaged by the annular retention ring, whereby the seat is retained in the groove.

18. A fluid valve comprising:

a valve body including:
 a valve plug chamber; and
 valve ports, each valve port communicating with the valve plug chamber, and a valve plug that is disposed in the valve plug chamber and is rotatable relative to the valve body about a rotational axis, the valve plug including:
 a groove that opens facing a surface of the valve plug chamber, the groove including an inner wall, an outer wall that faces the inner wall, and a first retaining structure that is provided on one of the inner wall and the outer wall,
 a seal that is disposed in the groove, the seal including
  a seal inner surface that faces the groove inner wall,
  a seal outer surface that faces the groove outer wall, and
  a second retaining structure that is provided on one of the seal inner surface and the seal outer surface, wherein the first retaining structure engages with the second retaining structure in such a way as to retain the seal within the groove, the first retaining structure includes
 a first annular cut out provided in the groove inner wall,
 a second annular cut out provided in the groove outer wall,
 a first annular retention ring that is disposed in the first cut out in such a way that the first annular retention ring protrudes relative to the groove inner wall, and
 a second annular retention ring that is disposed in the second cut out in such a way that the second annular retention ring protrudes relative to the groove outer wall, and the second retaining structure includes
 an inner annular circumferential bead that is engaged by the first annular retention ring, and
 an outer annular circumferential bead that is engaged by the second annular retention ring, whereby the seal is retained in the groove.

* * * * *

UNITED STATES PATENT AND TRADEMARK OFFICE
CERTIFICATE OF CORRECTION

Page 1 of 2

PATENT NO. : 11,112,015 B2
APPLICATION NO. : 16/433382
DATED : September 7, 2021
INVENTOR(S) : Chapman et al.

It is certified that error appears in the above-identified patent and that said Letters Patent is hereby corrected as shown below:

In the Claims

In Claim 1:
At Column 23, Line 25: "valve chamber" should read --valve plug chamber--.
At Column 23, Line 26: "a valve plug, that is disposed" should read --a valve plug that is disposed--.
At Column 23, Line 53: "seat outer surface" should read --seal outer surface--.

In Claim 5:
At Column 24, Line 4: "and s perpendicular" should read --and is perpendicular--.

In Claim 6:
At Column 24, Line 6: "that arc spaced" should read --that are spaced--.
At Column 24, Line 9: "circumference of the seat" should read --circumference of the seal--.

In Claim 7:
At Column 24, Line 18: "rotational axis the valve plug" should read --rotational axis, the valve plug--.
At Column 24, Line 30: "wail that is shared" should read --wall that is shared--.
At Column 24, Line 31: "an annular seat" should read --an annular seal--.
At Column 24, Line 34: "tile groove outer wall" should read --the groove outer wall--.

In Claim 9:
At Column 24, Line 59, "rotational axis the valve plug" should read --rotational axis, the valve plug--.
At Column 24, Line 60, "including;" should read --including:--.
At Column 24, Lines 61-62, "protrudes front the plug" should read --protrudes from the plug--.

In Claim 12:
At Column 25, Line 30: "groove inner wail" should read --groove inner wall--.

In Claim 13:
At Column 25, Line 36: "valve ports each valve port" should read --valve ports, each valve port--.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*

At Column 25, Line 47: "a surface" should read --a space--.
At Column 25, Line 55: "the groove timer wall" should read --the groove inner wall--.

In Claim 14:
At Column 26, Line 28: "the move outer wall" should read --the groove outer wall--.
At Column 26, Line 35: "comprises through opening," should read --comprises a through opening,--.

In Claim 17:
At Column 26, Line 52: "including;" should read --including:--.
At Column 27, Line 14: "the seat is" should read --the seal is--.